US010620812B2

(12) United States Patent
Jon et al.

(10) Patent No.: US 10,620,812 B2
(45) Date of Patent: Apr. 14, 2020

(54) DEVICE, METHOD, AND GRAPHICAL USER INTERFACE FOR MANAGING ELECTRONIC COMMUNICATIONS

(71) Applicant: Apple Inc., Cupertino, CA (US)

(72) Inventors: Tiffany Jon, Cupertino, CA (US); Stephen Olivier Lemay, Palo Alto, CA (US); Patrick Lee Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 15/274,564

(22) Filed: Sep. 23, 2016

(65) Prior Publication Data

US 2017/0357394 A1 Dec. 14, 2017

Related U.S. Application Data

(60) Provisional application No. 62/348,775, filed on Jun. 10, 2016.

(51) Int. Cl.
*G06F 3/0481* (2013.01)
*G06F 3/0484* (2013.01)
(Continued)

(52) U.S. Cl.
CPC ........ *G06F 3/04847* (2013.01); *G06F 3/0481* (2013.01); *G06F 3/0482* (2013.01);
(Continued)

(58) Field of Classification Search
CPC .............. G06F 3/0482; G06F 3/04817; G06F 17/30528
See application file for complete search history.

(56) References Cited

U.S. PATENT DOCUMENTS 5,481,278 A  1/1996 Shigematsu et al.
5,627,567 A  5/1997 Davidson
(Continued)

FOREIGN PATENT DOCUMENTS

EP  0795811 A1  9/1997
EP  1271295 A2  1/2003
(Continued)

OTHER PUBLICATIONS

Taylor, C., "Maibox Launches on Android", TechCrunch, Apr. 9, 2014, available at https://www.youtube.com/watch?v=sgL9883T97U (last retrieved Nov. 27, 2018).
(Continued)

*Primary Examiner* — Haoshian Shih
(74) *Attorney, Agent, or Firm* — Fernando & Partners, LLP

(57) ABSTRACT

An electronic device: displays a conversation view of a plurality of messages within a first pane of a messaging application, where the conversation view includes a first message region of a portion of a first message and a second message region of a portion of a second message; and detects a user input selecting the first message region within the conversation view. In response to detecting the user input selecting the first message region, and in accordance with a determination that the user input satisfies first input criteria, the device displays one or more affordances provided to perform corresponding actions on the first message. In response to detecting the user input selecting the first message region, and in accordance with a determination that the user input satisfies second input criteria, the device replaces display of the conversation view with a message view that corresponds to the first message.

28 Claims, 58 Drawing Sheets

(51) Int. Cl.
  *G06Q 10/10* (2012.01)
  *G06F 3/0482* (2013.01)
  *G06F 3/0488* (2013.01)
(52) U.S. Cl.
  CPC ........ *G06F 3/0484* (2013.01); *G06F 3/04883* (2013.01); *G06Q 10/107* (2013.01); *G06F 2203/04803* (2013.01)

(56) References Cited

U.S. PATENT DOCUMENTS

| | | | |
|---|---|---|---|
| 5,689,550 | A | 11/1997 | Garson et al. |
| 5,943,052 | A | 8/1999 | Allen et al. |
| 5,973,676 | A | 10/1999 | Kawakura |
| 6,037,937 | A | 3/2000 | Beaton et al. |
| 6,154,758 | A | 11/2000 | Chiang |
| 6,185,551 | B1 | 2/2001 | Birrell et al. |
| 6,209,100 | B1 | 3/2001 | Robertson et al. |
| 6,259,436 | B1 | 7/2001 | Moon et al. |
| 6,381,579 | B1 | 4/2002 | Gervais et al. |
| 6,492,979 | B1 | 12/2002 | Kent et al. |
| 6,542,171 | B1 | 4/2003 | Satou et al. |
| 6,922,816 | B1 | 7/2005 | Amin et al. |
| 6,924,822 | B2 | 8/2005 | Card et al. |
| 6,938,220 | B1 | 8/2005 | Shigematsu et al. |
| 6,954,899 | B1 | 10/2005 | Anderson |
| 6,995,746 | B2 | 2/2006 | Aymeric |
| 7,007,226 | B1 | 2/2006 | Smith et al. |
| 7,007,239 | B1 | 2/2006 | Abadeer et al. |
| 7,110,864 | B2 | 9/2006 | Restrepo et al. |
| 7,222,299 | B1 | 5/2007 | Lim et al. |
| 7,437,683 | B1 | 10/2008 | Beezer et al. |
| 7,489,306 | B2 | 2/2009 | Kolmykov-Zotov et al. |
| D611,054 | S | 3/2010 | Lin et al. |
| 7,730,401 | B2 | 6/2010 | Gillespie et al. |
| 8,131,298 | B1 | 3/2012 | Beyer, Jr. |
| 8,289,162 | B2 | 10/2012 | Mooring et al. |
| 8,330,715 | B2 | 12/2012 | Yadavalli et al. |
| 8,332,447 | B2 | 12/2012 | Iwasa |
| 8,341,529 | B1 | 12/2012 | Li et al. |
| 8,347,232 | B1 | 1/2013 | Prud'Hommeaux et al. |
| 8,358,321 | B1 | 1/2013 | Weidner |
| 8,365,059 | B2 | 1/2013 | Walsh et al. |
| 8,368,723 | B1 | 2/2013 | Gossweiler, III et al. |
| 8,448,083 | B1 | 5/2013 | Migos et al. |
| 8,520,025 | B2 | 8/2013 | Patterson et al. |
| 8,665,225 | B2 | 3/2014 | Herz et al. |
| 8,743,151 | B1 * | 6/2014 | Fulcher ............... G06F 3/04817 345/684 |
| 8,756,522 | B2 | 6/2014 | Lee et al. |
| 8,842,082 | B2 | 9/2014 | Migos et al. |
| 8,859,350 | B2 | 10/2014 | Zhang et al. |
| 8,863,020 | B2 | 10/2014 | Hymel |
| 9,026,932 | B1 | 5/2015 | Dixon |
| 9,032,338 | B2 | 5/2015 | Murrett et al. |
| 9,047,009 | B2 | 6/2015 | King et al. |
| 9,092,132 | B2 | 7/2015 | Migos et al. |
| 9,104,647 | B2 | 8/2015 | Artin et al. |
| 9,113,193 | B1 | 8/2015 | Gardes et al. |
| 9,117,426 | B2 | 8/2015 | Wieder |
| 9,229,634 | B2 | 1/2016 | Herz et al. |
| 9,250,798 | B2 | 2/2016 | Migos et al. |
| 9,280,263 | B2 | 3/2016 | Kim |
| 9,654,426 | B2 | 5/2017 | Underwood, IV et al. |
| 9,971,500 | B2 | 5/2018 | Yang et al. |
| 10,101,901 | B2 * | 10/2018 | Li .................. G06F 3/0488 |
| 2002/0015064 | A1 | 2/2002 | Robotham et al. |
| 2002/0051018 | A1 | 5/2002 | Yeh |
| 2002/0180763 | A1 | 12/2002 | Kung |
| 2003/0006967 | A1 | 1/2003 | Pihlaja |
| 2003/0063073 | A1 | 4/2003 | Geaghan et al. |
| 2003/0076306 | A1 | 4/2003 | Zadesky |
| 2003/0135555 | A1 | 7/2003 | Birrel et al. |
| 2003/0142081 | A1 | 7/2003 | Iizuka et al. |
| 2003/0182310 | A1 | 9/2003 | Charnock et al. |
| 2004/0017355 | A1 | 1/2004 | Shim et al. |
| 2004/0021643 | A1 | 2/2004 | Hishino et al. |
| 2004/0068409 | A1 | 4/2004 | Tanaka et al. |
| 2004/0108995 | A1 | 6/2004 | Hoshino et al. |
| 2004/0140984 | A1 | 7/2004 | Hinckley et al. |
| 2004/0263487 | A1 | 12/2004 | Mayoraz et al. |
| 2004/0268265 | A1 | 12/2004 | Berger et al. |
| 2005/0144241 | A1 | 6/2005 | Stata et al. |
| 2005/0172001 | A1 | 8/2005 | Zaner et al. |
| 2005/0190970 | A1 | 9/2005 | Griffin |
| 2005/0198143 | A1 | 9/2005 | Moody et al. |
| 2005/0223057 | A1 | 10/2005 | Buchheit et al. |
| 2005/0223058 | A1 | 10/2005 | Buchheit et al. |
| 2005/0223066 | A1 | 10/2005 | Buchheit et al. |
| 2005/0223067 | A1 | 10/2005 | Buchheit et al. |
| 2005/0223326 | A1 | 10/2005 | Chang et al. |
| 2005/0234910 | A1 | 10/2005 | Buchheit et al. |
| 2005/0262203 | A1 | 11/2005 | Buchheit et al. |
| 2005/0275637 | A1 | 11/2005 | Hinckley et al. |
| 2006/0007174 | A1 | 1/2006 | Shen |
| 2006/0022955 | A1 | 2/2006 | Kennedy |
| 2006/0038796 | A1 | 2/2006 | Hinckley et al. |
| 2006/0048072 | A1 | 3/2006 | Jarrett et al. |
| 2006/0085757 | A1 | 4/2006 | Andre et al. |
| 2006/0092142 | A1 | 5/2006 | Gillespie et al. |
| 2006/0117273 | A1 | 6/2006 | Smith et al. |
| 2006/0125803 | A1 | 6/2006 | Westerman et al. |
| 2006/0128404 | A1 | 6/2006 | Klassen et al. |
| 2006/0132456 | A1 | 6/2006 | Anson |
| 2006/0190828 | A1 | 8/2006 | Zaner et al. |
| 2006/0199612 | A1 | 9/2006 | Beyer et al. |
| 2006/0242607 | A1 | 10/2006 | Hudson |
| 2006/0248151 | A1 | 11/2006 | Belakovskiy et al. |
| 2006/0253018 | A1 | 11/2006 | Speier et al. |
| 2006/0277488 | A1 | 12/2006 | Cok et al. |
| 2006/0290679 | A1 | 12/2006 | Lii |
| 2007/0060228 | A1 | 3/2007 | Akasaka et al. |
| 2007/0062852 | A1 | 3/2007 | Zachut et al. |
| 2007/0067744 | A1 | 3/2007 | Lane et al. |
| 2007/0124503 | A1 | 5/2007 | Ramos et al. |
| 2007/0150842 | A1 | 6/2007 | Chaudhri et al. |
| 2007/0152978 | A1 | 7/2007 | Kocienda et al. |
| 2007/0152980 | A1 | 7/2007 | Kocienda et al. |
| 2007/0173267 | A1 | 7/2007 | Klassen et al. |
| 2007/0178941 | A1 | 8/2007 | Fujimoto et al. |
| 2007/0192744 | A1 | 8/2007 | Reponen |
| 2007/0195067 | A1 | 8/2007 | Zotov et al. |
| 2007/0232360 | A1 | 10/2007 | Booking et al. |
| 2007/0247442 | A1 | 10/2007 | Andre et al. |
| 2007/0247446 | A1 | 10/2007 | Orsley et al. |
| 2007/0268274 | A1 | 11/2007 | Westerman et al. |
| 2007/0277126 | A1 | 11/2007 | Park et al. |
| 2007/0300182 | A1 | 12/2007 | Bilow |
| 2008/0012835 | A1 | 1/2008 | Rimon et al. |
| 2008/0035743 | A1 | 2/2008 | Walmsley et al. |
| 2008/0094356 | A1 | 4/2008 | Ording et al. |
| 2008/0094368 | A1 | 4/2008 | Ording et al. |
| 2008/0122796 | A1 | 5/2008 | Jobs et al. |
| 2008/0134101 | A1 | 6/2008 | Newman |
| 2008/0153459 | A1 | 6/2008 | Kansal et al. |
| 2008/0165142 | A1 | 7/2008 | Kocienda et al. |
| 2008/0165145 | A1 | 7/2008 | Herz et al. |
| 2008/0165160 | A1 | 7/2008 | Kocienda et al. |
| 2008/0168349 | A1 | 7/2008 | Lamiraux et al. |
| 2008/0168404 | A1 | 7/2008 | Ording |
| 2008/0180391 | A1 | 7/2008 | Auciello et al. |
| 2008/0180408 | A1 | 7/2008 | Forstall et al. |
| 2008/0229254 | A1 | 9/2008 | Warner |
| 2008/0259040 | A1 | 10/2008 | Ording |
| 2008/0285587 | A1 | 11/2008 | Balk et al. |
| 2008/0294730 | A1 | 11/2008 | Oral et al. |
| 2008/0295001 | A1 | 11/2008 | Moody et al. |
| 2009/0015559 | A1 | 1/2009 | Day et al. |
| 2009/0029674 | A1 | 1/2009 | Brezina et al. |
| 2009/0030872 | A1 | 1/2009 | Brezina et al. |
| 2009/0030919 | A1 | 1/2009 | Brezina et al. |
| 2009/0030933 | A1 | 1/2009 | Brezina et al. |
| 2009/0030940 | A1 | 1/2009 | Brezina et al. |
| 2009/0031244 | A1 | 1/2009 | Brezina et al. |

(56) References Cited

U.S. PATENT DOCUMENTS

| | | |
|---|---|---|
| 2009/0031245 A1 | 1/2009 | Brezina et al. |
| 2009/0041052 A1 | 2/2009 | Balk et al. |
| 2009/0047983 A1 | 2/2009 | Klassen et al. |
| 2009/0052778 A1 | 2/2009 | Edgecomb et al. |
| 2009/0064047 A1 | 3/2009 | Shim |
| 2009/0106415 A1 | 4/2009 | Brezina et al. |
| 2009/0106676 A1 | 4/2009 | Brezina et al. |
| 2009/0109182 A1 | 4/2009 | Fyke et al. |
| 2009/0122018 A1 | 5/2009 | Vymenets et al. |
| 2009/0125824 A1 | 5/2009 | Andrews et al. |
| 2009/0140986 A1 | 6/2009 | Karkkainen et al. |
| 2009/0144634 A1 | 6/2009 | Berger |
| 2009/0153288 A1 | 6/2009 | Hope et al. |
| 2009/0167700 A1 | 7/2009 | Westerman et al. |
| 2009/0176521 A1 | 7/2009 | Klassen et al. |
| 2009/0189858 A1 | 7/2009 | Lev et al. |
| 2009/0228792 A1 | 9/2009 | van Os et al. |
| 2009/0235196 A1 | 9/2009 | MacBeth et al. |
| 2009/0239587 A1 | 9/2009 | Negron et al. |
| 2009/0249257 A1 | 10/2009 | Bov et al. |
| 2009/0249258 A1 | 10/2009 | Tang |
| 2009/0282360 A1 | 11/2009 | Park et al. |
| 2009/0327972 A1* | 12/2009 | McCann .......... G06F 17/30528 715/853 |
| 2010/0011317 A1 | 1/2010 | Lee |
| 2010/0013780 A1 | 1/2010 | Ikeda et al. |
| 2010/0057879 A1 | 3/2010 | Buchheit et al. |
| 2010/0064017 A1 | 3/2010 | Buchheit et al. |
| 2010/0064261 A1 | 3/2010 | Andrews et al. |
| 2010/0087172 A1 | 4/2010 | Klassen et al. |
| 2010/0103124 A1 | 4/2010 | Kruzeniski et al. |
| 2010/0107050 A1 | 4/2010 | Wang et al. |
| 2010/0127972 A1 | 5/2010 | Yadavalli et al. |
| 2010/0156813 A1 | 6/2010 | Duarte et al. |
| 2010/0169766 A1 | 7/2010 | Duarte et al. |
| 2010/0188352 A1 | 7/2010 | Ikeda |
| 2010/0214237 A1 | 8/2010 | Echeverri |
| 2010/0220062 A1 | 9/2010 | Antila |
| 2010/0235726 A1 | 9/2010 | Ording |
| 2010/0235785 A1 | 9/2010 | Ording et al. |
| 2010/0235793 A1 | 9/2010 | Ording et al. |
| 2010/0238139 A1 | 9/2010 | Goertz et al. |
| 2010/0241700 A1 | 9/2010 | Rasmussen et al. |
| 2010/0241749 A1 | 9/2010 | Rasmussen et al. |
| 2010/0250682 A1 | 9/2010 | Goldberg et al. |
| 2010/0281397 A1 | 11/2010 | Buchheit et al. |
| 2010/0283753 A1 | 11/2010 | Ohshita |
| 2010/0293242 A1 | 11/2010 | Buchheit et al. |
| 2010/0293460 A1 | 11/2010 | Budelli |
| 2010/0299599 A1 | 11/2010 | Shin et al. |
| 2010/0309148 A1 | 12/2010 | Fleizach et al. |
| 2011/0001694 A1 | 1/2011 | Homma et al. |
| 2011/0010182 A1 | 1/2011 | Turski et al. |
| 2011/0010340 A1 | 1/2011 | Hung et al. |
| 2011/0029918 A1 | 2/2011 | Yoo et al. |
| 2011/0037725 A1 | 2/2011 | Pryor |
| 2011/0039602 A1 | 2/2011 | McNamara et al. |
| 2011/0050607 A1 | 3/2011 | Park |
| 2011/0055753 A1 | 3/2011 | Horodezky et al. |
| 2011/0069006 A1 | 3/2011 | Liu et al. |
| 2011/0074710 A1 | 3/2011 | Weeldreyer et al. |
| 2011/0074769 A1 | 3/2011 | Takayama |
| 2011/0078560 A1 | 3/2011 | Weeldreyer et al. |
| 2011/0106439 A1 | 5/2011 | Huang et al. |
| 2011/0122159 A1 | 5/2011 | Bergsten et al. |
| 2011/0128241 A1 | 6/2011 | Kang et al. |
| 2011/0130182 A1 | 6/2011 | Namba et al. |
| 2011/0175830 A1 | 7/2011 | Miyazawa et al. |
| 2011/0179387 A1 | 7/2011 | Shaffer et al. |
| 2011/0191718 A1 | 8/2011 | Hinckley et al. |
| 2011/0191719 A1 | 8/2011 | Hinckley et al. |
| 2011/0199393 A1 | 8/2011 | Nurse et al. |
| 2011/0202877 A1 | 8/2011 | Lassonde et al. |
| 2011/0221684 A1 | 9/2011 | Rydenhag |
| 2011/0231499 A1 | 9/2011 | Stovicek et al. |
| 2011/0231789 A1 | 9/2011 | Bukurak et al. |
| 2011/0231796 A1 | 9/2011 | Vigil |
| 2011/0258537 A1 | 10/2011 | Rives et al. |
| 2011/0264689 A1 | 10/2011 | Hirst et al. |
| 2011/0302532 A1 | 12/2011 | Missig |
| 2011/0320978 A1 | 12/2011 | Horodezky et al. |
| 2012/0042278 A1 | 2/2012 | Vaisanen |
| 2012/0044177 A1 | 2/2012 | Ohta et al. |
| 2012/0046947 A1 | 2/2012 | Fleizach |
| 2012/0088524 A1 | 4/2012 | Moldavsky |
| 2012/0096345 A1 | 4/2012 | Ho et al. |
| 2012/0110431 A1 | 5/2012 | Rosenfeld et al. |
| 2012/0120002 A1 | 5/2012 | Ota |
| 2012/0131474 A1* | 5/2012 | Panchadsaram ..... G06Q 10/107 715/752 |
| 2012/0139844 A1 | 6/2012 | Ramstein et al. |
| 2012/0143972 A1 | 6/2012 | Malik et al. |
| 2012/0166998 A1 | 6/2012 | Cotterill et al. |
| 2012/0182226 A1 | 7/2012 | Tuli |
| 2012/0185498 A1 | 7/2012 | Loofbourrow et al. |
| 2012/0192086 A1 | 7/2012 | Ghods et al. |
| 2012/0210334 A1 | 8/2012 | Sutedja et al. |
| 2012/0233571 A1 | 9/2012 | Wever et al. |
| 2012/0311507 A1 | 12/2012 | Murrett et al. |
| 2013/0016129 A1 | 1/2013 | Gossweiler et al. |
| 2013/0024820 A1 | 1/2013 | Kirkpatrick |
| 2013/0038541 A1 | 2/2013 | Bakker et al. |
| 2013/0050119 A1 | 2/2013 | Nemoto |
| 2013/0055119 A1 | 2/2013 | Luong |
| 2013/0076591 A1 | 3/2013 | Sirpal et al. |
| 2013/0086480 A1 | 4/2013 | Sirpal et al. |
| 2013/0093764 A1 | 4/2013 | Andersson et al. |
| 2013/0097519 A1 | 4/2013 | Andersson et al. |
| 2013/0097520 A1 | 4/2013 | Lewin et al. |
| 2013/0097521 A1 | 4/2013 | Lewin et al. |
| 2013/0097526 A1 | 4/2013 | Stovicek et al. |
| 2013/0097534 A1 | 4/2013 | Lewin et al. |
| 2013/0097539 A1 | 4/2013 | M Nsson et al. |
| 2014/0215382 A1 | 7/2014 | Engel |
| 2014/0222933 A1 | 8/2014 | Stovicek et al. |
| 2014/0223347 A1* | 8/2014 | Seo ....................... G06F 3/0482 715/769 |
| 2014/0223381 A1 | 8/2014 | Huang et al. |
| 2014/0300543 A1 | 10/2014 | Kim et al. |
| 2014/0309849 A1 | 10/2014 | Ricci |
| 2014/0351691 A1 | 11/2014 | Neil et al. |
| 2015/0028626 A1 | 1/2015 | Gopal et al. |
| 2015/0067596 A1 | 3/2015 | Brown et al. |
| 2015/0143258 A1 | 5/2015 | Carolan et al. |
| 2015/0199371 A1 | 7/2015 | Loofbourrow et al. |
| 2015/0212723 A1 | 7/2015 | Lim et al. |
| 2015/0235370 A1 | 8/2015 | Abovitz et al. |
| 2015/0248233 A1 | 9/2015 | Murrett et al. |
| 2015/0250682 A1 | 9/2015 | Bangera et al. |
| 2015/0286346 A1 | 10/2015 | Liu et al. |
| 2015/0319297 A1 | 11/2015 | Beyer et al. |
| 2015/0346916 A1 | 12/2015 | Jisrawi et al. |
| 2015/0363066 A1 | 12/2015 | Lemay et al. |
| 2016/0039426 A1 | 2/2016 | Ricci |
| 2016/0147438 A1 | 5/2016 | Migos et al. |
| 2016/0259528 A1 | 9/2016 | Foss et al. |
| 2017/0083213 A1 | 3/2017 | Missig |

FOREIGN PATENT DOCUMENTS

| | | |
|---|---|---|
| EP | 2369820 A2 | 9/2011 |
| EP | 2381661 A1 | 10/2011 |
| EP | 2584770 A1 | 4/2013 |
| EP | 2770761 A1 | 8/2014 |
| TW | M401816 | 4/2011 |
| WO | 199718508 A1 | 5/1997 |
| WO | 199938149 A1 | 7/1999 |
| WO | 200038042 A1 | 6/2000 |
| WO | 2003067497 A1 | 8/2003 |
| WO | 2004070604 A2 | 8/2004 |
| WO | 2006020305 A2 | 2/2006 |
| WO | 2006115946 A2 | 11/2006 |

(56) References Cited

FOREIGN PATENT DOCUMENTS

| WO | 2009072475 A1 | 6/2009 |
| WO | 2012178121 A1 | 12/2012 |
| WO | 2013016045 A1 | 1/2013 |

OTHER PUBLICATIONS

Brodkin, Jon, "Review: In Windows 8.1, Mail is Finally Usable on Tablets and Desktops", Ars Technica, available at https://arstechnica.com/information-technology/2013/10/review-iwindows-8-1-mail-is-finally-usable-on-tables-and-desktops, Oct. 17, 2013, pp. 1-12.

Iyer, KS Sandhya, "Google Adds New Chat Box Style Compose and Reply Experience to Gmail", NDTV Gadget360.com, available at http://gadgets.ndtv.com/internet/news/google-adds-new-chat-box-style-compose-and-reply-experience-to-gmail-286777, Oct. 31, 2013, pp. 1-4.

Chen et al., "Navigation Techniques for Dual-Display E-Book Readers", CHI, Apr. 5-10, 2008, pp. 1-10.

Guimbretiere, Francois, "Paper Augmented Digital Documents", 2003, pp. 1-10.

Gutwin et al., "Improving Interpretation of Remote Gestures with Telepointer Traces", 2002, pp. 1-10.

Hamilton, Dave "iOS 7: Apple Mail's Swipe to Delte Only Goes to the Left", available at: http://www.macobserver.com/tmo/article/ios-7-mails-swipe-to-delete-reverses-direction-from-ios-6, Sep. 23, 2013, pp. 1-2.

Liao et al, "PACER: Fine-Grained Interactive Paper Via Camera-Touch Hybrid Gestures on a Cell Phone", CHI 2010, ACM, Apr. 10-15, 2010, pp. 1-10.

Microsoft Corporation, "Microsoft Office Outlook 2003 Product Guide", 2003, 100 pages.

D. Butler, "The Textbook of the Future", Nature, vol. 458, Apr. 2, 2009, pp. 568-570.

Villamore et al., "Touch Gesture Reference Guide", available at http://static/lukew.com/TouchGestureGuide.pdf, Apr. 15, 2010, pp. 1-7.

Wang et al., "Detecting and Levaraging Finger Orientation for Interaction with Direct-Touch-Surfaces", UIST'09, Oct. 4-7, 2009, pp. 23-32.

Willems et al., "Pen Gestures in Online Map and Photograph Annotation Tasks", Oct. 2006, pp. 1-7.

Wilson, Andrew D., "TouchLight: An Imaging Touch Screen and Display for Gesture-Based Interaction", ICMI'04 Oct. 13-15, 2004, pp. 1-8.

Wu et al., "Gesture Registration, Relaxation, and Reuse for Multi-Point Direct-Touch Surfaces", Mitsubishi Research Labs., Oct. 2005, pp. 1-10.

* cited by examiner

Portable Multifunction Device 100

- 516a — Filtered Inbox Folder View 5114 — 516b — Edit

504a / 519 — From: Commodore Appleseed & Cpt. Nemo / Subject: Apple Picking — Timestamp — >> — 514a
5102a — Blurb/Snapshot of Contents — 5100

504f — From: Ensign Appleseed / Subject: Horn of Africa Pirate Report — Timestamp — >
Blurb/Snapshot of Contents 504g — From: Master Chief / Subject: Engine Reports — Timestamp — >
Blurb/Snapshot of Contents 504h — From: Chef Curry / Subject: Dryfoods Request — Timestamp — >
Blurb/Snapshot of Contents 504i — From: Captain Cheung / Subject: Request for Shore Leave — Timestamp — >
Blurb/Snapshot of Contents 5102b 504j — From: Lieutenant Dan / Subject: Shrimp Boat for Sale — Timestamp — >
Blurb/Snapshot of Contents 504k — From: Commander Smith / Subject: Daily Report — Timestamp 518a — Filters: Unread & Important 596 — 518b

802 — At a device with one or more processors, non-transitory memory, a display, and an input device:

Display, on the display, an inbox view of a messaging application that includes a plurality of rows representing electronic communications, the plurality of rows including a first row representing a first plurality of messages that satisfy one or more conversation criteria that indicate that each of the first plurality of messages are a part of a same respective conversation, and a second row representing a second plurality of messages that satisfy a first category criterion but are not part of a same conversation 804 — The plurality of rows in the inbox view is sorted by date, and the second row representing the plurality of messages is included in the inbox view based on a date of a most recently received message among the plurality of messages 806 — The first category criterion corresponds to one of a sender type of the second plurality of messages or a content type of the second plurality of messages 808 — The second row is displayed in a condensed view mode prior to detecting the user input 810 — The condensed view mode includes one or more of an indication of the first category, one or more senders of the plurality of messages represented by the second row, an indication of a most recently received message among the plurality of messages represented by the second row, an indication of a count of the plurality of messages represented by the second row, or an indication of a count of the unread messages among the plurality of messages represented by the second row 812 — The second plurality of messages represented by the second row are not displayed in the inbox view while the second row is displayed in the condensed view mode 814 — The second row includes a view mode affordance provided to toggle between the condensed view mode and an expanded view mode of the second row (A)

816 — Detect an input, via the input device, corresponding to selection of a respective row from among the plurality of rows in the inbox view (B)

902 — At a device with one or more processors, non-transitory memory, a display, and an input device:
Concurrently display, on the display, a plurality of representations of electronic communications associated with a first grouping, and a filter affordance that corresponds to a set of one or more filter criteria

904 — Satisfying a respective criterion from among the set of one or more filter criteria includes determining that electronic communications associated with the second set of representations of electronic communications are categorized as important based on past user actions with electronic communications

906 — While concurrently displaying the plurality of representations of electronic communications and the filter affordance, detect a selection input, via the input device, that corresponds to selection of the filter affordance

908 — In response to detecting the selection input, and in accordance with a determination that the selection input corresponds to a first input type:
Cease to display a first set of representations of electronic communications from among the plurality of representations of electronic communications associated with the first grouping that do not match the set of one or more filter criteria;
Display a second set of representations of electronic communications from among the plurality of representations of electronic communications associated with the first grouping that match the set of one or more filter criteria; and
Display an indication of the set of one or more filter criteria that have been applied to the electronic communications associated with the first grouping

910 — The indication of the set of one or more filter criteria includes a description of the set of one or more filter criteria adjacent to the filter affordance

912 — The set of one or more filter criteria includes two or more filter criteria

914 — The second set of representations of electronic communications that match the set of one or more filter criteria are ordered based on how many of the two or more filter criteria the corresponding electronic communications match (A)

```
┌─────────────────────────────────────────────────────────────┐
│  In response to detecting the selection input, and in accordance with a    │
│  determination that the selection input corresponds to a second input type, │─926
│  display, on the display, a filter selection menu overlaid on the plurality of │
│  representations of electronic communications associated with the first grouping │
│                                                             │
│  ┌─────────────────────────────────────────────────────┐    │
│  │ The filter selection menu is provided to at least one of enable or disable one or │─928
│  │     more filters among a plurality of filters included in the filter menu        │
│  └─────────────────────────────────────────────────────┘    │
│                                                             │
│  ┌─────────────────────────────────────────────────────┐    │
│  │ The filter selection menu includes an affordance provided to add a custom filter │─930
│  │         to the plurality of filters included in the filter menu              │
│  └─────────────────────────────────────────────────────┘    │
└─────────────────────────────────────────────────────────────┘
```

```
┌─────────────────────────────────────────────────────────────┐
│    After detecting the selection input, detect a sequence of one or more user │─932
│  inputs, via the input device, that correspond to displaying a second plurality of │
│  representations of electronic communications associated with a second      │
│  grouping; and                                              │
│                                                             │
│    In response to detecting the sequence of one or more user inputs, display, │
│  on the display, a third set of representations of electronic communications from │
│  among the second plurality of representations of electronic communications │
│  associated with the second grouping that match the set of one or more filter │
│  criteria and the indication of the set of one or more filter criteria that have been │
│  applied to the electronic communications associated with the second grouping │
└─────────────────────────────────────────────────────────────┘
```

```
┌─────────────────────────────────────────────────────────────┐
│     While displaying the third set of representations of electronic │─934
│  communications, detect a second selection input, via the input device, that │
│  corresponds to selection of the filter affordance; and     │
│                                                             │
│    In response to detecting the second selection input, and in accordance with │
│  a determination that the selection input satisfies the first input criteria, │
│  concurrently display, on the display, the third set of representations of electronic │
│  communications from among the second plurality of representations of │
│  electronic communications associated with the second grouping that match the │
│  set of one or more filter criteria and a fourth set of representations of electronic │
│  communications from among the second plurality of representations of │
│  electronic communications associated with the second grouping that do not │
│  match the set of one or more filter criteria                │
└─────────────────────────────────────────────────────────────┘
```

Figure 9C

DEVICE, METHOD, AND GRAPHICAL USER INTERFACE FOR MANAGING ELECTRONIC COMMUNICATIONS

TECHNICAL FIELD

This relates generally to electronic devices with touch-sensitive surfaces, including but not limited to electronic devices with touch-sensitive surfaces that manage electronic communications.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for managing electronic communications. Such methods and interfaces optionally complement or replace conventional methods for managing electronic communications. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and an input device. The method includes displaying, on the display, an inbox view of a messaging application that includes a plurality of rows representing electronic communications, the plurality of rows including a first row representing a first plurality of messages that satisfy one or more conversation criteria that indicate that each of the first plurality of messages are a part of a same respective conversation, and a second row representing a second plurality of messages that satisfy a first category criterion but are not part of a same conversation. The method also includes detecting an input, via the input device, corresponding to selection of a respective row from among the plurality of rows in the inbox view. In response to detecting the input, and in accordance with a determination that the respective row corresponds to the first row, the method further includes displaying, on the display, additional information corresponding to two or more messages from the conversation of related messages that are represented by the first row. In response to detecting the input, and in accordance with a determination that the respective row corresponds to the second row, the method further includes displaying, on the display, additional information corresponding to two or more messages from among the plurality of messages that are represented by the second row, including a first message and a second message that both satisfy the first category criterion but not part of a same conversation.

In accordance with some embodiments, a method is performed at a device with one or more processors, non-transitory memory, a display, and an input device. The method includes concurrently displaying, on the display, a plurality of representations of electronic communications associated with a first grouping and a filter affordance, where the filter affordance corresponds to a set of one or more filter criteria. While concurrently displaying the plurality of representations of electronic communications and the filter affordance, the method also includes detecting a selection input, via the input device, that corresponds to selection of the filter affordance. In response to detecting the selection input, and in accordance with a determination that the selection input corresponds to a first input type, the method further includes: ceasing to display a first set of representations of electronic communications from among the plurality of representations of electronic communications associated with the first grouping that do not match the set of one or more filter criteria; displaying a second set of representations of electronic communications from among the plurality of representations of electronic communications associated with the first grouping that match the set of one or more filter criteria; and displaying an indication of the set of one or more filter criteria that have been applied to the electronic communications associated with the first grouping.

In accordance with some embodiments, a method is performed at a device with one or more processors, non-transitory memory, a display, and an input device. The method includes: displaying, on the display, a conversation view of a plurality of messages within a first pane of a messaging application, where the conversation view includes a first message region of a portion of a first message of the plurality of messages and a second message region of a portion of a second message of the plurality of messages; and detecting a user input, via the input device, that corresponds to selecting the first message region within the conversation view. In response to detecting the user input selecting the first message region, and in accordance with a determination that the user input satisfies a first set of input criteria, the method also includes displaying, on the display, one or more affordances provided to perform corresponding actions on the first message. In response to detecting the user input selecting the first message region, and in accordance with a determination that the user input satisfies a second set of input criteria, the method further includes replacing display of the conversation view with a message view that corresponds to the first message.

In accordance with some embodiments, an electronic device includes a display unit configured to display a user interface, one or more input units configured to received user inputs, and a processing unit coupled with the display unit and the one or more input units. The processing unit is configured enable display of, on the display unit, an inbox view of a messaging application that includes a plurality of rows representing electronic communications, the plurality of rows including a first row representing a first plurality of messages that satisfy one or more conversation criteria that indicate that each of the first plurality of messages are a part of a same respective conversation, and a second row representing a second plurality of messages that satisfy a first category criterion but are not part of a same conversation. The processing unit is also configured to detect an input, via the one or more input units, corresponding to selection of a respective row from among the plurality of rows in the inbox view. In response to detecting the input, the processing unit 1008 is further configured to enable display of, on the display unit, additional information corresponding to two or more messages from the conversation of related messages that are represented by the first row in accordance with a determination that the respective row corresponds to the first row. In response to detecting the input, the processing unit is further configured to enable display of, on the display unit, additional information corresponding to two or more messages from among the plurality of messages that are represented by the second row, including a first message and a second message that both satisfy the first category criterion but not part of a same conversation in accordance with a determination that the respective row corresponds to the second row.

In accordance with some embodiments, an electronic device includes a display unit configured to display a user interface, one or more input units configured to received user inputs, and a processing unit coupled with the display unit and the one or more input units. The processing unit is configured to enable concurrent display of, on the display unit, a plurality of representations of electronic communications, and a filter affordance, where the filter affordance corresponds to a set of one or more filter criteria. The processing unit is also configured to detect a selection input, via the one or more input units, that corresponds to selection of the filter affordance while concurrently displaying the plurality of representations of electronic communications and the filter affordance. In response to detecting the selection input, and in accordance with a determination that the selection input corresponds to a first input type, the processing unit is further configured to: cease display of, on the display unit, a first set of representations of electronic communications from among the plurality of representations of electronic communications associated with the first grouping that do not match the set of one or more filter criteria; enable display, on the display unit, a second set of representations of electronic communications from among the plurality of representations of electronic communications associated with the first grouping that match the set of one or more filter criteria; and display of, on the display unit, an indication of the set of one or more filter criteria that have been applied to the electronic communications associated with the first grouping.

In accordance with some embodiments, an electronic device includes a display unit configured to display a user interface, one or more input units configured to received user inputs, and a processing unit coupled with the display unit and the one or more input units. The processing unit is configured to: enable display of, on the display unit, a conversation view of a plurality of messages within a first pane of a messaging application, where the conversation view includes a first message region of a portion of a first message of the plurality of messages and a second message region of a portion of a second message of the plurality of messages; and detect a user input, via the one or more input units, that corresponds to selecting the first message region within the conversation view. In response to detecting the user input selecting the first message region, and in accordance with a determination that the user input satisfies a first set of input criteria, the processing unit is further configured to enable display of, on the display unit, displaying one or more affordances provided to perform corresponding actions on the first message. In response to detecting the user input selecting the first message region, and in accordance with a determination that the user input satisfies a second set of input criteria, the processing unit is further configured to replace display of the conversation view with a message view that corresponds to the first message.

In accordance with some embodiments, an electronic device includes a display, an input device, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and an input device, cause the device to perform or cause performance of the operations of any of the methods described herein. In accordance with some embodiments, a graphical user interface on an electronic device with a display, an input device, a memory, and one or more processors to execute one or more programs stored in the non-transitory memory includes one or more of the elements displayed in any of the methods described above, which are updated in response to inputs, as described in any of the methods described herein. In accordance with some embodiments, an electronic device includes: a display, an input device; and means for performing or causing performance of the operations of any of the methods described herein. In accordance with some embodiments, an information processing apparatus, for use in an electronic device with a display and an input device, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for managing electronic communications, thereby increasing the effectiveness, efficiency, and user satisfaction with such devices. Such methods and interfaces may complement or replace conventional methods for managing electronic communications.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8C illustrate a flow diagram of a method of bundling electronic communications in accordance with some embodiments.

FIGS. 9A-9C illustrate a flow diagram of a method of filtering electronic communications in accordance with some embodiments.

DESCRIPTION OF EMBODIMENTS

The use of electronic devices with touch-based user interfaces (e.g., devices such as the iPhone®, iPod Touch®, iPad®, MacBook®, and iMac® devices from Apple Inc. of Cupertino, Calif.) has increased significantly in recent years. These devices use touch-sensitive surfaces, such as a touch screen display or a touch pad, as the main input for manipulating user interface objects on a display and/or controlling the device. These devices may also have contact intensity sensor for determining a force or pressure of contacts with the touch-sensitive surfaces.

Described below are devices and methods that enable messages that are not part of a conversation to be grouped into a bundle that is represented as a row in an inbox view. Also, described below are devices and methods that provide an affordance to quickly toggle a filter for messages in an inbox view. Further, described below are devices and methods that enable a user to access a set of affordances for performing actions on a message within a conversation view.

Figure 8B:
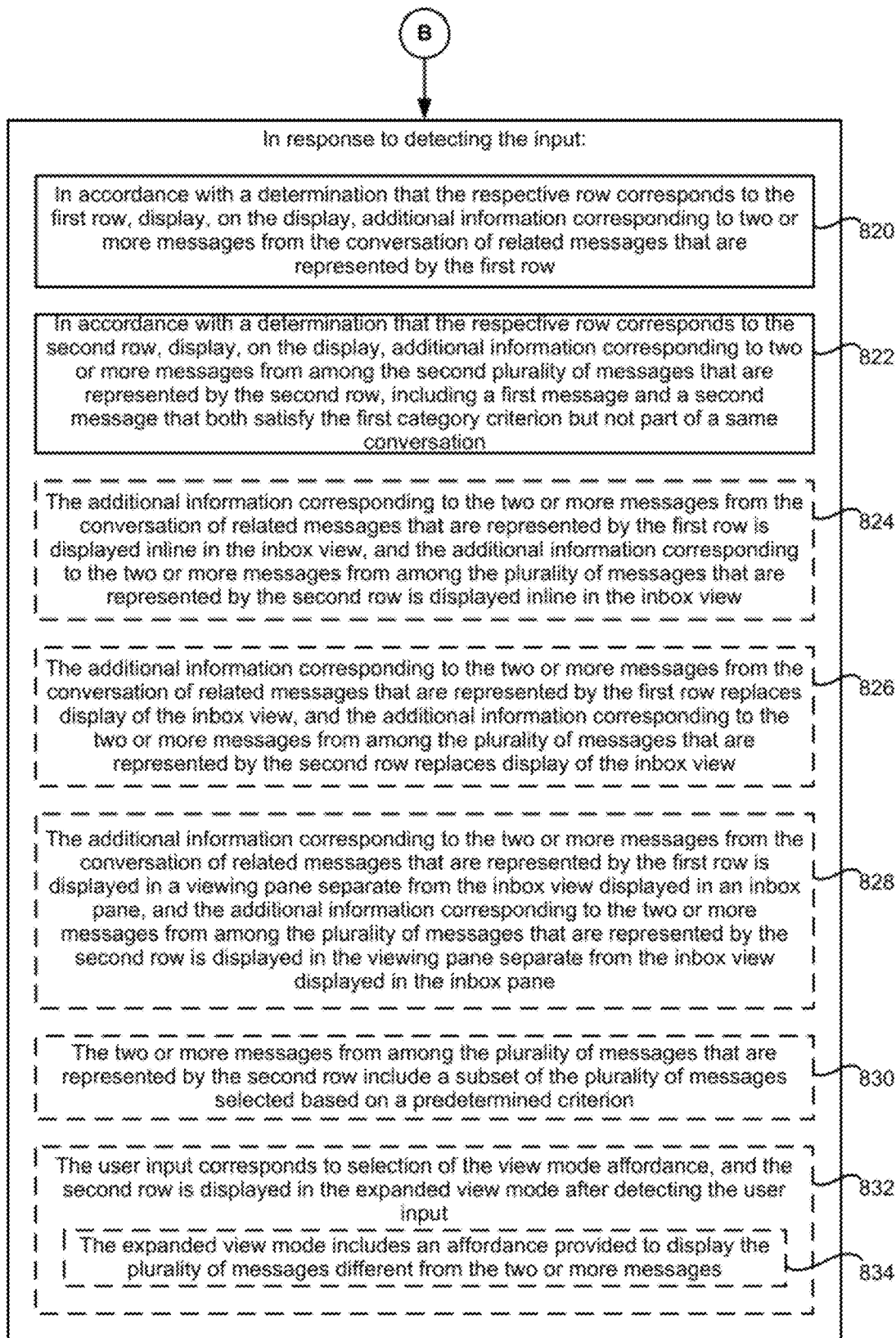
Figure 8C:
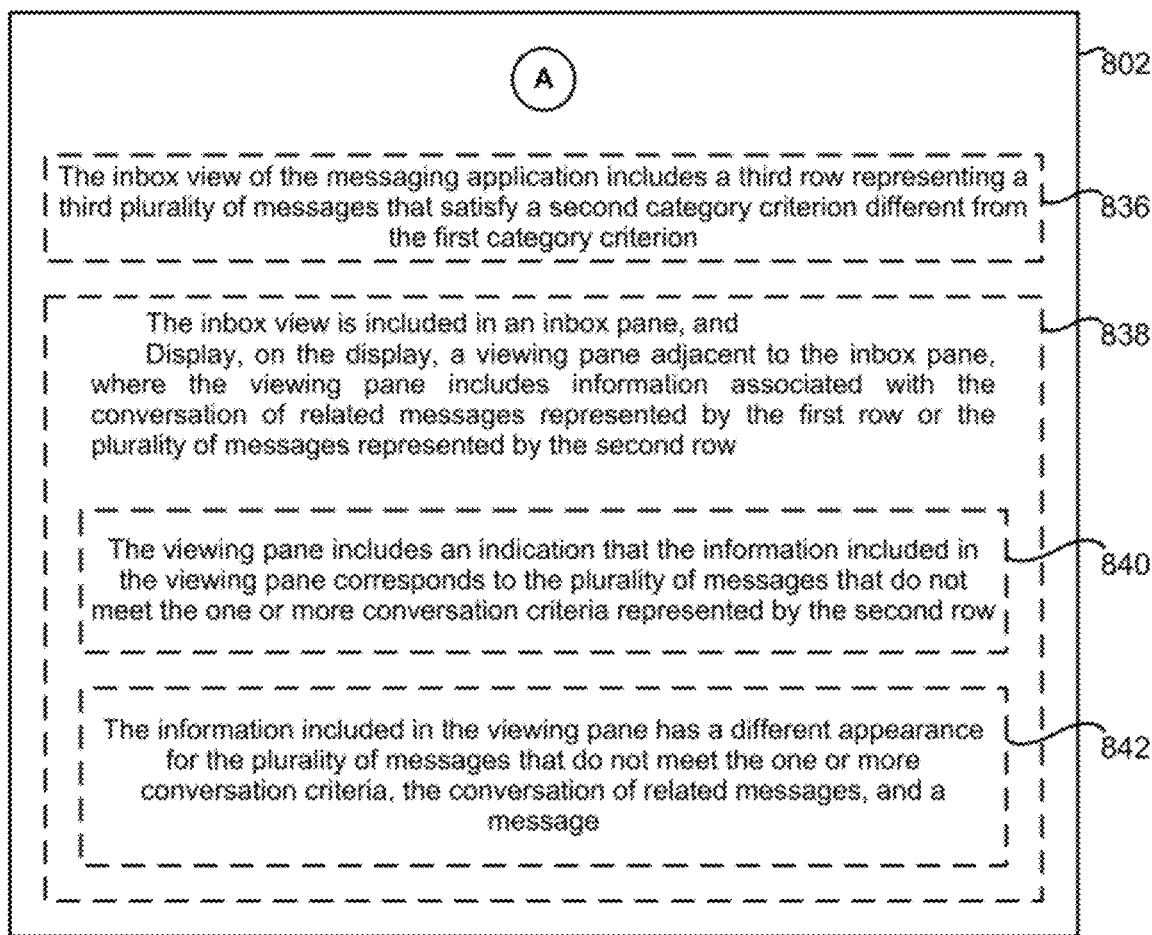
Figure 9B:
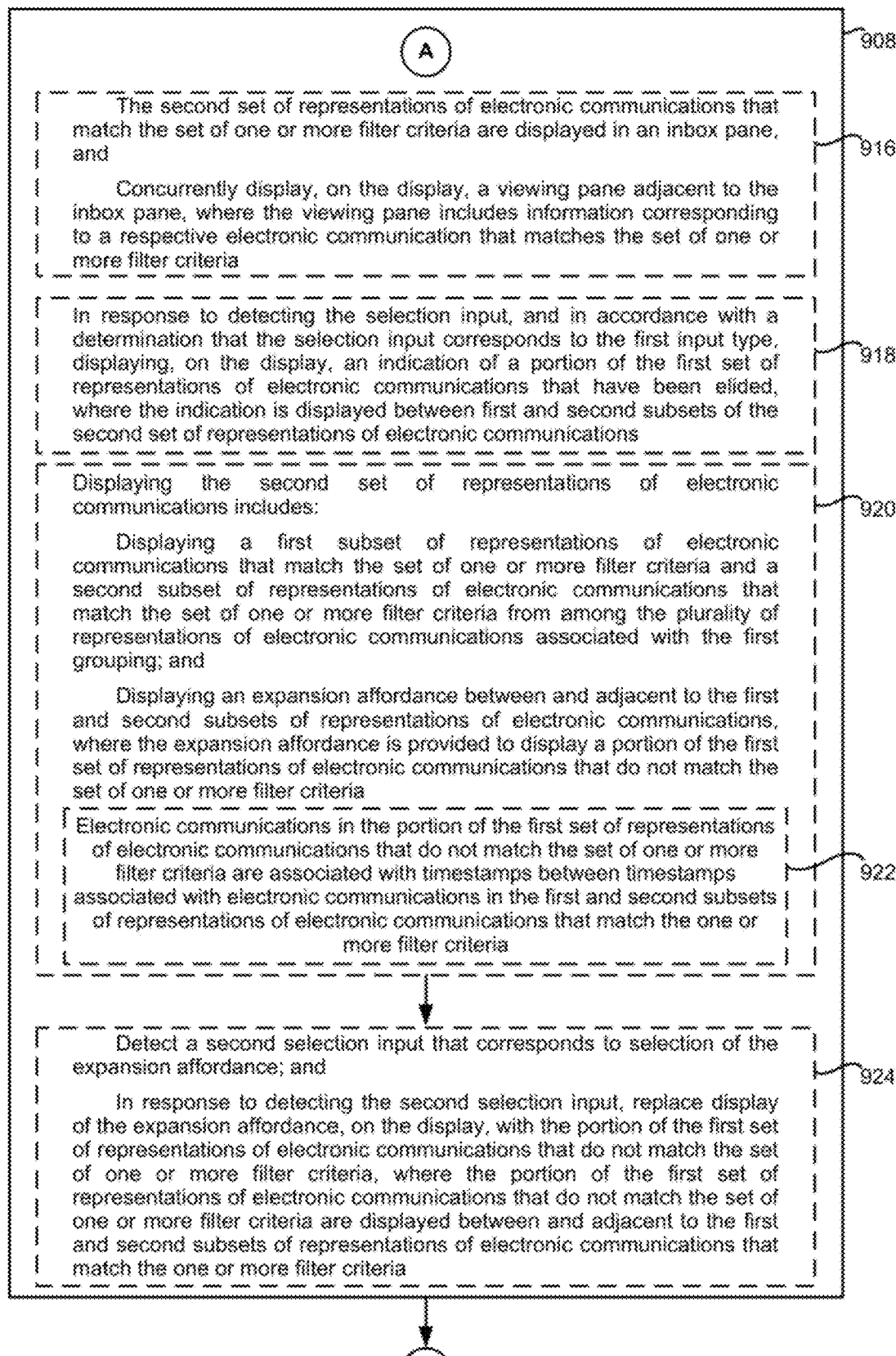
Figure 10A:
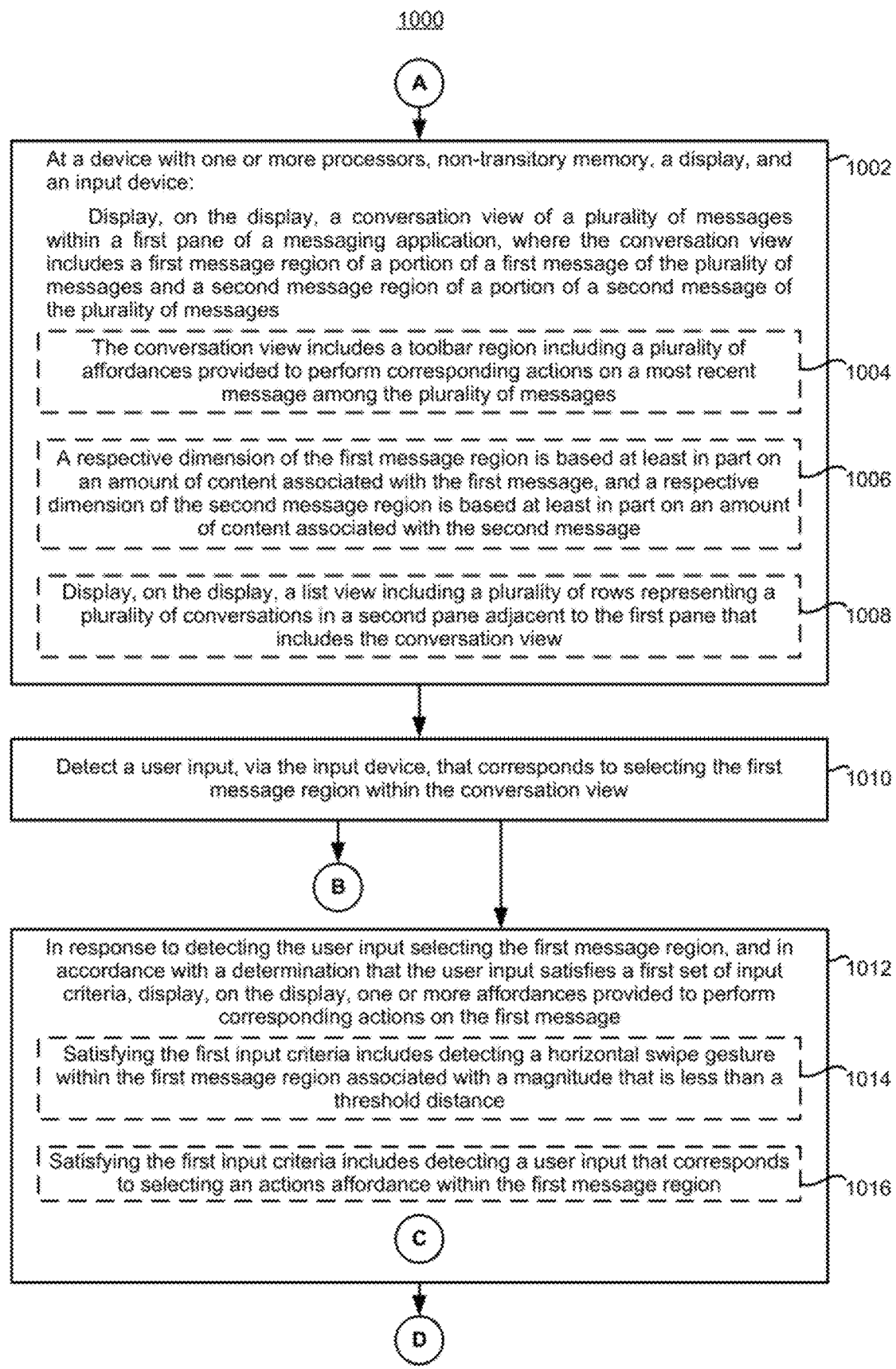
FIGS. 10A-10C illustrate a flow diagram of a method of displaying affordances for performing corresponding actions within a conversation view in accordance with some embodiments.
Figure 10B:
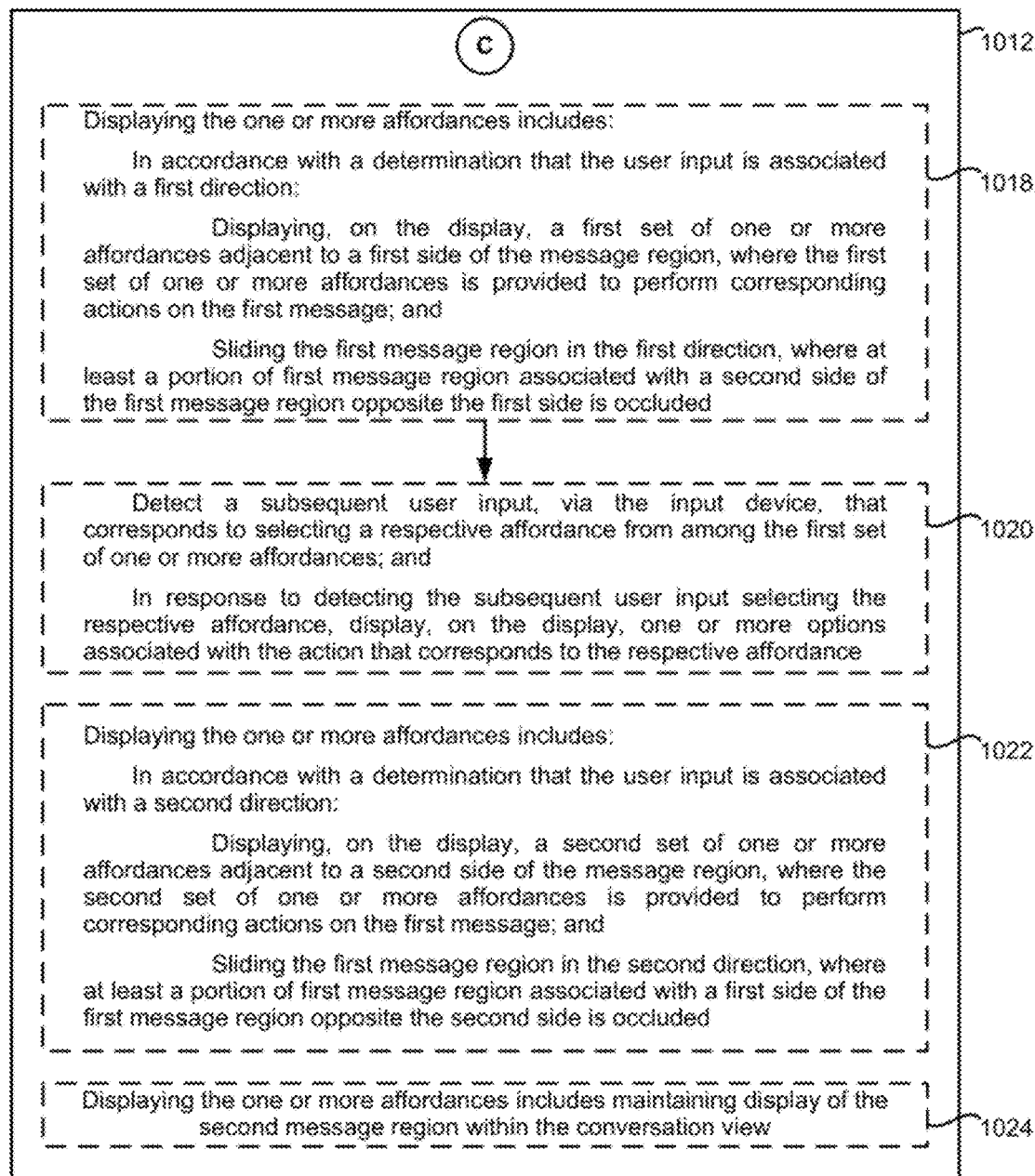
Figure 10B:
Figure 10C:
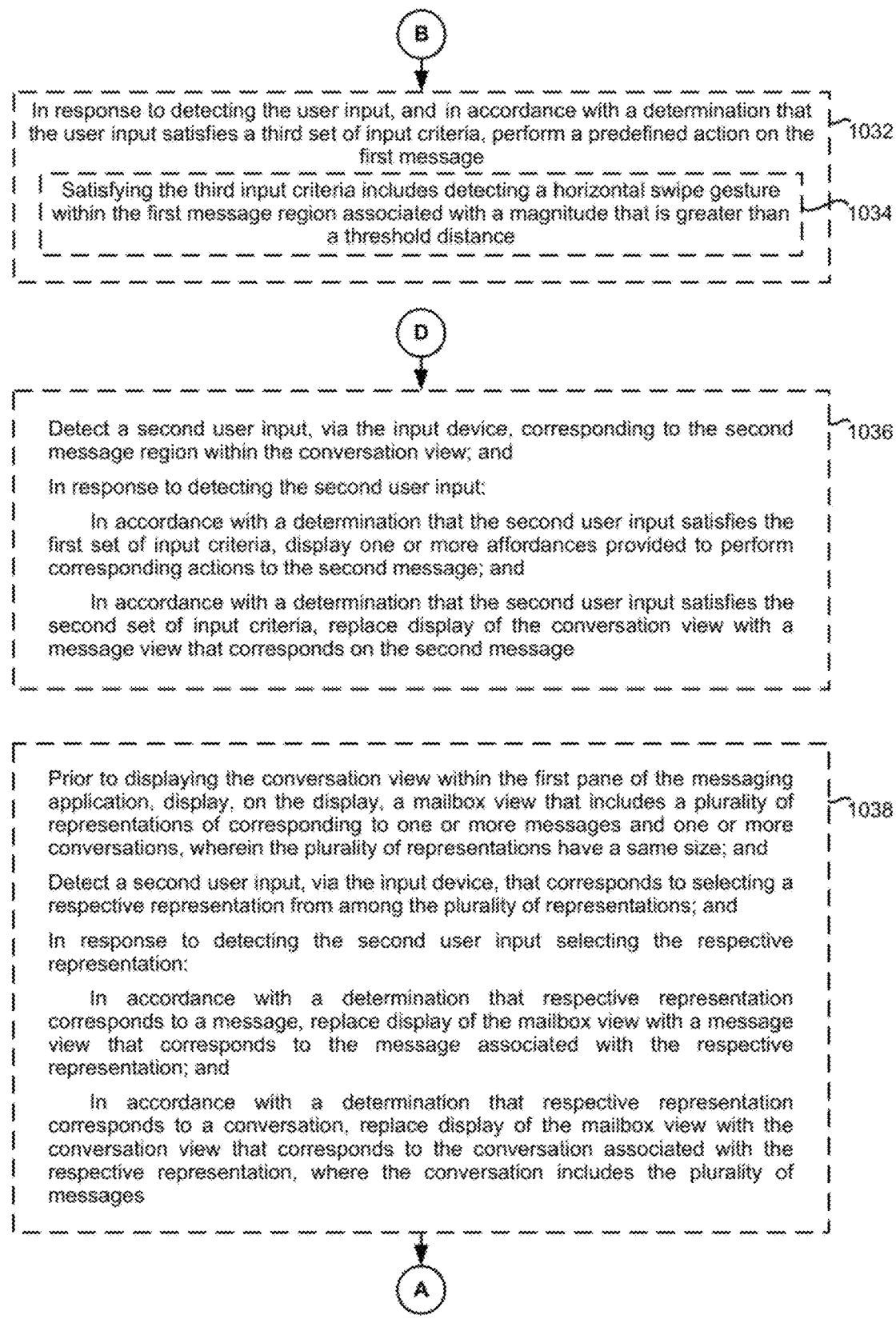

Below, FIGS. 1A-1B, 2-3, and 4A-4B provide a description of example devices. FIGS. 5A-5R, 6A-6F, and 7A-7P illustrate example user interfaces for managing electronic communications. FIGS. 8A-8C illustrate a flow diagram of a method of bundling electronic communications. FIGS. 9A-9C illustrate a flow diagram of a method of filtering electronic communications. FIGS. 10A-10C illustrate a flow diagram of a method of displaying affordances for performing corresponding actions within a conversation view. The user interfaces in FIGS. 5A-5R and 6A-6F are used to illustrate the processes in FIGS. 8A-8C, 9A-9C, and 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
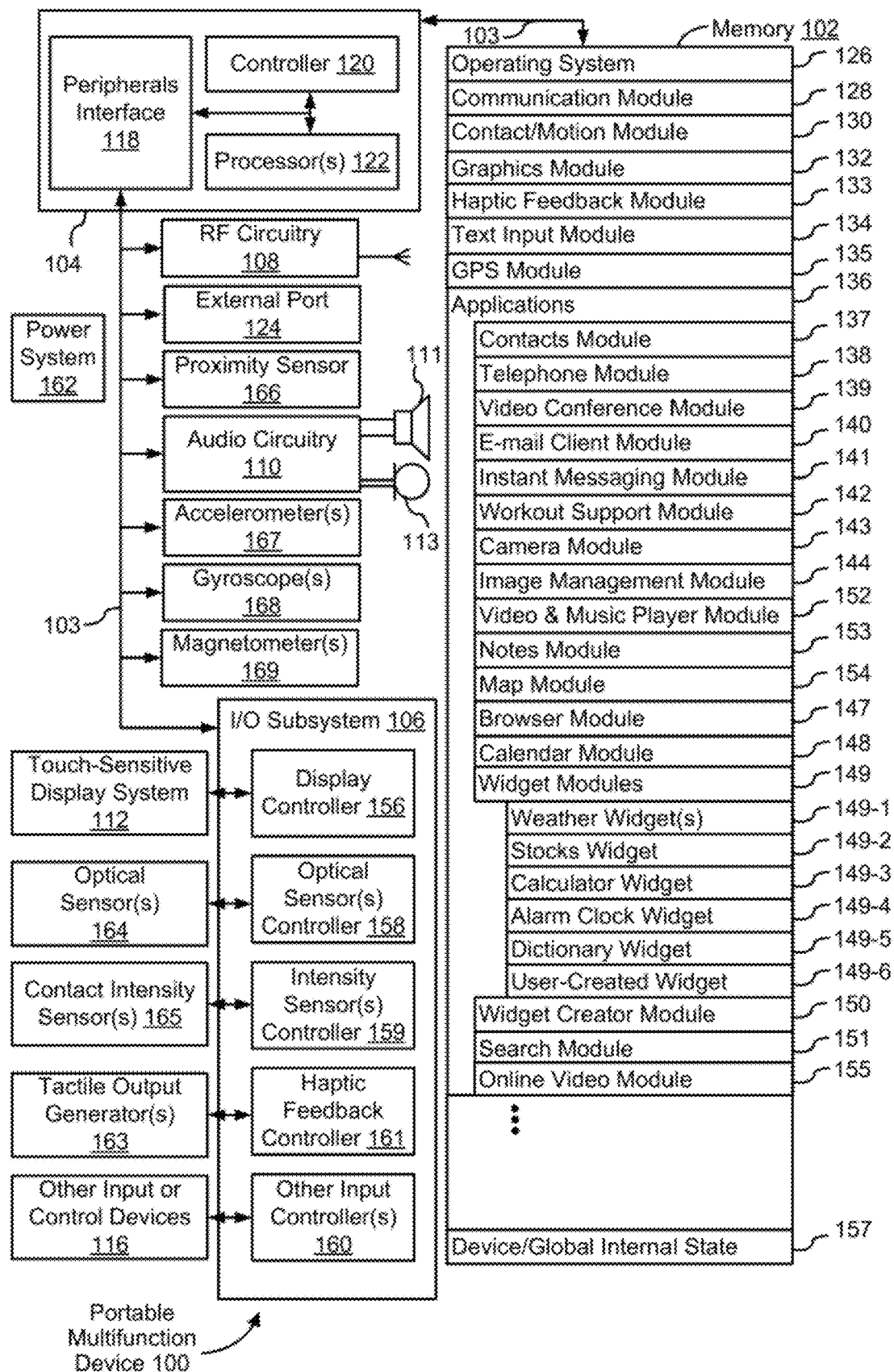
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

Figure 3:
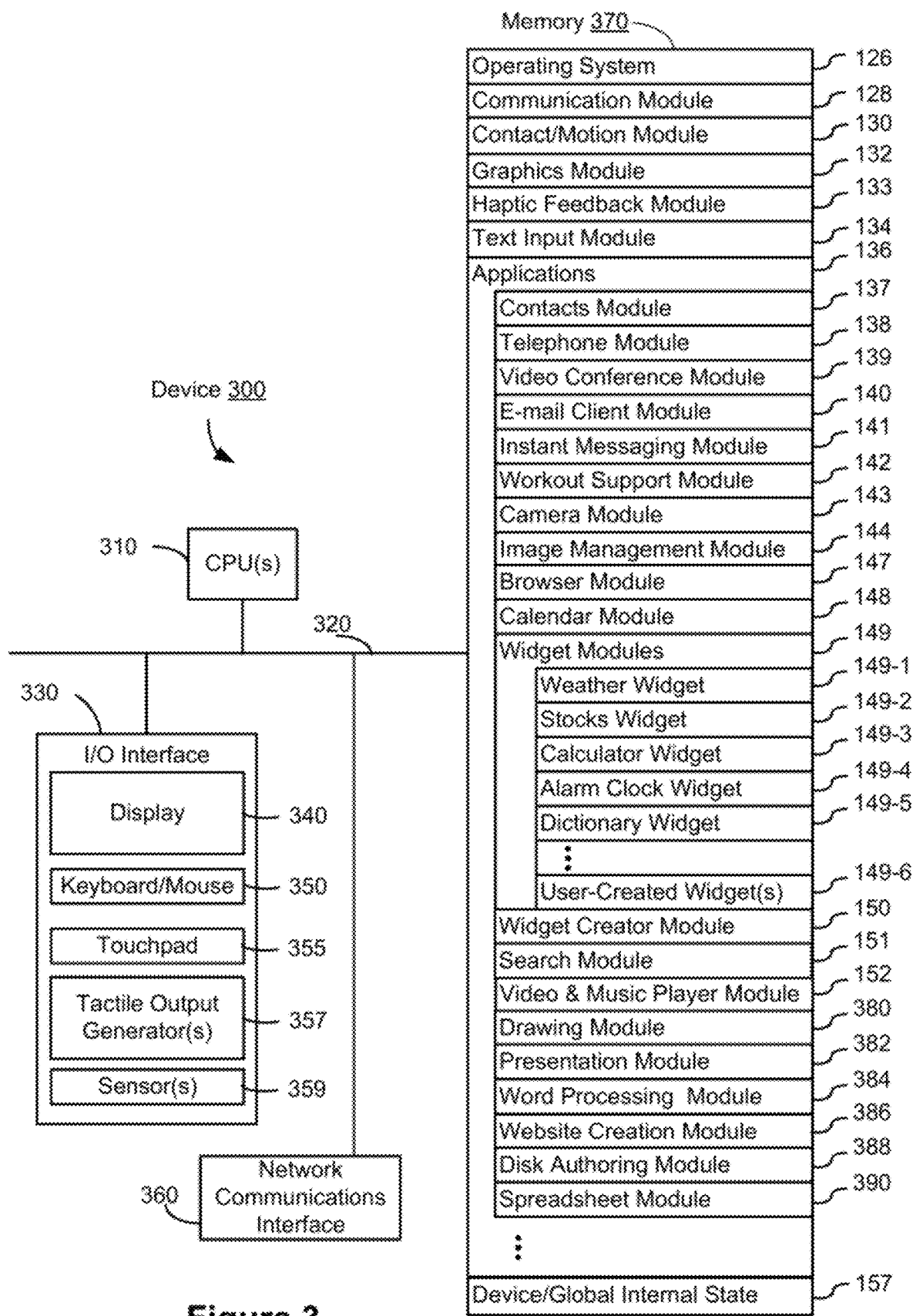
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
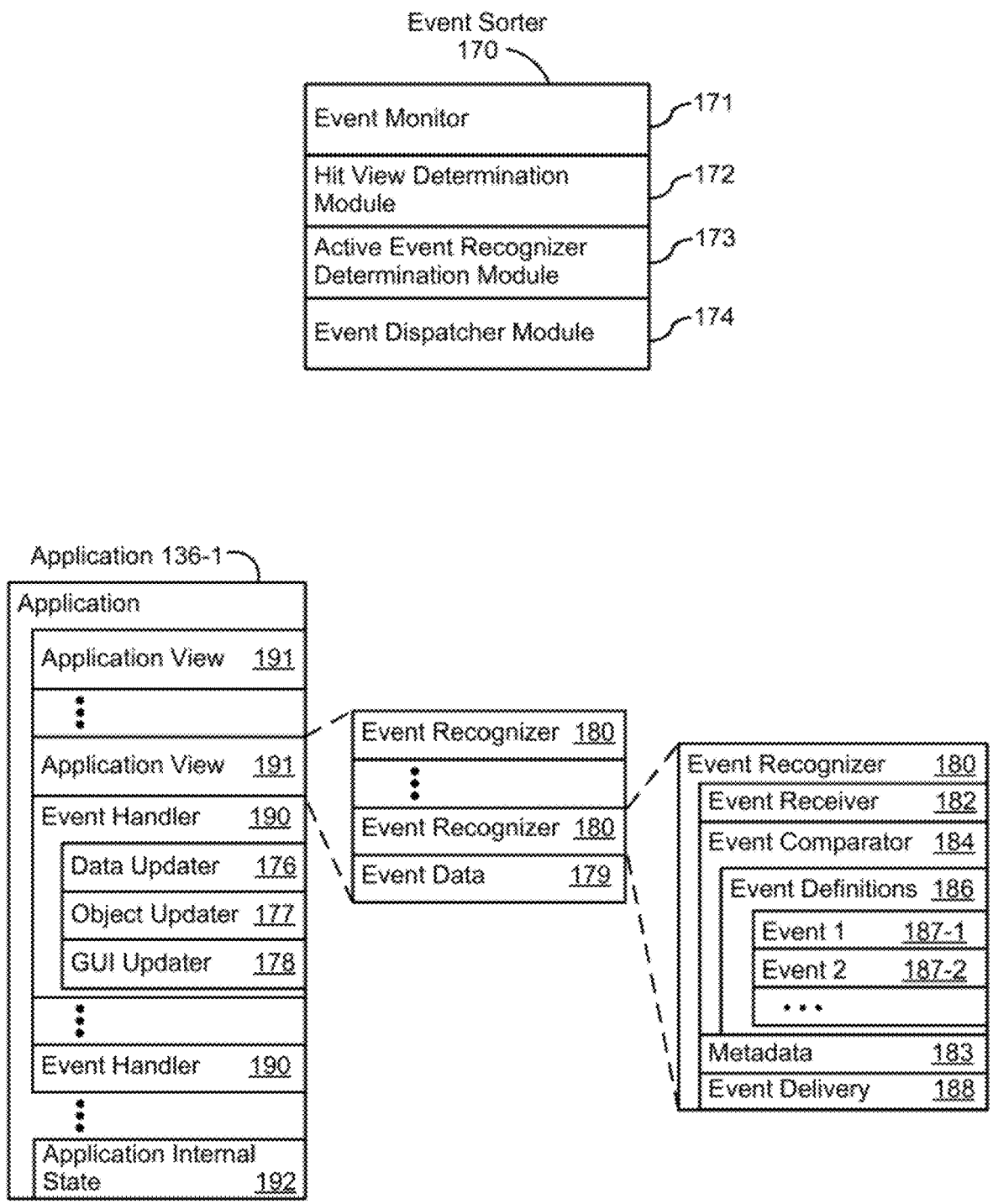
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
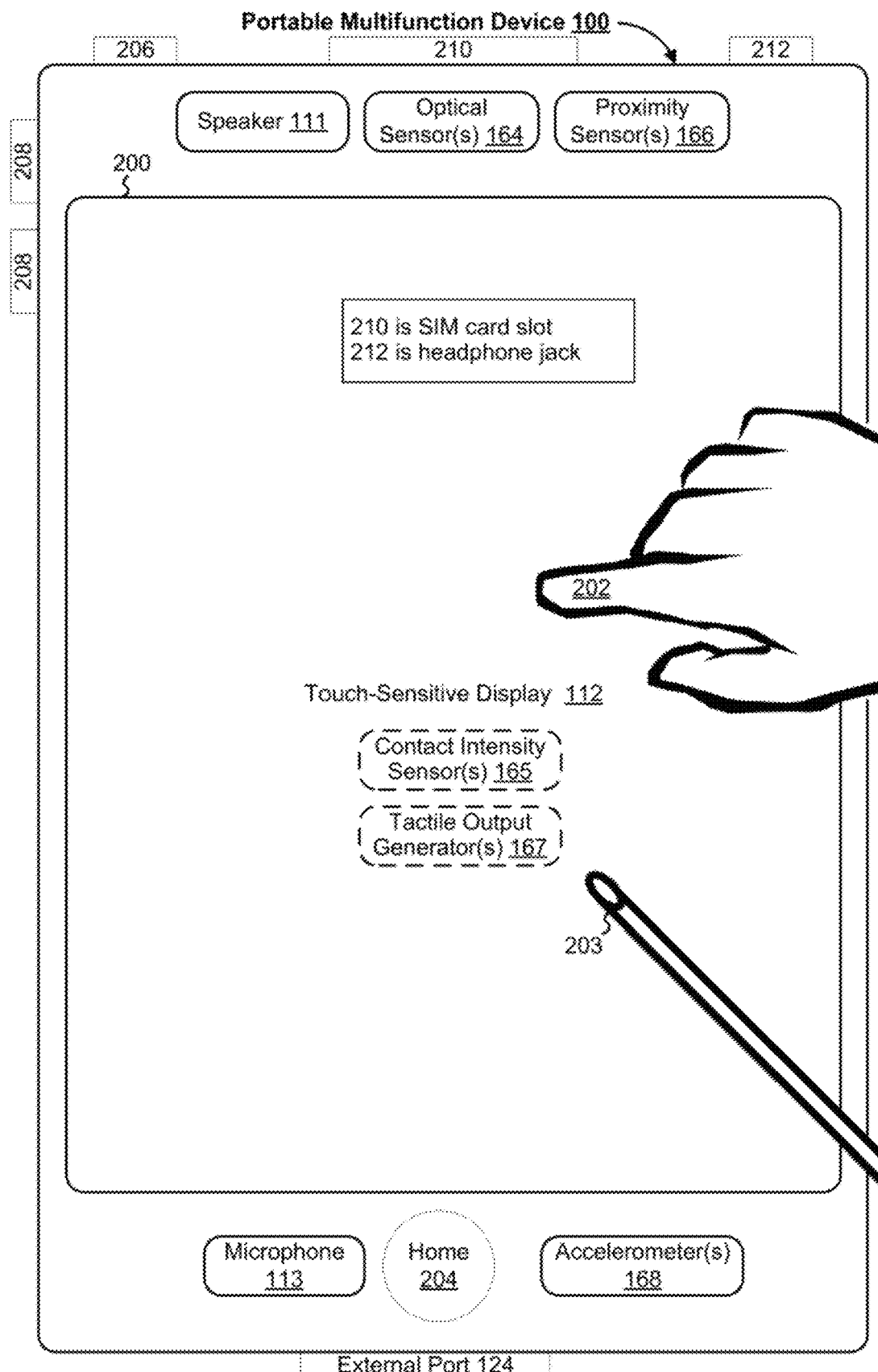
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
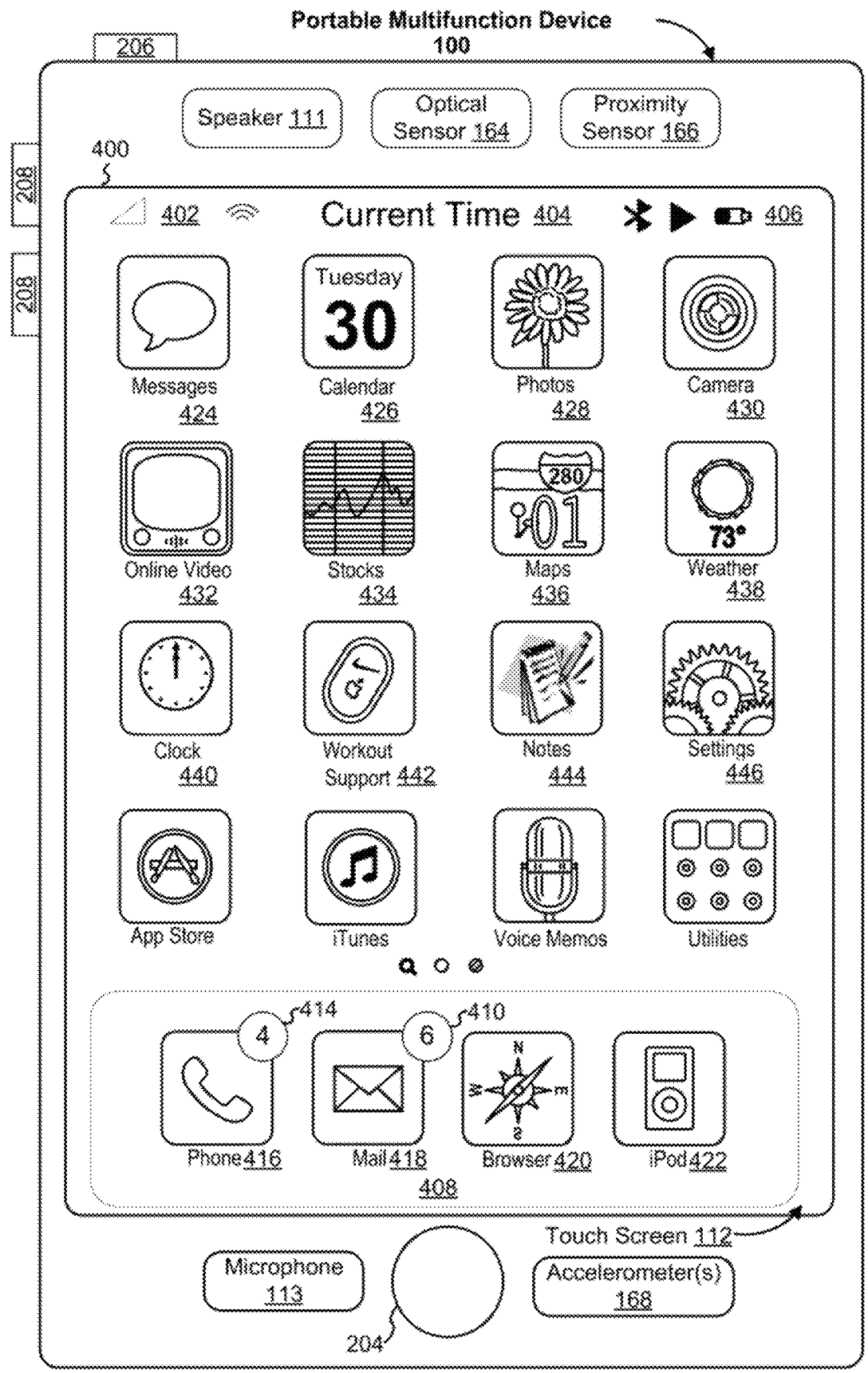
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod"; and
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 169-6, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
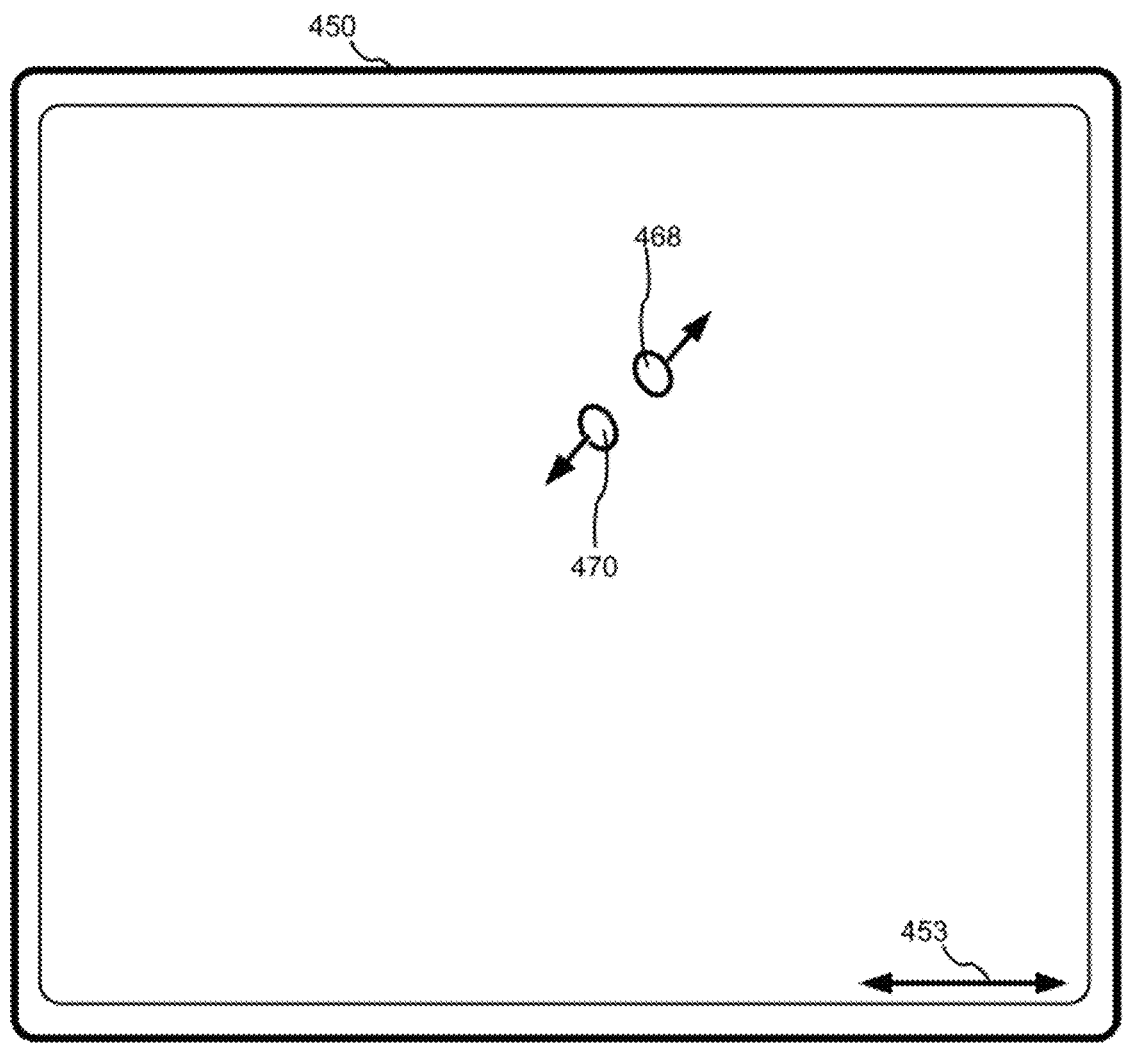
FIG. 4B illustrates an example user interface for a multifunction device with a touch-sensitive surface that is separate from the display in accordance with some embodiments.
Figure 4B:
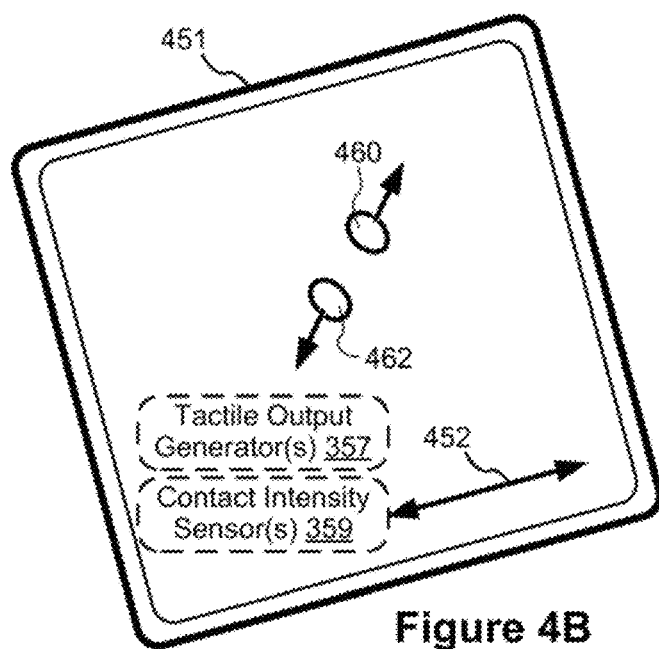

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device 100 with a display, a touch-sensitive surface, and optionally one or more sensors to detect intensity of contacts with the touch-sensitive surface, or a device 300 with a one or more processors, non-transitory memory, a display, and an input device.

Figure 5A:
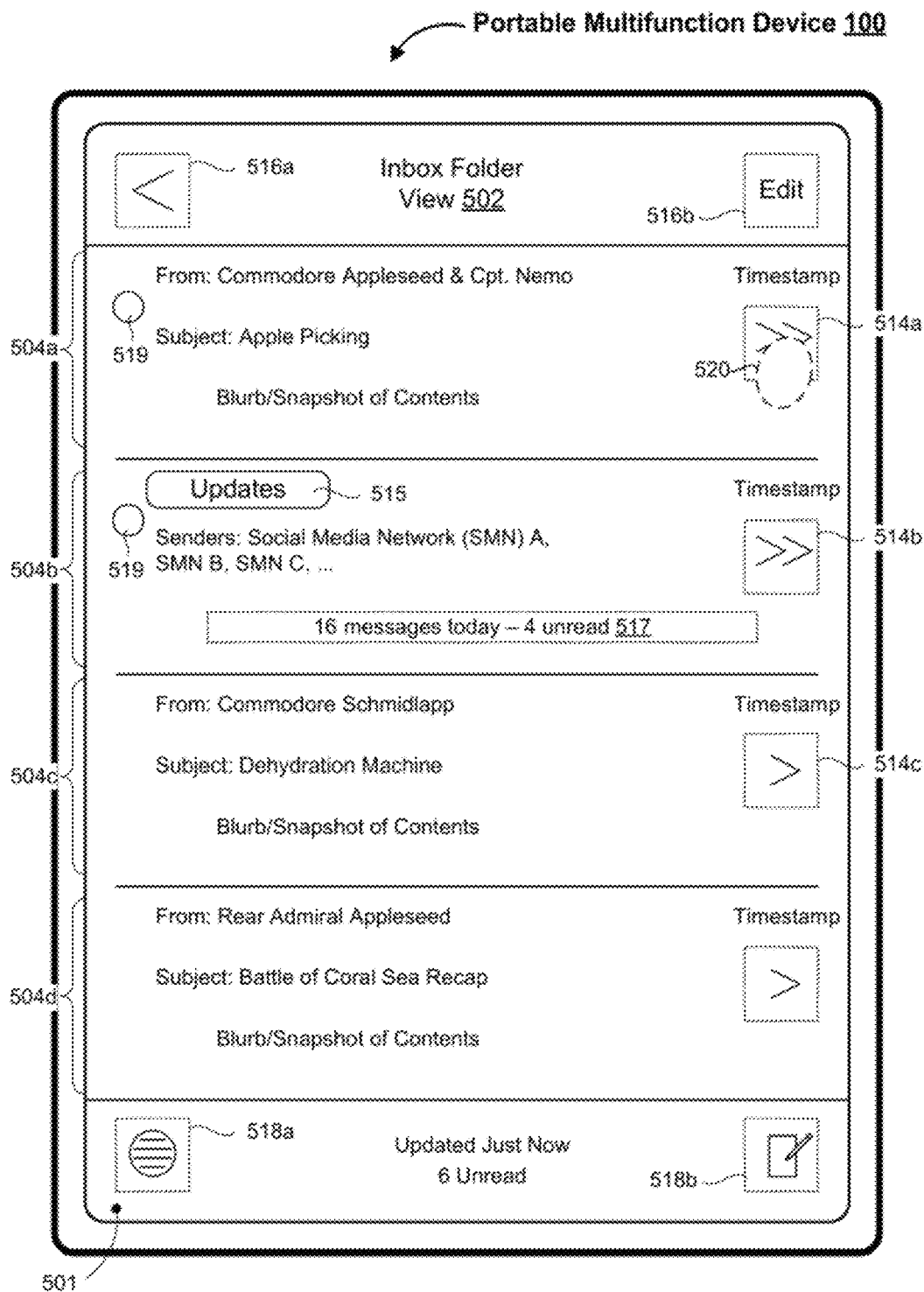
FIGS. 5A-5R illustrate example user interfaces for managing electronic communications in accordance with some embodiments.
Figure 5B:
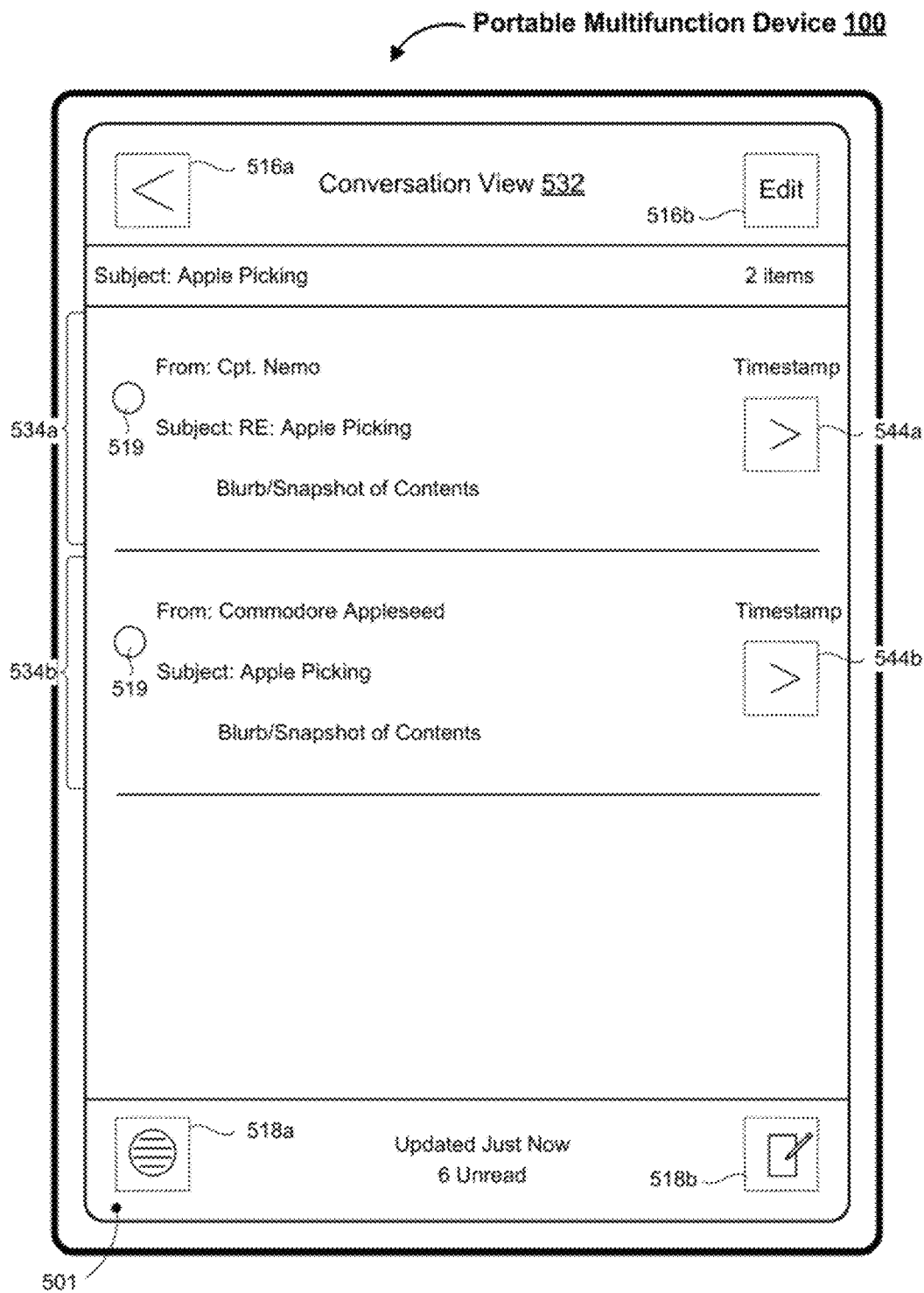
Figure 5C:
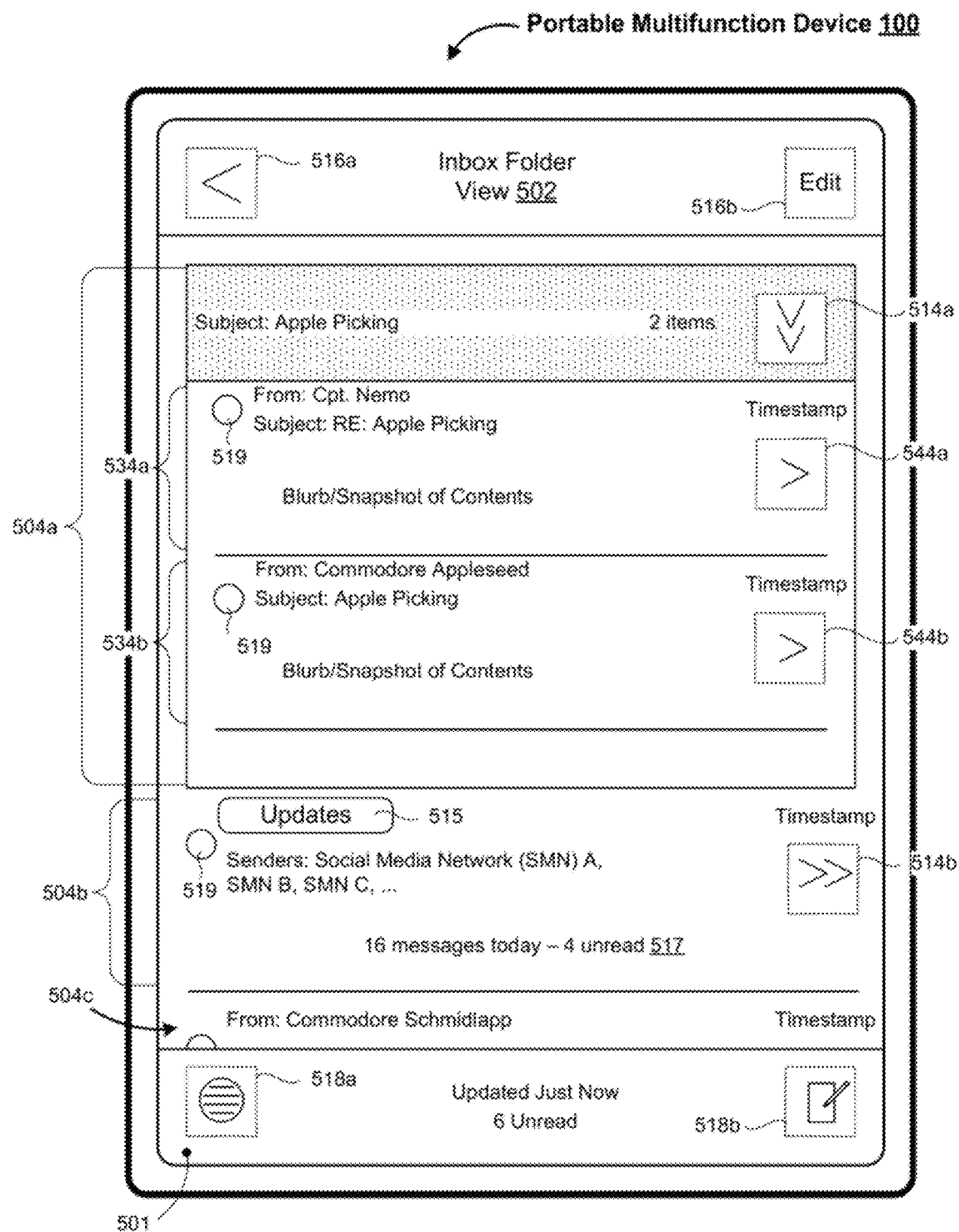
Figure 5D:
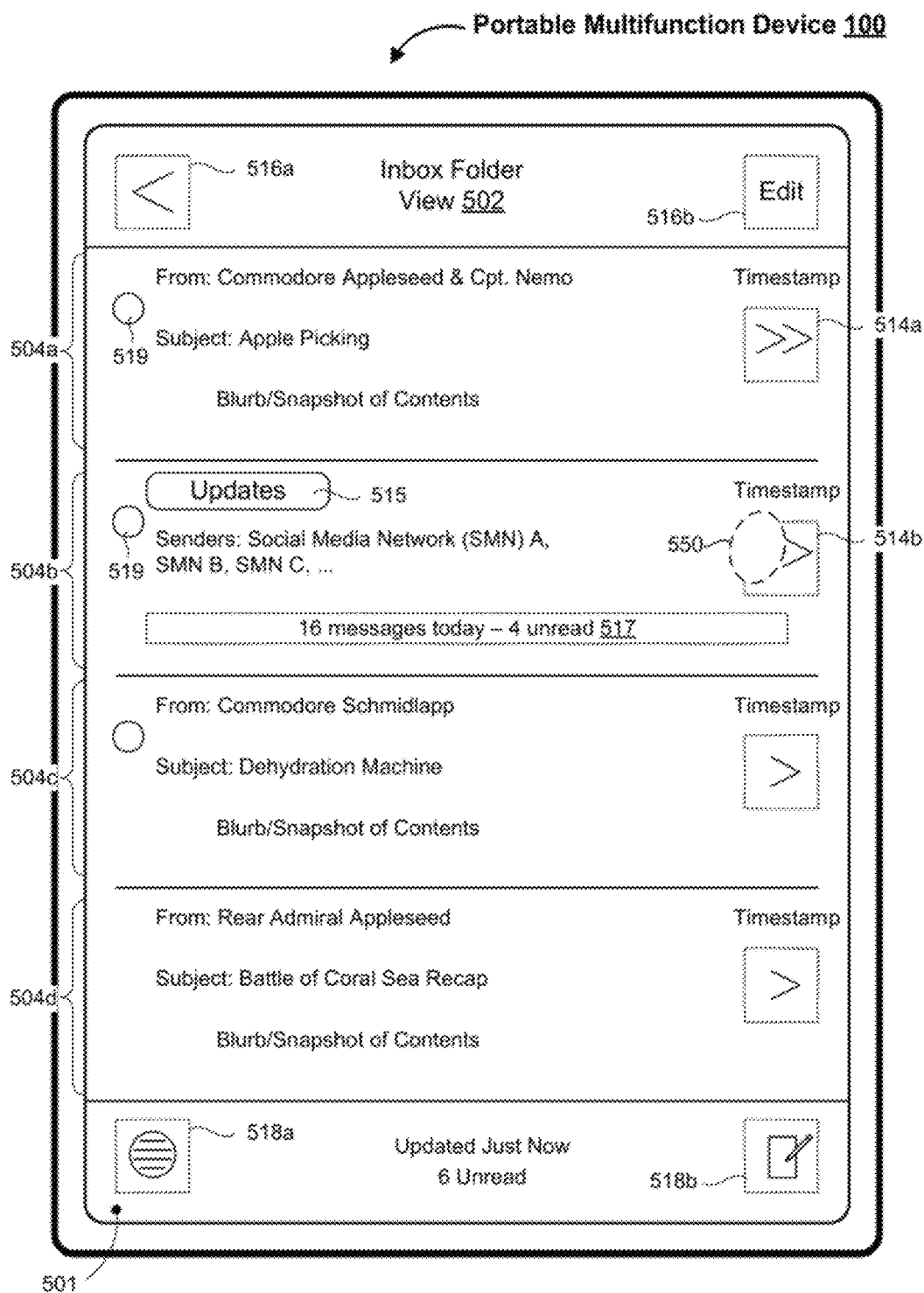
Figure 5E:
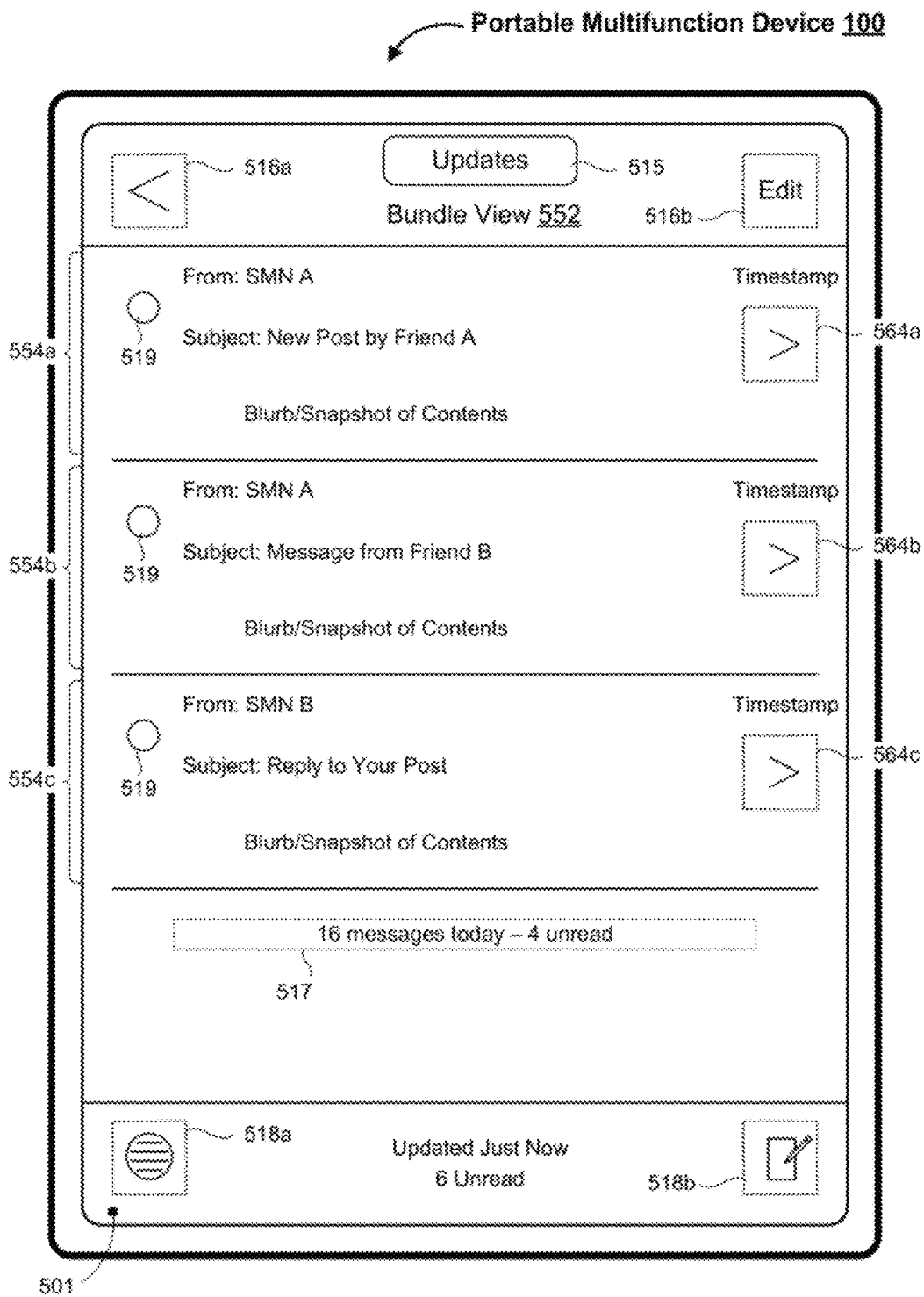
Figure 5F:
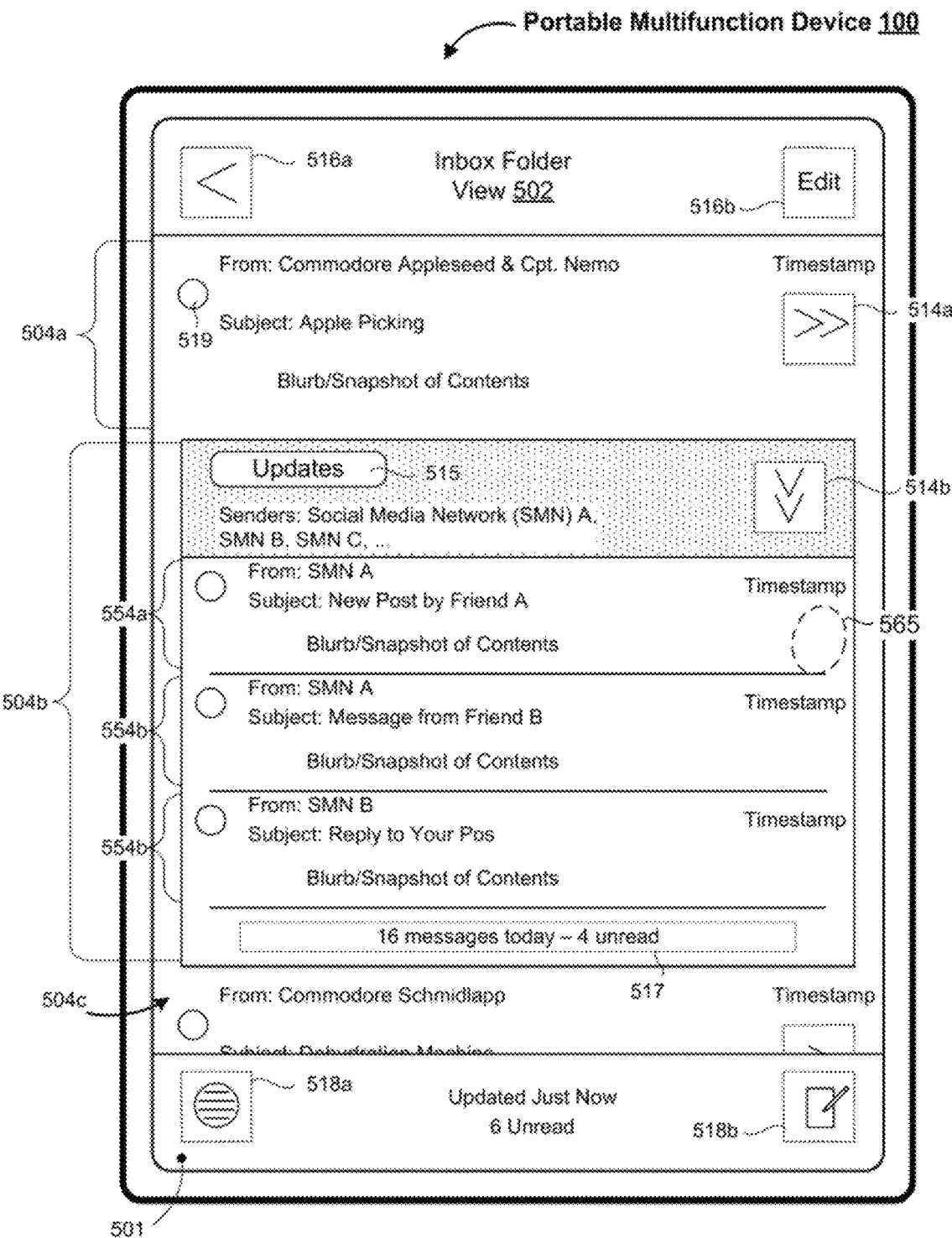
Figure 5G:
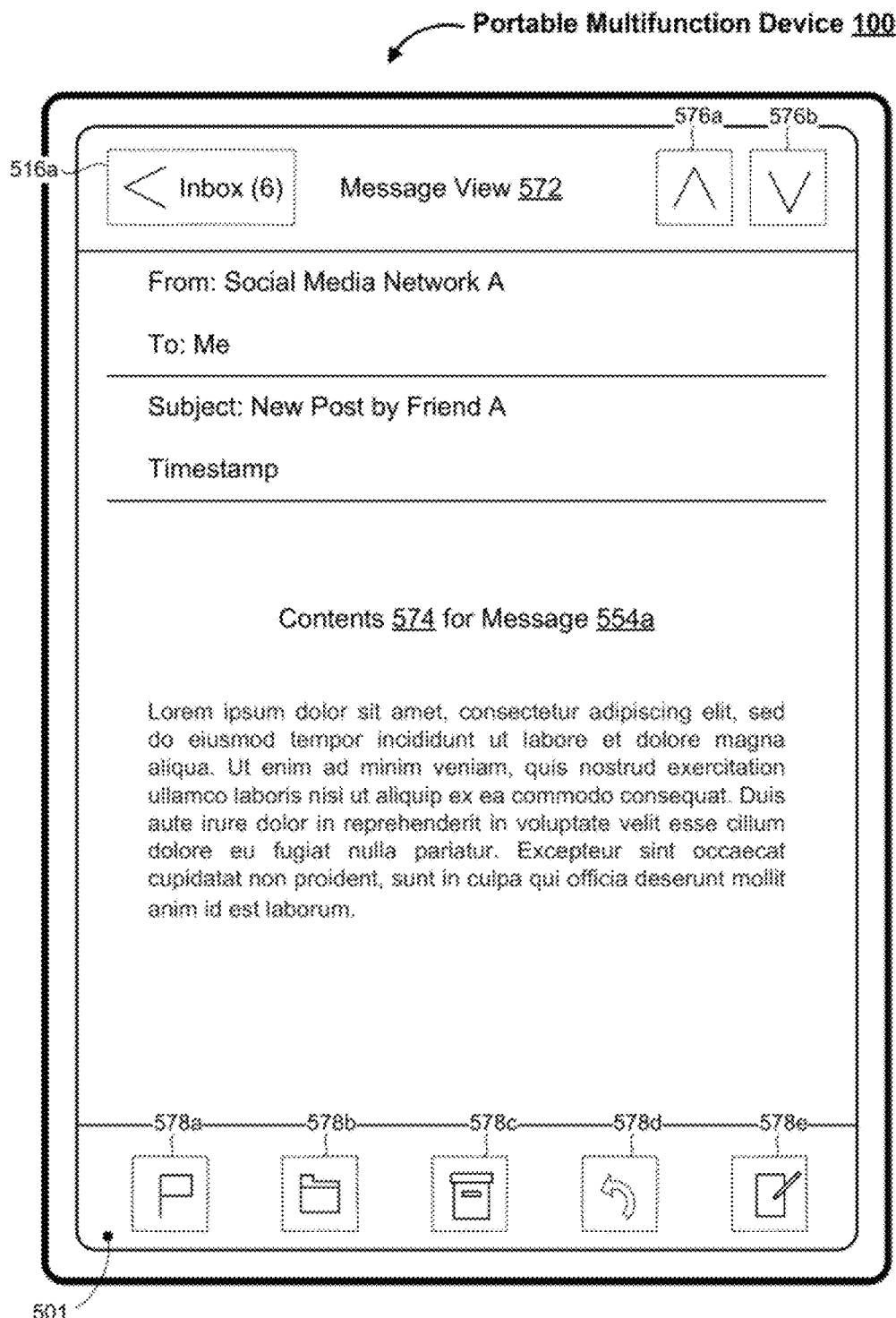
Figure 5H:
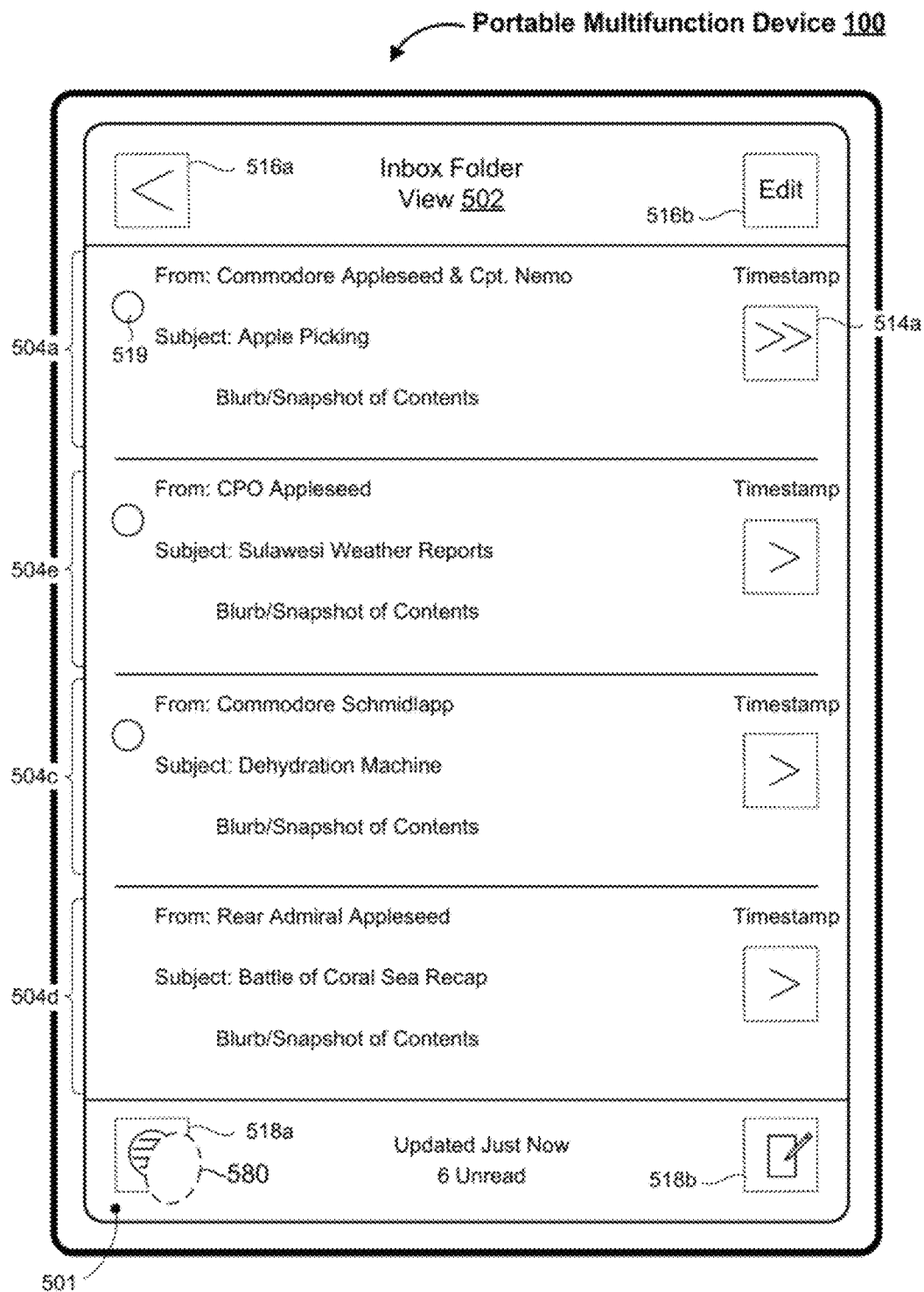
Figure 5I:
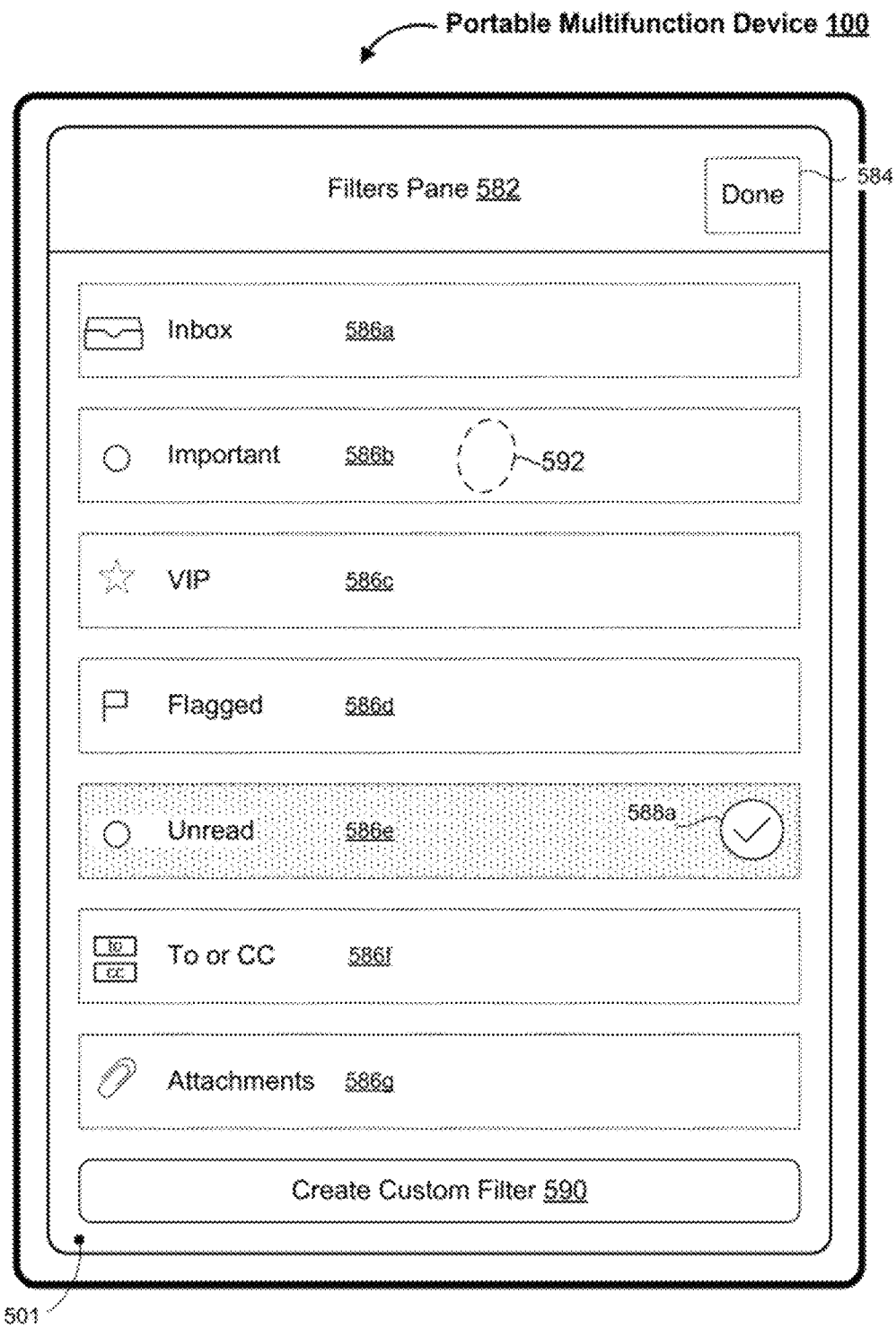
Figure 5J:
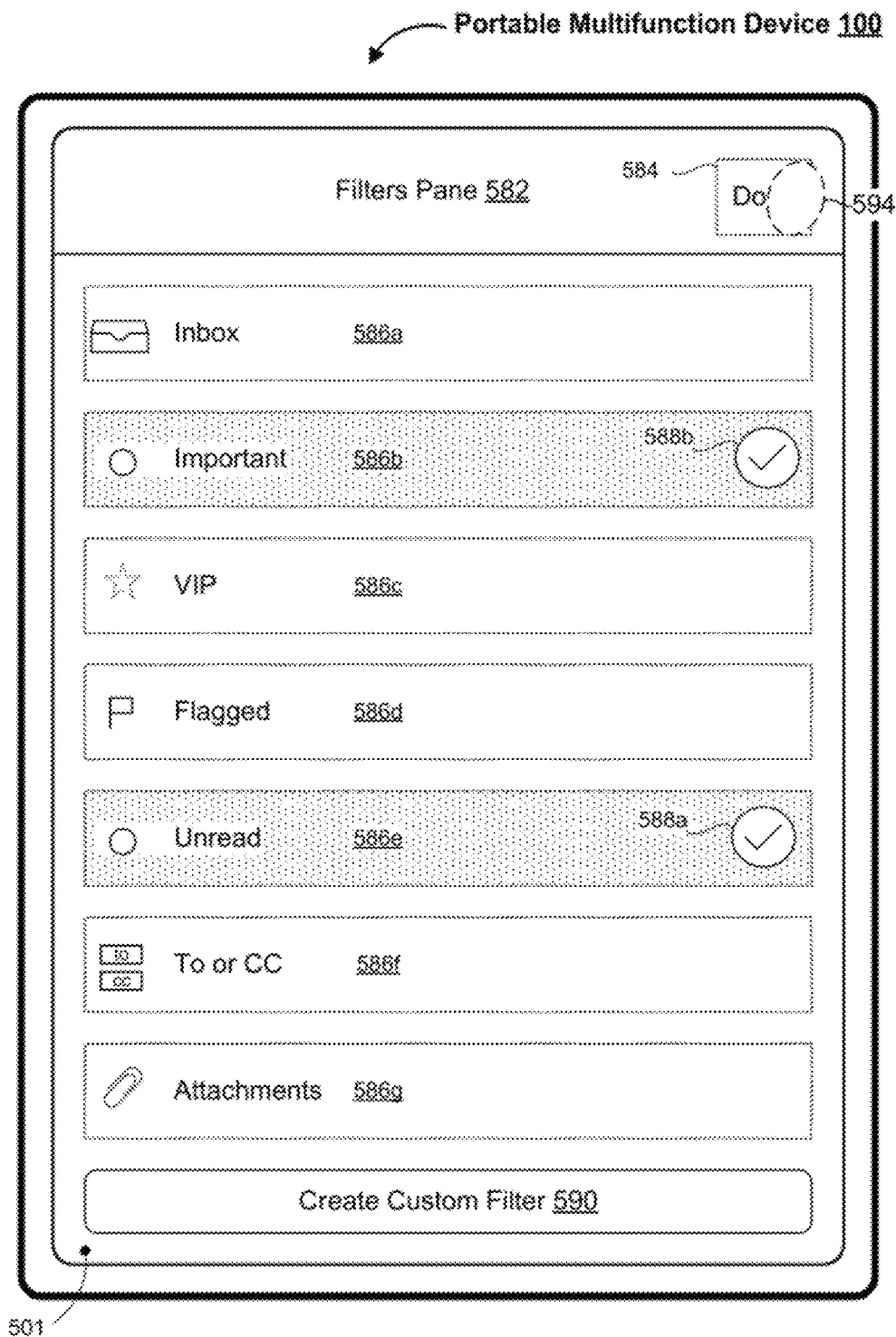
Figure 5K:
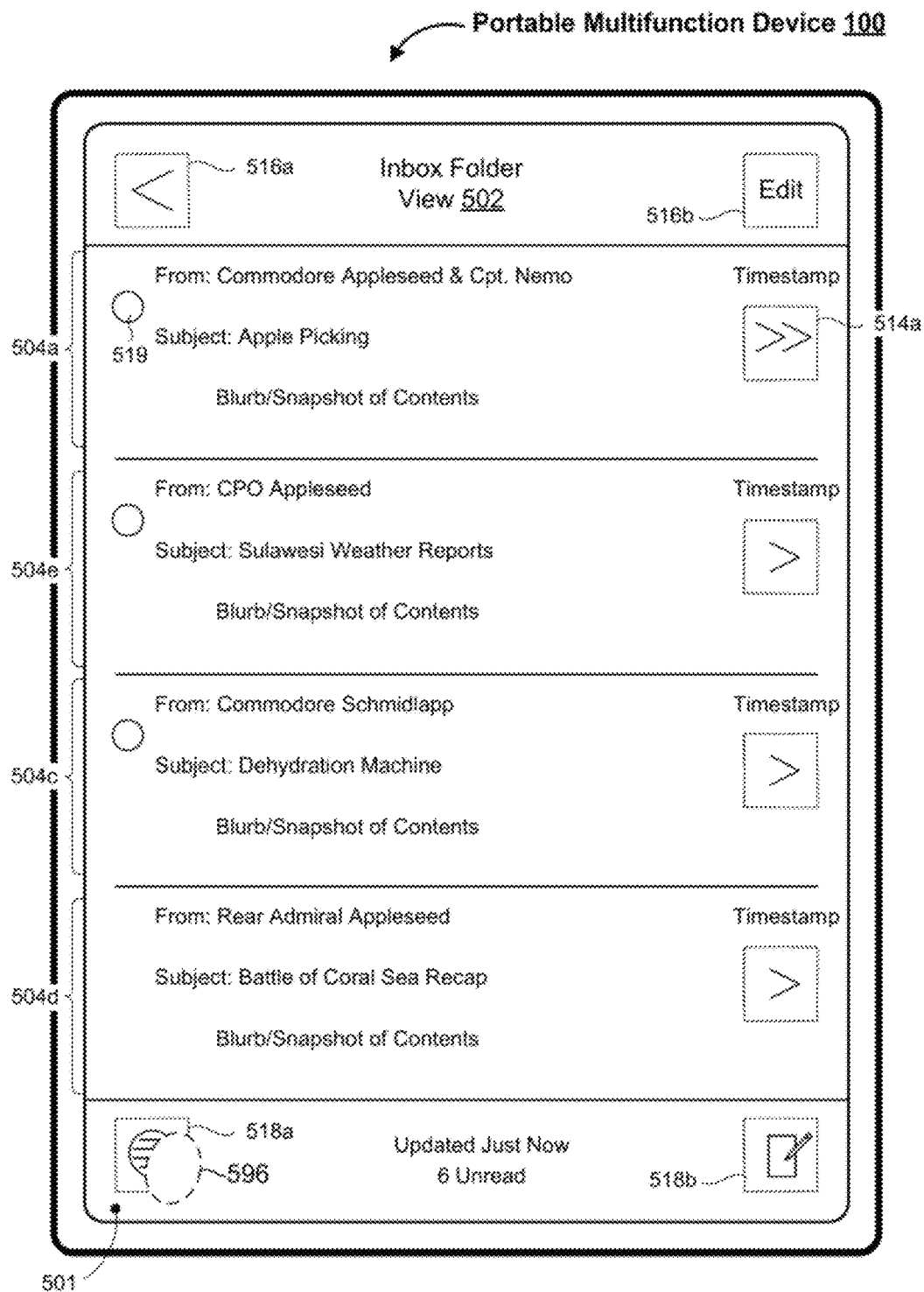
Figure 5M:
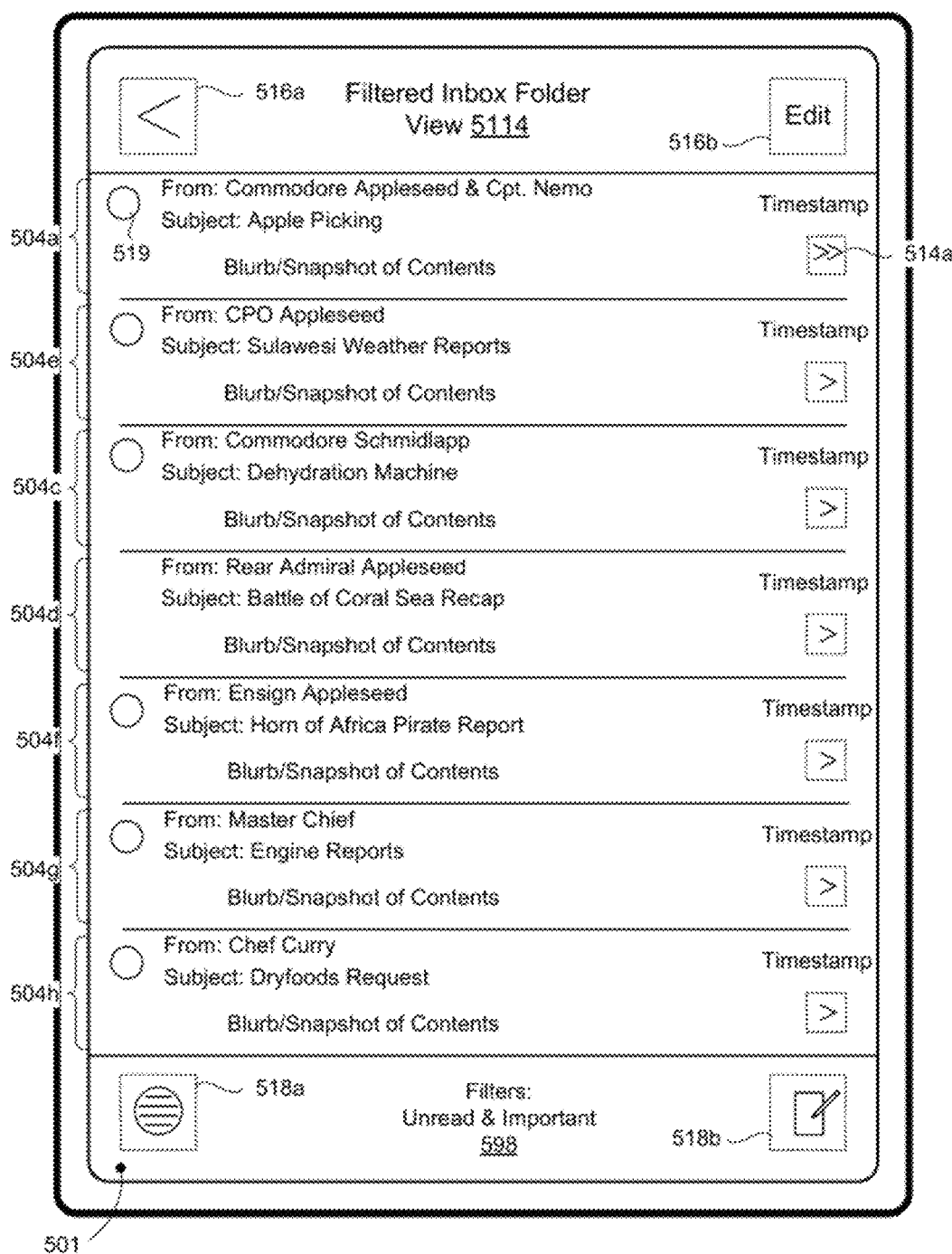
Figure 5N:
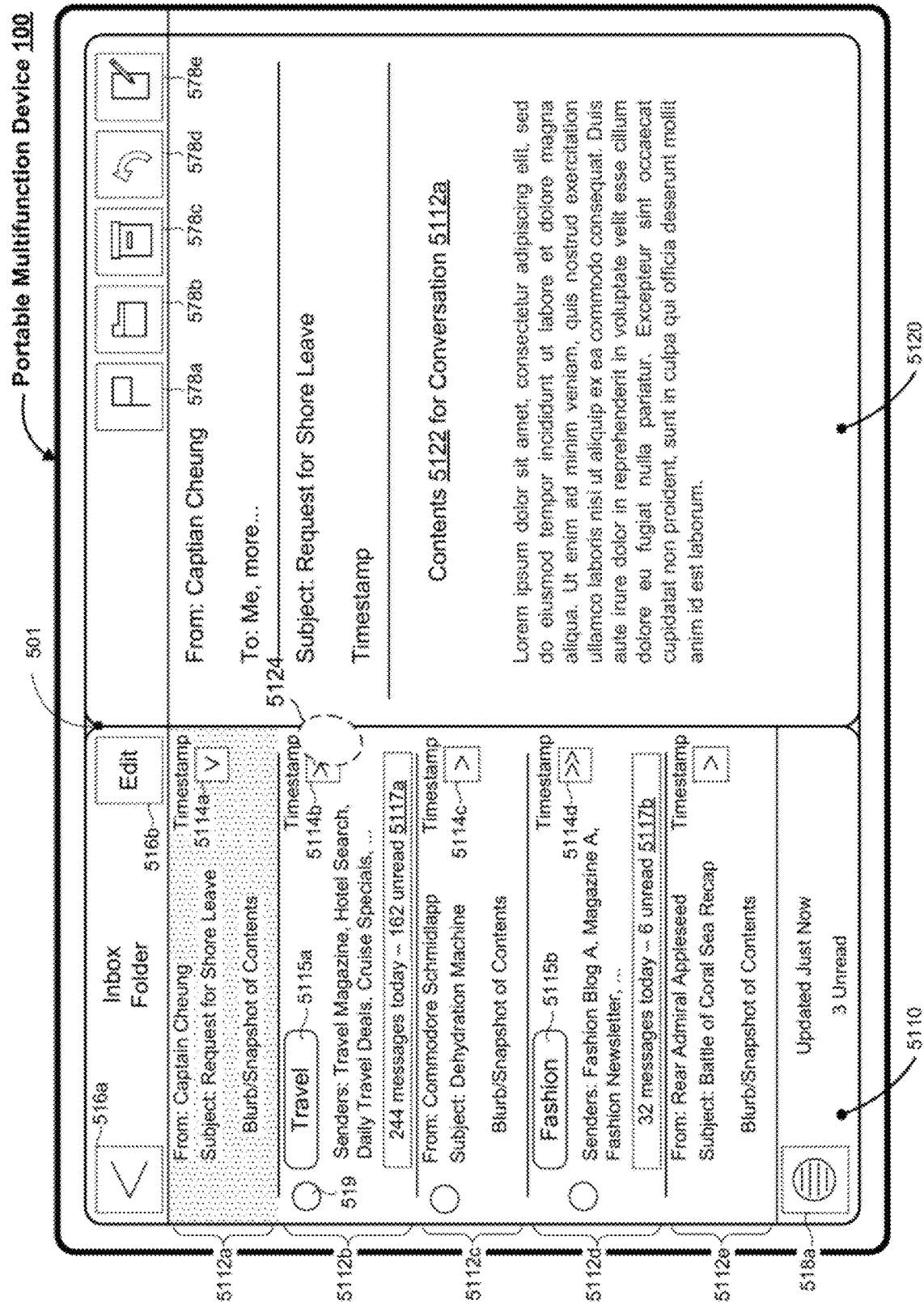
Figure 5O:
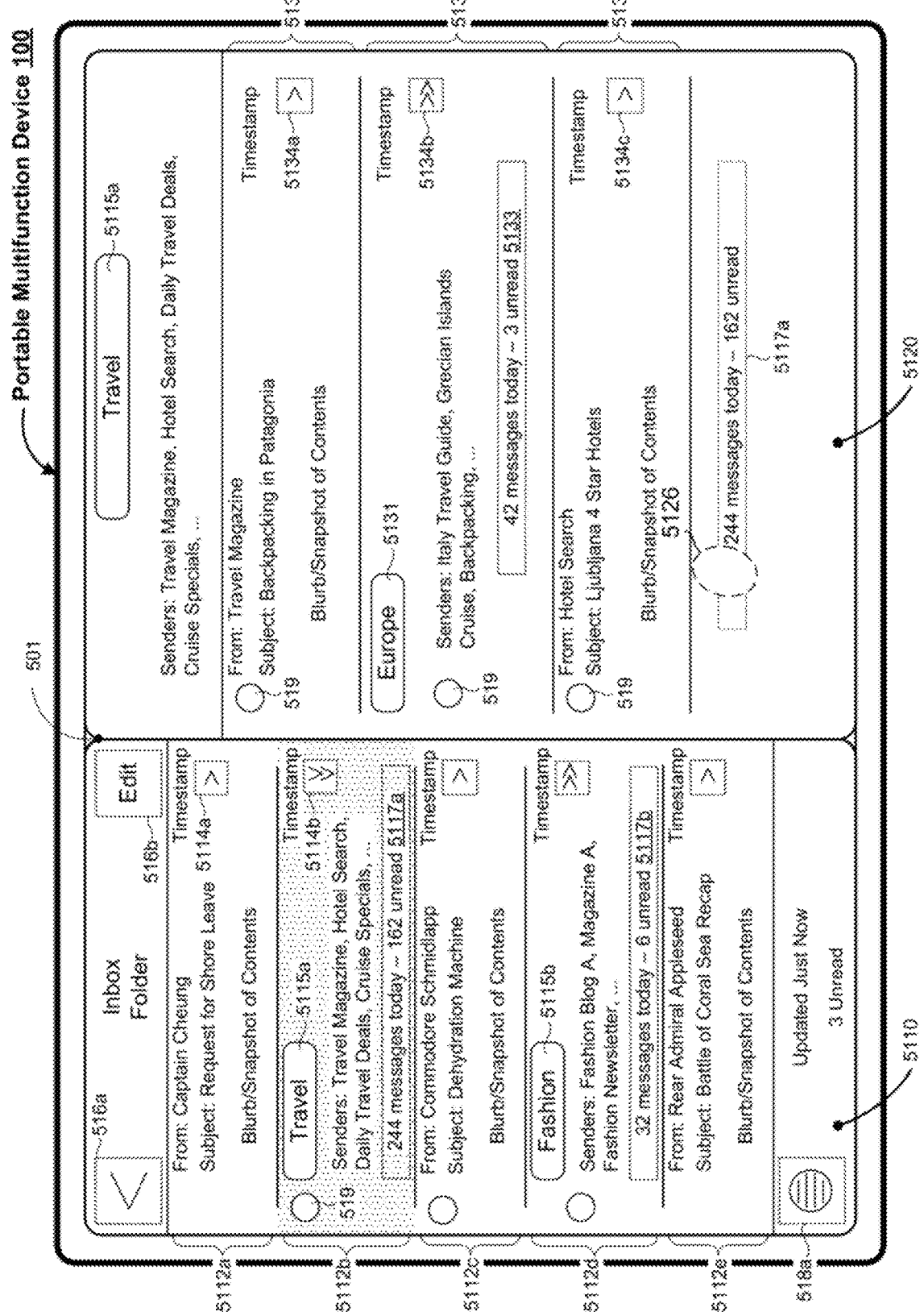
Figure 5P:
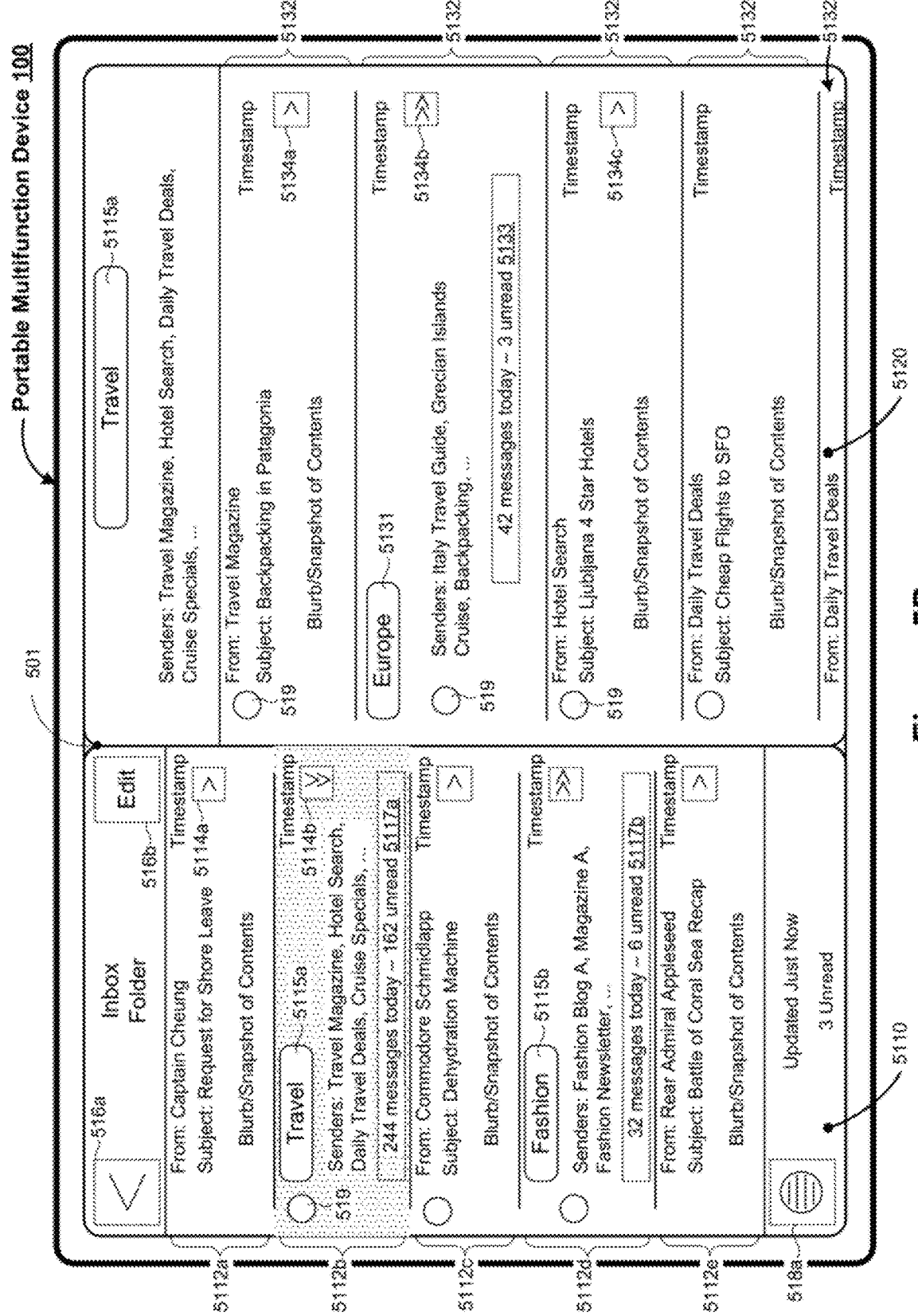
Figure 5Q:
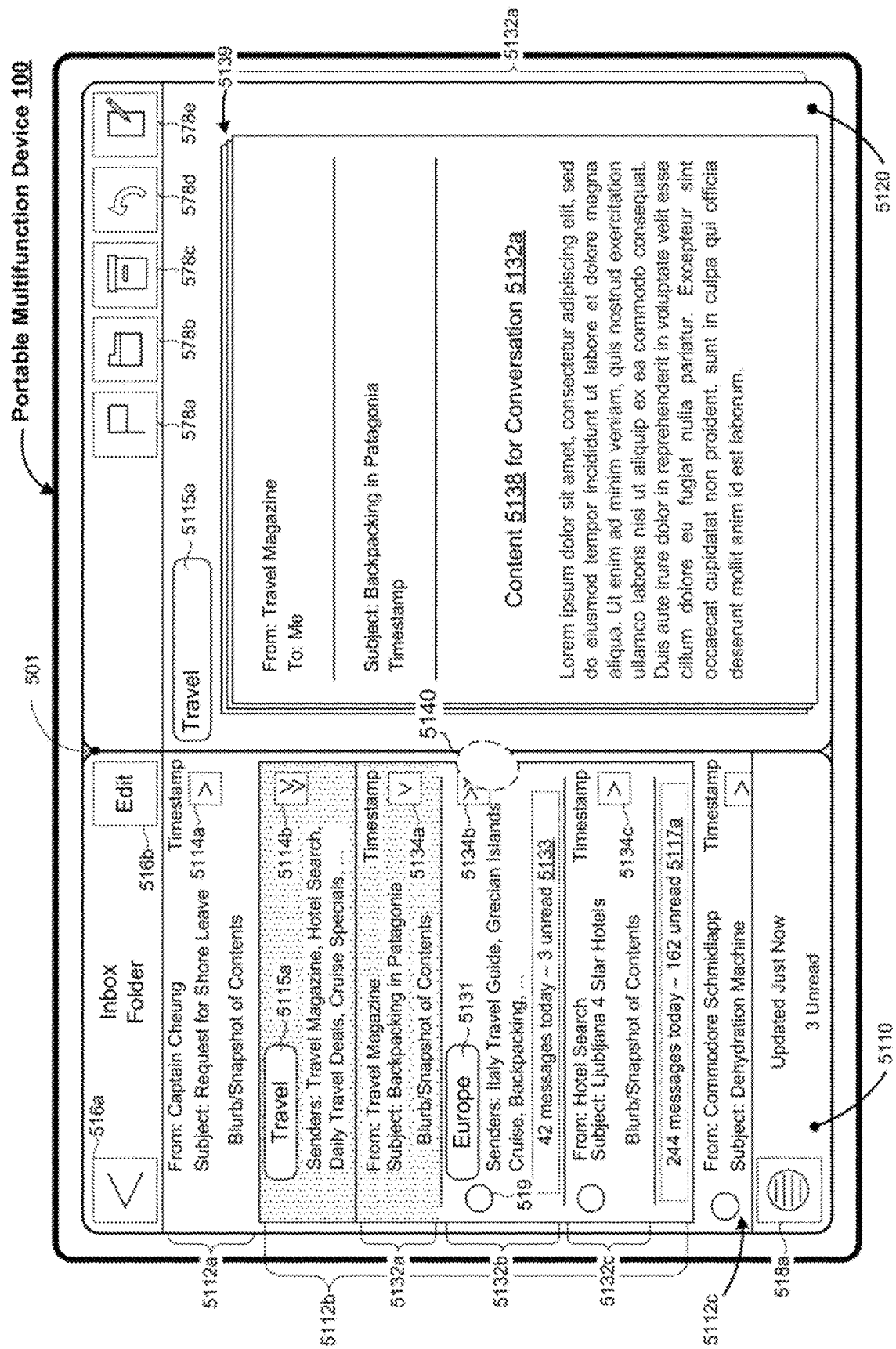
Figure 5R:
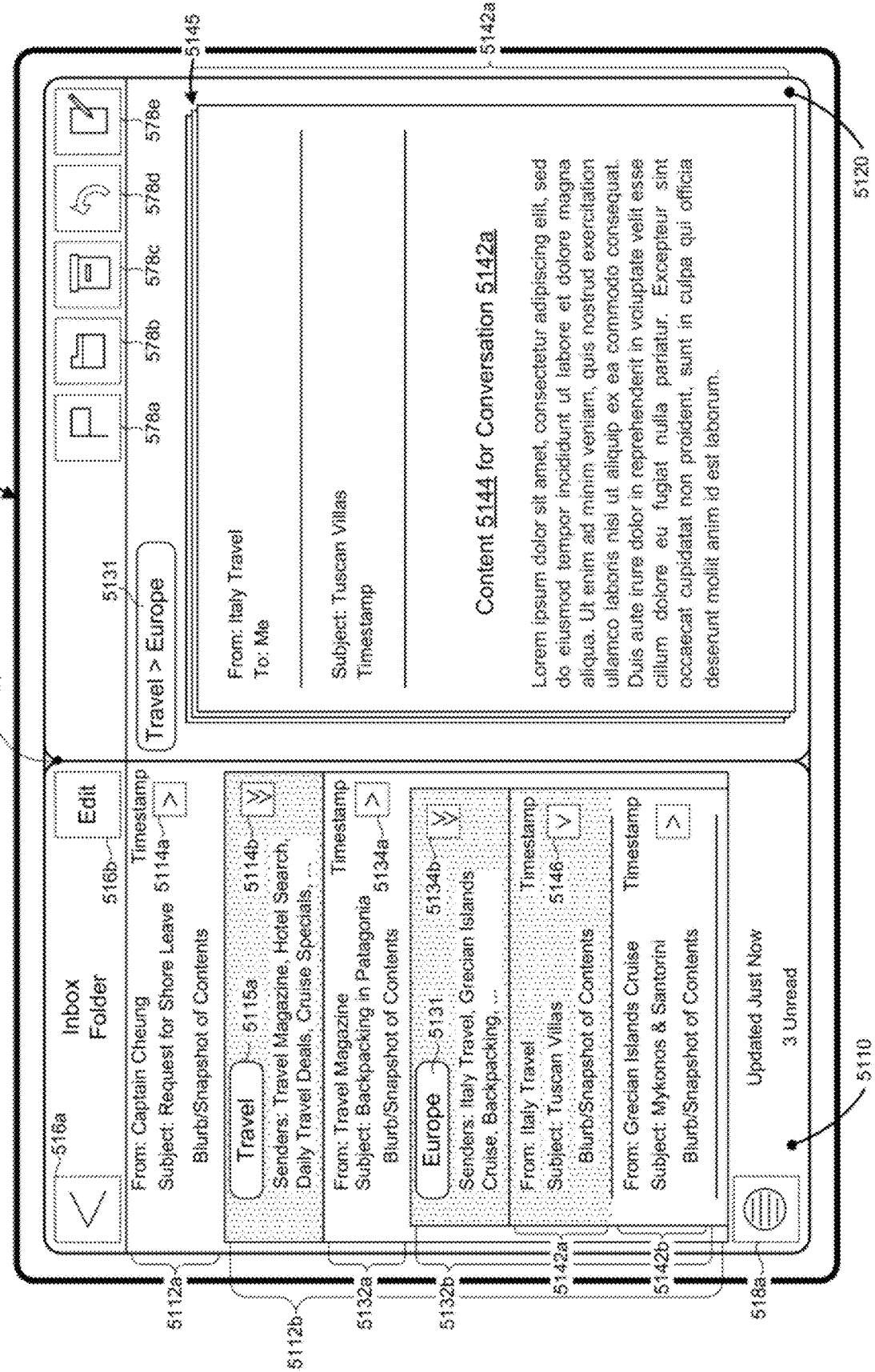

FIGS. 5A-5R illustrate example user interfaces for managing electronic communications in accordance with some embodiments. The user interfaces in these figures are used to illustrate the processes described below, including the processes in FIGS. 8A-8C and 9A-9C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates displaying a folder view 502 associated with an inbox folder within the display area 501 of the device 100. For example, the inbox folder is one of a plurality of folders associated with an electronic mail (email) and/or messaging application. In some embodiments, the inbox folder includes electronic communications to and/or from the user of the device 100. For example, the electronic communications include email conversations, email messages, instant message conversations, instant messages, SMSs, MMSs, talk-to-text, and/or the like. In some embodiments, the content displayed within the display area 501 corresponds to a grouping of electronic communications such as a specific folder, category, or tag. In some embodiments, the user of the device 100 is able to select between different groupings of electronic communications such as folders, categories, or tags.

As shown in FIG. 5A, the inbox folder view 502 includes: a back affordance 516a, which, when activated (e.g., with a contact), causes the inbox folder view 502 to be replaced with a previous view or pane; and an edit affordance 516b for marking, moving, and archiving electronic communications in the inbox folder. As shown in FIG. 5A, the inbox folder view 502 also includes: a filter affordance 518a, which, when activated (e.g., with a contact), causes the messages, conversations, and/or bundles associated with the inbox folder to be filtered according to a set of filter criteria or a filter pane to be displayed; and a draft affordance 518b, which, when activated (e.g., with a contact), causes the inbox folder view 502 to be replaced with an interface for drafting a new message.

As shown in FIG. 5A, the inbox folder view 502 further includes a plurality of rows in a condensed view mode. In some embodiments, a row represents a plurality of messages (e.g., electronic communications) that satisfy one or more conversation criteria (e.g., a conversation with one or more messages with similar subjects, content, senders, recipients, and/or the like). In some embodiments, a row represents a plurality of messages (e.g., electronic communications) that satisfy a category criterion (e.g., a bundle of promotional, finance, social activity, etc. messages). In some embodiments, a row represents a single message.

In FIG. 5A, the first row corresponds to a conversation 504a (e.g., with two messages). The first row includes: a timestamp of a most recently received message in the conversation 504a; the sender(s) of messages in the conversation 504a; the subject of the conversation 504a (e.g., "Apple Picking"); a blurb/snapshot of the contents of the conversation 504a; and a view mode affordance 514a, which, when activated (e.g., with a contact), causes the first row to change from the condensed view mode to an expanded view mode. For example, the double chevrons associated with the view mode affordance 514a indicate that the conversation 504a includes two or more messages. For example, the horizontal orientation of the chevrons associated with the view mode affordance 514a indicate that the first row associated with the conversation 504a is displayed in the condensed view mode. The first row also includes an icon 519 indicating that the conversation 504a includes one or more unread messages.

In FIG. 5A, the second row corresponds to a bundle of messages 504b associated with an updates criterion 515. The second row includes: a timestamp of a most recently received message in the bundle of messages 504b; the sender(s) of messages in the bundle of messages 504b; and a view mode affordance 514b, which, when activated (e.g., with a contact), causes the second row to change from the condensed view mode to an expanded view mode.

In FIG. 5A, the second row also includes a messages affordance 517 indicating the total number of messages included in the bundle of messages 504b received today and the number of unread messages included in the bundle of messages 504b. In some embodiments, when activated (e.g., with a contact), the messages affordance 517 causes display of all messages included in the bundle of messages 504b (e.g., FIGS. 5O-5P). In some embodiments, when activated (e.g., with a contact), the messages affordance 517 causes display of the unread messages included in the bundle of messages 504b. For example, the double chevrons associated with the view mode affordance 514b indicate that the bundle of messages 504b includes two or more messages. For example, the horizontal orientation of the chevrons associated with the view mode affordance 514b indicate that the second row associated with the bundle of messages 504b is displayed in the condensed view mode. The second row further includes an icon 519 indicating that the bundle of messages 504b includes one or more unread messages.

As shown in FIG. 5A, the third row corresponds to a conversation 504c (e.g., with one message), and the fourth row corresponds to a conversation 504d (e.g., with one message). The third and fourth rows are similar to and adapted from the first row. As such, the third and fourth rows are not described for the sake of brevity. In FIG. 5A, the third row includes a view mode affordance 514c, which, when activated (e.g., with a contact), causes the third row to change from the condensed view mode to an expanded view mode. For example, the single chevron associated with the view mode affordance 514c indicates that the conversation 504c includes a single message. For example, the horizontal orientation of the chevron associated with the view mode affordance 514c indicates that the third row associated with the conversation 504c is displayed in the condensed view mode.

FIGS. 5A-5B illustrate a sequence in which additional information (e.g., the conversation view 532) for a first plurality of messages that satisfy one or more conversation criteria (e.g., the conversation 504a) replaces display of an inbox folder view 502. FIG. 5A also illustrates detecting a contact 520 at a location corresponding to the view mode affordance 514a.

In some embodiments, in response to selection of the view mode affordance 514a (e.g., FIG. 5A), the first row associated with the conversation 504a changes from the condensed view to an expanded view with additional information corresponding to two or more messages from the conversation 504a of related messages that are represented by the first row. In some embodiments, in response to selection of a view mode affordance in the first row displayed in the inbox folder region/pane (e.g., FIG. 6A), additional information corresponding to two or more messages from the conversation of related messages that are represented by the first row is displayed. In some embodiments, the additional information is displayed in a conversation view 532 that replaces the inbox folder view 502 (e.g., FIG. 5B). In some embodiments, the additional information is displayed inline in the inbox folder view 502 (e.g., FIG. 5C). In some embodiments, the additional information is displayed in an adjacent content region/pane (e.g., FIG. 6B).

FIG. 5B illustrates replacing display of the inbox folder view 502 with a conversation view 532 with messages 534a and 534b associated with the conversation 504a in response to selection of the view mode affordance 514a in FIG. 5A. As such, the first row associated with the conversation 504a changes from the condensed view in FIG. 5A to the expanded view in FIG. 5B with additional information corresponding to two or more messages from the conversation 504a.

As shown in FIG. 5B, the conversation view 532 includes a plurality of rows in the condensed view mode. For example, in FIG. 5B, each of the rows corresponds to a message included in the conversation 504a. For example, the conversation 504a includes messages 534a and 534b, which satisfy the one or more conversation criteria (e.g., similar subjects, content, senders, recipients, and/or the like).

In FIG. 5B, the first row corresponds to the message 534a. The first row includes: a timestamp for the message 534a; the sender of the message 534a; the subject of the message 534a; a blurb/snapshot of the contents of the message 534; and a view mode affordance 544a, which, when activated (e.g., with a contact), causes the first row to change from the condensed view mode to an expanded view mode (e.g., showing the full contents of the message 534a). The first row also includes an icon 519 indicating that the message 534a is unread.

In FIG. 5B, the second row corresponds to the message 534b. The second row includes: a timestamp for the message 534b; the sender of the message 534b; the subject of the message 534b; a blurb/snapshot of the contents of the message 534b; and a view mode affordance 544b, which, when activated (e.g., with a contact), causes the first row to change from the condensed view mode to an expanded view mode (e.g., showing the full contents of the message 534b). The second row also includes an icon 519 indicating that the message 534b is unread.

FIG. 5A and FIG. 5C illustrate another sequence in which additional information for a first plurality of messages that satisfy one or more conversation criteria (e.g., the conversation 504a) is displayed inline in the inbox folder view 502. FIG. 5C illustrates displaying messages 534a and 534b associated with the conversation 504a inline in the inbox folder view 502 in response to selection of the view mode affordance 514a in FIG. 5A. As such, the first row associated with the conversation 504a changes from the condensed view in FIG. 5A to the expanded view in FIG. 5C with additional information corresponding to two or more messages from the conversation 504a.

FIG. 5C is similar to and adapted from FIG. 5B. As such, FIG. 5B and FIG. 5C include similar user interfaces and elements labeled with the same reference number in both figures have the same function, only the differences are described herein for the sake of brevity. For example, the conversation 504a includes the messages 534a and 534b, which satisfy the one or more conversation criteria (e.g., similar subjects, content, senders, recipients, and/or the like). As shown in FIG. 5C, the messages 534a and 534b are displayed inline in the inbox folder view 502. For example, the vertical orientation of the chevrons associated with the view mode affordance 514*a* indicate that the first row associated with the conversation 504*a* is displayed in the expanded view mode.

FIGS. 5D-5E illustrate a sequence in which additional information (e.g., a bundle view 552) for a second plurality of messages that satisfy a first category criterion (e.g., the bundle of messages 504*b* associated with an updates criterion 515) replaces display of an inbox folder view 502. FIG. 5D is similar to and adapted from FIG. 5A. As such, FIG. 5A and FIG. 5D include similar user interfaces and elements labeled with the same reference number in both figures have the same function, only the differences are described herein for the sake of brevity. FIG. 5D illustrates detecting a contact 550 at a location corresponding to the view mode affordance 514*b*.

In some embodiments, in response to selection of the view mode affordance 514*b* (e.g., FIG. 5D), the second row associated with the bundle of messages 504*b* changes from the condensed view to an expanded view with additional information corresponding to two or more messages from the bundle of messages 504*b* represented by the second row. In some embodiments, in response to selection of the view mode affordance in the second row displayed in the inbox folder region/pane (e.g., FIG. 5N), additional information corresponding to two or more messages from the bundle of messages represented by the second row is displayed. In some embodiments, the additional information is displayed in a bundle view 552 that replaces the inbox folder view 502 (e.g., FIG. 5E). In some embodiments, the additional information is displayed inline in the inbox folder view 502 (e.g., FIG. 5F). In some embodiments, the additional information is displayed in an adjacent content region/pane (e.g., FIG. 5O).

FIG. 5E illustrates replacing display of the inbox folder view 502 with a bundle view 552 in response to detecting selection of the view mode affordance 514*b* in FIG. 5D. As such, the second row associated with the bundle of messages 504*b* changes from the condensed view in FIG. 5D to the expanded view in FIG. 5E with additional information corresponding to two or more messages from the bundle of messages 504*b*.

As shown in FIG. 5E, the bundle view 552 includes a plurality of rows in condensed view mode. For example, in FIG. 5E, each of the rows corresponds to a message included in the bundle of messages 504*b*. For example, the bundle of messages 504*b* at least includes messages 554*a*, 554*b*, and 554*c*, which satisfy a first category criterion associated with the updates criterion 515 (e.g., messages with content related to social media updates/notification).

In FIG. 5E, the first row corresponds to the message 554*a*. The first row includes: a timestamp for the message 554*a*; the sender of the message 554*a*; the subject of the message 554*a*; a blurb/snapshot of the contents of the message 554*a*; and a view mode affordance 564*a*, which, when activated (e.g., with a contact), causes the first row to change from the condensed view mode to an expanded view mode (e.g., showing the full contents of the message 554*a*). The first row also includes an icon 519 indicating that the message 554*a* is unread.

In FIG. 5E, the second row corresponds to the message 554*b*. The second row includes: a timestamp for the message 554*b*; the sender of the message 554*b*; the subject of the message 554*b*; a blurb/snapshot of the contents of the message 554*b*; and a view mode affordance 564*b*, which, when activated (e.g., with a contact), causes the second row to change from the condensed view mode to an expanded view mode (e.g., showing the full contents of the message 554*b*). The second row also includes an icon 519 indicating that the message 554*b* is unread.

In FIG. 5E, the third row corresponds to the message 554*c*. The third row includes: a timestamp for the message 554*c*; the sender of the message 554*c*; the subject of the message 554*c*; a blurb/snapshot of the contents of the message 554*c*; and a view mode affordance 564*c*, which, when activated (e.g., with a contact), causes the second row to change from the condensed view mode to an expanded view mode (e.g., showing the full contents of the message 554*c*). The third row also includes an icon 519 indicating that the message 554*c* is unread.

In FIG. 5E, the bundle view 552 also includes the messages affordance 517 indicating the total number of messages included in the bundle of messages 504*b* received today and the number of unread messages included in the bundle of messages 504*b*. In some embodiments, when activated (e.g., with a contact), the messages affordance 517 causes display of all messages included in the bundle of messages 504*b* (e.g., FIGS. 5O-5P). In some embodiments, when activated (e.g., with a contact), the messages affordance 517 causes display of the unread messages included in the bundle of messages 504*b*.

FIGS. 5D and 5F illustrate another sequence in which additional information for a second plurality of messages that satisfy a first category criterion (e.g., the bundle of messages 504*b* associated with an updates criterion 515) is displayed inline in the inbox folder view 502. FIG. 5F illustrates displaying the messages 554*a*, 554*b*, and 554*c* associated with the bundle of messages 504*b* inline in the inbox folder view 502 in response to detecting selection of the view mode affordance 514*b* in FIG. 5D. As such, the second row associated with the bundle of messages 504*b* changes from the condensed view in FIG. 5D to the expanded view in FIG. 5F with additional information corresponding to two or more messages from the bundle of messages 504*b*.

FIG. 5F is similar to and adapted from FIG. 5E. As such, FIG. 5E and FIG. 5F include similar user interfaces and elements labeled with the same reference number in both figures have the same function, only the differences are described herein for the sake of brevity. For example, the bundle of messages 504*b* at least includes the messages 554*a*, 554*b*, and 554*c*, which satisfy the updates criterion 515 (e.g., messages with content related to social media updates/notification). As shown in FIG. 5F, the messages 554*a*, 554*b*, and 554*c* are displayed inline in the inbox folder view 502. For example, the vertical orientation of the chevrons associated with view mode affordance 514*b* indicate that the second row associated with the bundle of messages 504*b* is displayed in the expanded view mode.

FIG. 5F also illustrates detecting a contact 565 at a location that corresponds to the message 554*a*. FIG. 5G illustrates replacing the inbox folder view 502 with a message view 572 for the message 554*a* in response to detecting selection of the message 554*a* in FIG. 5F. As shown in FIG. 5G, the message view 572 includes the contents 574 of the message 554*a*. The message view 572 also includes: a next message affordance 576*a*, which, when activated (e.g., with a contact), causes the message view 572 for the message 554*a* to be replaced with a message view for a next message in the inbox folder (e.g., the message 554*b*); and a previous message affordance 576*b*, which, when activated (e.g., with a contact), causes the message view 572 for the message 554*a* to be replaced with a message view for a previous message in the inbox folder (e.g., the conversation 504*a*). The message view 572 further includes: a flag affordance 578a for flagging the message 554a; a move folder affordance 578b for moving the message 554a from the inbox folder to another folder; an archive affordance 578c for archiving the message 554a; a reply affordance 578d for replying to or forwarding the message 554a; and a draft affordance 578e for drafting a new message.

FIGS. 5H-5J illustrate a sequence in which a filter pane 582 is displayed and the filter criteria are changed in response to detecting a user input associated with a second input type (e.g., a one finger long press gesture) on the filter affordance 518a. FIG. 5H is similar to and adapted from FIG. 5A. As such, FIG. 5A and FIG. 5H include similar user interfaces and elements labeled with the same reference number in both figures have the same function, only the differences are described herein for the sake of brevity. FIG. 5H illustrates detecting a one finger long press gesture with a contact 580 at a location corresponding to the filter affordance 518a.

FIG. 5I illustrates replacing display of the inbox folder view 502 with a filters pane 582 in response to selection of the filter affordance 518a with the one finger long press gesture in FIG. 5H. In FIG. 5I, the filters pane 582 includes: an inbox filter 586a, an important filter 586b, a VIP filter 586c, a flagged filter 586d, an unread filter 586e, a "To or CC" filter 586f, and an attachments filter 586g. As shown in FIG. 5I, the unread filter 586e is currently enabled as part of the set of filter criteria as indicated by the icon 588a associated with the unread filter 586e. In FIG. 5I, the filters pane 582 also includes: a done affordance 584, which, when activated (e.g., with a contact), causes the filter pane 582 to be replaced with the previous view/pane (e.g., the inbox folder view 502 in FIG. 5H); and create custom filter affordance 590 for creating and adding a custom filter to the filter pane 582. According to some embodiments, the filters pane 582 replaces display of the inbox folder view 502 when a one finger long press gesture is detected over the filter affordance 518a while the set of filter criteria are active (e.g., currently applied to the inbox folder).

FIG. 5I also illustrates detecting a contact 592 at a location corresponding to the important filter 586b. FIG. 5J illustrates that the important filter 586b is enabled as part of the set of filter criteria as indicated by the icon 588b associated with the important filter 586b in response to selection of the important filter 586b in FIG. 5I. FIG. 5J also illustrates detecting a contact 594 at a location corresponding to the done affordance 584.

FIG. 5K illustrates replacing display of the filter pane 582 with the inbox folder view 502 in response to selection of the done affordance 584 in FIG. 5J. FIG. 5K is similar to and adapted from FIG. 5H. As such, FIG. 5H and FIG. 5K include similar user interfaces and elements labeled with the same reference number in both figures have the same function, only the differences are described herein for the sake of brevity.

FIGS. 5K-5L illustrate a sequence in which filter criteria (e.g., the enabled filters) are applied to the inbox folder in response to detecting a user input associated with a first input type (e.g., a one finger tap gesture) on the filter affordance 518a. FIG. 5K also illustrates detecting a one finger tap gesture with a contact 596 at a location corresponding to the filter affordance 518a.

FIG. 5L illustrates replacing display of the inbox folder view 502 with a filtered inbox folder view 5114 in response to selection of the filter affordance 518a with the one finger tap in FIG. 5K. As shown in FIG. 5L, the filtered inbox folder view 5114 includes a plurality of rows in condensed view mode. According to some embodiments, each of the rows in FIG. 5L represents one or more messages (e.g., a bundle of messages, a conversation with a single message, or a conversation with a plurality of messages) that satisfy the set of filter criteria (e.g., the important filter 586b and the unread filter 586e). As such, in some embodiments, at least some of the messages shown in filtered inbox folder view 5114 are both unread and marked as important. In some embodiments, at least some of the messages shown in filtered inbox folder view 5114 are either unread or marked as important.

In FIG. 5L, the filtered inbox folder view 5114 includes: a conversation 504a, a conversation 504f, a conversation 504g, a conversation 504h, a conversation 504i, a conversation 504j, and a conversation 504k (partially occluded). As shown in FIG. 5L, the conversation 504a is separated from the conversation 504f by an expansion affordance 5102a. According to some embodiments, the expansion affordance 5102a indicates that a first set of one or more messages with timestamps between the timestamp associated with the conversation 504a and the timestamp associated with the conversation 504f have been elided. For example, the first set of one or more messages are elided due to not satisfying the set of filter criteria. When activated (e.g., with a contact), the expansion affordance 5102a causes the first set of one or more elided messages to be displayed between the conversation 504a and the conversation 504f.

Similarly, in FIG. 5L, the conversation 504i is separated from the conversation 504j by an expansion affordance 5102b. According to some embodiments, the expansion affordance 5102b indicates that a second set of one or more messages with timestamps between the timestamp associated with the conversation 504i and the timestamp associated with the conversation 504j have been elided. For example, the one or more messages are elided due to not satisfying the filter criteria. When activated (e.g., with a contact), the expansion affordance 5102b causes the second set of one or more elided messages to be displayed between the conversation 504i and the conversation 504j.

In FIG. 5L, the filtered inbox folder view 5114 also includes an indication 598 of the set of filters applied to the current folder (e.g., the important filter 586b and the unread filter 586e). In some embodiments, the indication 598 includes a text description of the set of filters applied to the current folder as shown in FIG. 5L. In some embodiments, the indication 598 includes one or more distinct icons associated with the filters in the set of filters applied to the current folder.

FIGS. 5L-5M illustrate a sequence in which elided messages are displayed within the filtered inbox folder view 5114. FIG. 5L further illustrates detecting a contact 5100 at a location corresponding to the expansion affordance 5102a. FIG. 5M illustrates displaying a first set of elided messages within the filtered inbox folder view 5114 in response to selection of the expansion affordance 5102a in FIG. 5L. As shown in FIG. 5M, the first set of elided messages corresponding to the conversations 504e, 504c, and 504d is displayed between the conversations 504a and 504f.

FIG. 5N illustrates displaying a dual-pane user interface associated with an electronic mail (email) and/or messaging application that includes a folders pane 5110 and a content pane 5120 within the display area 501 of the device 100. As shown in FIG. 5N, the folders pane 5110 corresponds to an inbox folder that includes electronic communications to and/or from the user of the device 100. For example, the electronic communications include email conversations, email messages, instant message conversations, instant messages, SMSs, MMSs, talk-to-text, and/or the like. In some embodiments, the content displayed within the folders pane 5110 corresponds to a grouping of electronic communications such as a specific folder, category, or tag. In some embodiments, the user of the device 100 is able to select between different groupings of electronic communications such as folders, categories, or tags.

As shown in FIG. 5N, the folders pane 5110 includes: a back affordance 516a, which, when activated (e.g., with a contact), causes the folders pane 5110 associated with the inbox folder to be replaced with a previous view or pane; and an edit affordance 516b for marking, moving, and archiving electronic communications in the inbox folder. As shown in FIG. 5N, the folders pane 5110 also includes a filter affordance 518a, which, when activated (e.g., with a contact), causes the messages, conversations, and/or bundles associated with the inbox folder to be filtered according to a set of filter criteria or a filter pane/menu to be displayed.

As shown in FIG. 5N, the folders pane 5110 further includes a plurality of rows corresponding to conversations with one or more message, bundles of messages, or single messages. In some embodiments, a row represents a plurality of messages (e.g., electronic communications) that satisfy one or more conversation criteria (e.g., a conversation with one or more messages with similar subjects, content, senders, recipients, and/or the like). In some embodiments, a row represents a plurality of messages (e.g., electronic communications) that satisfy a category criterion (e.g., a bundle of promotional, finance, social activity, etc. messages). In some embodiments, a row represents a single message.

In FIG. 5N, the first row in the folders pane 5110 corresponds to a conversation 5112a (e.g., with one message). The first row includes: a timestamp for the conversation 5112a; the sender of the conversation 5112a; the subject of the conversation 5112a (e.g., "Request for Shore Leave"); a blurb/snapshot of the contents of the conversation 5112a; and a view mode affordance 5114a, which, when activated (e.g., with a contact), causes the first row to change from the expanded view mode to the condensed view mode. For example, the single chevron associated with the view mode affordance 5114a indicates that the conversation 5112a includes one message. For example, the vertical orientation of the chevron associated with the view mode affordance 5112a indicates that the first row associated with the conversation 5112a is displayed in the expanded view mode (e.g., with the contents 5122 of the conversation 5112a shown in the content pane 5120).

In FIG. 5N, the second row in the folders pane 5110 corresponds to a bundle of messages 5112b associated with a travel criterion 5115a. The second row includes: a timestamp of a most recently received message in the bundle of messages 5112b; the sender(s) of messages in the bundle of messages 5112b; and a view mode affordance 5114b, which, when activated (e.g., with a contact), causes the second row to change from the condensed view mode to an expanded view mode.

In FIG. 5N, the second row also includes a messages affordance 5117a indicating the total number of messages included in the bundle of messages 5112b received today and the number of unread messages included in the bundle of messages 5112b. In some embodiments, when activated (e.g., with a contact), the messages affordance 5117a causes display of all messages included in the bundle of messages 5112b in the content pane 5120. In some embodiments, when activated (e.g., with a contact), the messages affordance 5117a causes display of the unread messages included in the bundle of messages 5112b in the content pane 5120. For example, the double chevrons associated with the view mode affordance 5114b indicate that the bundle of messages 5112b includes two or more messages. For example, the horizontal orientation of the chevrons associated with the view mode affordance 5114b indicate that the second row associated with the bundle of messages 5112b is displayed in the condensed view mode. The second row further includes an icon 519 indicating that the bundle of messages 5112b includes one or more unread messages.

In FIG. 5N, the third row in the folders pane 5110 corresponds to a conversation 5112c (e.g., with one message). The third row includes: a timestamp for the conversation 5112c; the sender of the conversation 5112c; the subject of the conversation 5112c (e.g., "Dehydration Machine"); a blurb/snapshot of the contents of the conversation 5112c; and a view mode affordance 5114c, which, when activated (e.g., with a contact), causes the third row to change from the expanded view mode to the condensed view mode. For example, the single chevron associated with the view mode affordance 5114c indicates that the conversation 5112c includes one message. For example, the horizontal orientation of the chevron associated with the view mode affordance 5112c indicates that the first row associated with the conversation 5112c is displayed in the condensed view mode. The first row also includes an icon 519 indicating that the conversation 5112c includes an unread message.

In FIG. 5N, the fourth row in the folders pane 5110 corresponds to a bundle of messages 5112d associated with a fashion criterion 5115b. The fourth row includes: a timestamp of a most recently received message in the bundle of messages 5112d; the sender(s) of messages in the bundle of messages 5112d; and a view mode affordance 5114d, which, when activated (e.g., with a contact), causes the fourth row to change from the condensed view mode to an expanded view mode.

In FIG. 5N, the fourth row also includes a messages affordance 5117b indicating the total number of messages included in the bundle of messages 5112d received today and the number of unread messages included in the bundle of messages 5112d. In some embodiments, when activated (e.g., with a contact), the messages affordance 5117b causes display of all messages included in the bundle of messages 5112d in the content pane 5120. In some embodiments, when activated (e.g., with a contact), the messages affordance 5117b causes display of the unread messages included in the bundle of messages 5112d in the content pane 5120. For example, the double chevrons associated with the view mode affordance 5114d indicate that the bundle of messages 5112d includes two or more messages. For example, the horizontal orientation of the chevrons associated with the view mode affordance 5114d indicate that the fourth row associated with the bundle of messages 5112d is displayed in the condensed view mode. The fourth row further includes an icon 519 indicating that the bundle of messages 5112d includes one or more unread messages.

In FIG. 5N, the fifth row in the folders pane 5110 corresponds to a conversation 5112e (e.g., with one message). The third row includes: a timestamp for the conversation 5112e; the sender of the conversation 5112e; the subject of the conversation 5112c (e.g., "Battle of the Coral Sea Recap"); and a blurb/snapshot of the contents of the conversation 5112e.

As shown in FIG. 5N, the content pane 5120 includes the contents 5122 of the message included in the conversation 5112a. In FIG. 5N, the content pane 5120 also includes: the flag affordance 578a for flagging the message included in the conversation 5112a; the move folder affordance 578b for moving the message included in the conversation 5112*a* from the inbox folder to another folder; the archive affordance 578*c* for archiving the message included in the conversation 5112*a*; the reply affordance 578*d* for replying to or forwarding the message included in the conversation 5112*a*; and the draft affordance 578*e* for drafting a new message.

FIGS. 5N-5O illustrate a sequence in which additional information for a second plurality of messages that satisfy a category criterion (e.g., a bundle of messages associated with the travel criterion 5115*a*) is displayed in the content pane 5120. FIG. 5N further illustrates detecting a contact 5124 at a location corresponding to the view mode affordance 5114*b*. FIG. 5O illustrates displaying additional information for the bundle of messages 5112*b* in the content pane 5120 in response to selection of the view mode affordance 5114*b* in FIG. 5N. FIG. 5O is similar to and adapted from FIG. 5N. A such, FIG. 5N and FIG. 5O include similar user interfaces and elements labeled with the same reference number in both figures have the same function, only the differences are described herein for the sake of brevity.

As shown in FIG. 5O, the content pane 5120 includes a plurality of rows in condensed view mode. For example, in FIG. 5O, each of the rows corresponds to messages included in the bundle of messages 5112*b*. For example, the bundle of messages 5112*b* at least includes the message 5132*a*, the sub-bundle of messages 5132*b*, and the message 5132*c*, which satisfy a category criterion associated with the travel criterion 5115*a* (e.g., messages with content related to travel, hotels, airplane tickets, etc.).

In FIG. 5O, the first row in the content pane 5120 corresponds to a message 5132*a*. The first row includes: a timestamp for the message 5132*a*; the sender of the message 5132*a*; the subject of the message 5132*a*; a blurb/snapshot of the contents of the message 5132*a*; and a view mode affordance 5134*a*, which, when activated (e.g., with a contact), causes the first row to change from the condensed view mode to an expanded view mode (e.g., showing the full contents of the message 5132*a* within the content pane 5120). The first row also includes an icon 519 indicating that the message 5132*a* is unread.

In FIG. 5O, the second row in the content pane 5120 corresponds to a sub-bundle of messages 5132*b*. For example, the sub-bundle of messages 5132*b* includes messages within the bundle of messages 5112*b* that satisfy a sub-category criterion associated with the Europe criterion 5131 (e.g., messages with content related to European travel, hotels, airplane tickets, etc.). The second row also includes view mode affordance 5134*b*, which, when activated (e.g., with a contact), causes the second row to change from the condensed view mode to an expanded view mode (e.g., showing the messages included in the sub-bundle of messages 5132*b* within the content pane 5120). The second row also includes an icon 519 indicating that one or more messages in the sub-bundle of messages 5132*b* are unread.

In FIG. 5O, the second row further includes a messages affordance 5133 indicating the total number of messages included in the sub-bundle of messages 5132*b* received today and the number of unread messages included in the sub-bundle of messages 5132*b*. In some embodiments, when activated (e.g., with a contact), the messages affordance 5133 causes display of all messages included in the sub-bundle of messages 5132*b* in the content pane 5120. In some embodiments, when activated (e.g., with a contact), the messages affordance 5133 causes display of the unread messages included in the sub-bundle of messages 5132*b* in the content pane 5120.

In FIG. 5O, the third row in the content pane 5120 corresponds to a message 5132*c*. The third row includes: a timestamp for the message 5132*c*; the sender of the message 5132*c*; the subject of the message 5132*c*; a blurb/snapshot of the contents of the message 5132*c*; and a view mode affordance 5134*c*, which, when activated (e.g., with a contact), causes the third row to change from the condensed view mode to an expanded view mode (e.g., showing the full contents of the message 5132*c*). The third row also includes an icon 519 indicating that the message 5132*c* is unread.

As shown in FIG. 5O, the content pane 5120 also includes the messages affordance 5117*a* indicating the total number of messages included in the bundle of messages 5112*b* received today and the number of unread messages included in the bundle of messages 5112*b*. In some embodiments, when activated (e.g., with a contact), the messages affordance 5117*a* causes display of all messages included in the bundle of messages 5112*b* in the content pane 5120. In some embodiments, when activated (e.g., with a contact), the messages affordance 5117*a* causes display of the unread messages included in the bundle of messages 5112*b* in the content pane 5120. FIG. 5O also illustrates detecting a contact 5126 at a location corresponding to the messages affordance 5117*a* within the content pane 5120.

In FIG. 5O, for example, the horizontal orientation of the chevron associated with the view mode affordance 5114*a* indicates that the first row associated with the conversation 5112*a* is displayed in the condensed view mode. For example, the vertical orientation of the chevrons associated with the view mode affordance 5114*b* indicate that the second row associated with the bundle of messages 5112*b* is displayed in the expanded view mode.

FIG. 5P illustrates displaying all messages for the bundle of messages 5112*b* within the content pane 5120 in response to selection of the messages affordance 5117*a* in FIG. 5O. FIG. 5P is similar to and adapted from FIG. 5O. As such, FIG. 5O and FIG. 5P include similar user interfaces and elements labeled with the same reference number in both figures have the same function, only the differences are described herein for the sake of brevity.

As shown in FIG. 5P, the content pane 5120 includes a plurality of rows in condensed view mode. In FIG. 5P, the rows in the content pane 5120 correspond to the message 5132*a*, the sub-bundle of messages 5132*b*, the message 5132*c*, the message 5132*d*, and the message 5132*e* (partially occluded), which satisfy a category criterion associated with the travel criterion 5115*a* (e.g., messages with content related to travel, hotels, airplane tickets, etc.).

FIG. 5N and FIG. 5Q illustrate another sequence in which additional information for a second plurality of messages that satisfy a category criterion (e.g., a bundle of messages associated with a travel criterion 5115*a*) is displayed in a content pane 5120. FIG. 5Q illustrates displaying additional information for the bundle of messages 5112*a* inline in the folders pane 5110 and also in the content pane 5120 in response to selection of the view mode affordance 5114*b* in FIG. 5N. FIG. 5Q is similar to and adapted from FIG. 5O. As such, FIG. 5O and FIG. 5Q include similar user interfaces and elements labeled with the same reference number in both figures have the same function, only the differences are described herein for the sake of brevity. As shown in FIG. 5Q, the conversation 5132*a* included in the bundle of messages 5112*a*, the sub-bundle of messages 5132*b* included in the bundle of messages 5112*a*, the conversation 5132*c* included in the bundle of messages 5112*a*, and the messages affordance 5117*a* are displayed inline in the folders pane 5110.

In FIG. 5Q, for example, the vertical orientation of the chevrons associated with the view mode affordance 5114*b* indicate that the bundle of messages 5112*b* is displayed in the expanded view mode (e.g., with additional information displayed inline in the folders pane 5110). For example, the vertical orientation of the chevron associated with the view mode affordance 5134*a* indicates that the conversation 5132*a* included in the bundle of messages 5112*b* is displayed in the expanded view mode (e.g., with contents 5138 displayed in the content pane 5120).

As shown in FIG. 5Q, the contents 5138 of the conversation 5132*a* are displayed in the content pane 5120. In FIG. 5Q, the conversation 5132*a* is displayed as a top message in stack of messages 5139 associated with the bundle of messages 5112*b* that satisfy the travel criterion 5115*a*.

FIGS. 5Q-5R illustrate a sequence in which additional information for a second plurality of messages that satisfy a sub-category criterion (e.g., a sub-bundle of messages associated with a Europe criterion 5131) is displayed in the content pane 5120. FIG. 5Q also illustrates detecting a contact 5140 at a location corresponding to the view mode affordance 5134*b* associated with the sub-bundle of messages 5132*b*. FIG. 5R illustrates displaying additional information for the sub-bundle of messages 5132*b* inline in the inbox folder pane 5110 and also in the content pane 5120 in response to selection of the view mode affordance 5134*b* in FIG. 5Q.

FIG. 5R is similar to and adapted from FIGS. 5O-5Q. As such, FIGS. 5O-5Q and FIG. 5R include similar user interfaces and elements labeled with the same reference number in both figures have the same function, only the differences are described herein for the sake of brevity. As shown in FIG. 5R, the conversation 5142*a* and the conversation 5142*b* included in the sub-bundle of messages 5132*b* are displayed inline in the folders pane 5110.

In FIG. 5R, for example, the vertical orientation of the chevrons associated with the view mode affordance 5114*b* indicate that the bundle of messages 5112*b* is displayed in the expanded view mode (e.g., with additional information displayed inline in the folders pane 5110). For example, the vertical orientation of the chevrons associated with the view mode affordance 5134*b* indicate that the sub-bundle of messages 5132*b* is displayed in the expanded view mode (e.g., with additional information displayed inline in the folders pane 5110). For example, the vertical orientation of the chevron associated with the view mode affordance 5114*6* indicates that the conversation 5142*a* included in the sub-bundle of messages 5132*b* is displayed in the expanded view mode (e.g., with the contents 5144 displayed in the content pane 5120).

As shown in FIG. 5R, the contents 5144 of the conversation 5142*a* included in the sub-bundle of messages 5132*b* are displayed in the content pane 5120. In FIG. 5R, the conversation 5142*a* is displayed as a top message in a stack of messages 5145 associated with the sub-bundle of messages 5132*b* that satisfy the Europe criterion 5131.

FIGS. 6A-6F illustrate example user interfaces for managing electronic communications in accordance with some embodiments. The user interfaces in these figures are used to illustrate the processes described below, including the processes in FIGS. 8A-8C and 9A-9C. Although some of the examples which follow will be given with reference to inputs on a touch-sensitive surface 451 that is separate from the display 450, in some embodiments, the device (e.g., the device 300) detects inputs on a touch-screen display (where the touch-sensitive surface and the display are combined), as shown in FIG. 4A.

Figure 6A:
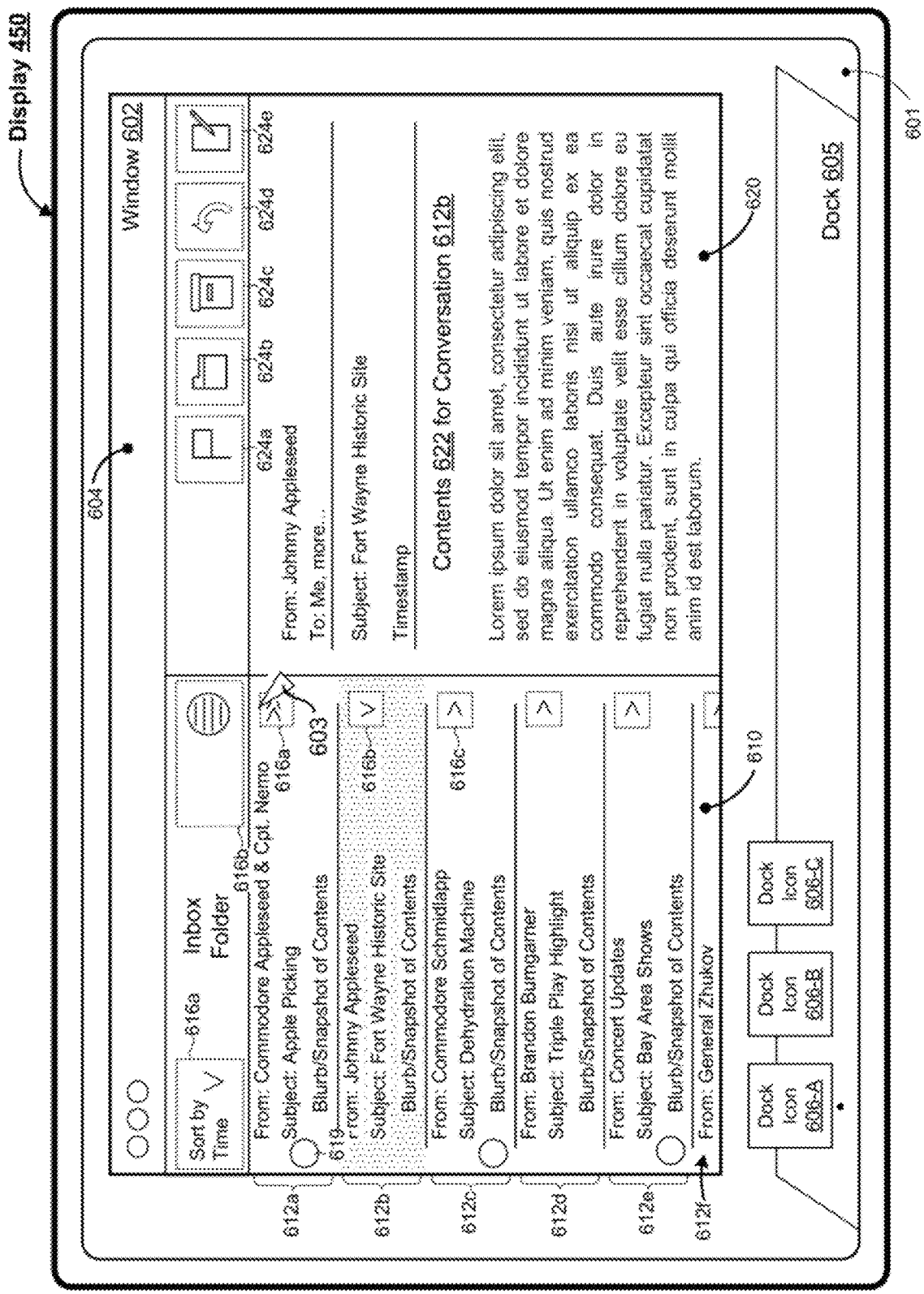
FIGS. 6A-6F illustrate example user interfaces for managing electronic communications in accordance with some embodiments.

FIG. 6A illustrates displaying a user interface including a window 602 and a dock 605 with a plurality of dock icons 606-A, 606-B, and 606-C for different applications within the display area 601. For example, the window 602 corresponds to associated an electronic mail (email) and/or messaging application. As shown in FIG. 6A, the window 602 includes a chrome region 604, a folders pane 610, and a content pane 620. In FIG. 6A, the folders pane 610 corresponds to an inbox folder that includes electronic communications to and/or from the user of the device. For example, the electronic communications include email conversations, email messages, instant message conversations, instant messages, SMSs, MMSs, talk-to-text, and/or the like. In some embodiments, the content displayed within the folders pane 610 corresponds to a grouping of electronic communications such as a specific folder, category, or tag. In some embodiments, the user of the device is able to select between different groupings of electronic communications such as folders, categories, or tags.

As shown in FIG. 6A, the folders pane 610 includes a plurality of rows corresponding to conversations 612*a*, 612*b*, 612*c*, 612*d*, 612*e*, and 612*f* (partially occluded) each with one or more messages. In FIG. 6A, the folders pane 610 also includes: a sorting affordance 616*a*, which indicates that the inbox folder is currently sorted in chronological order with the newest conversation first; and a filter affordance 616*b*, which indicates zero or more filters currently applied to the inbox folder (e.g., no filters are currently applied to the inbox folder in FIG. 6A). When activated (e.g., with a single or double click via the focus selector 603), the sorting affordance 616*a* causes the inbox folder to be re-sorted.

Figure 6B:
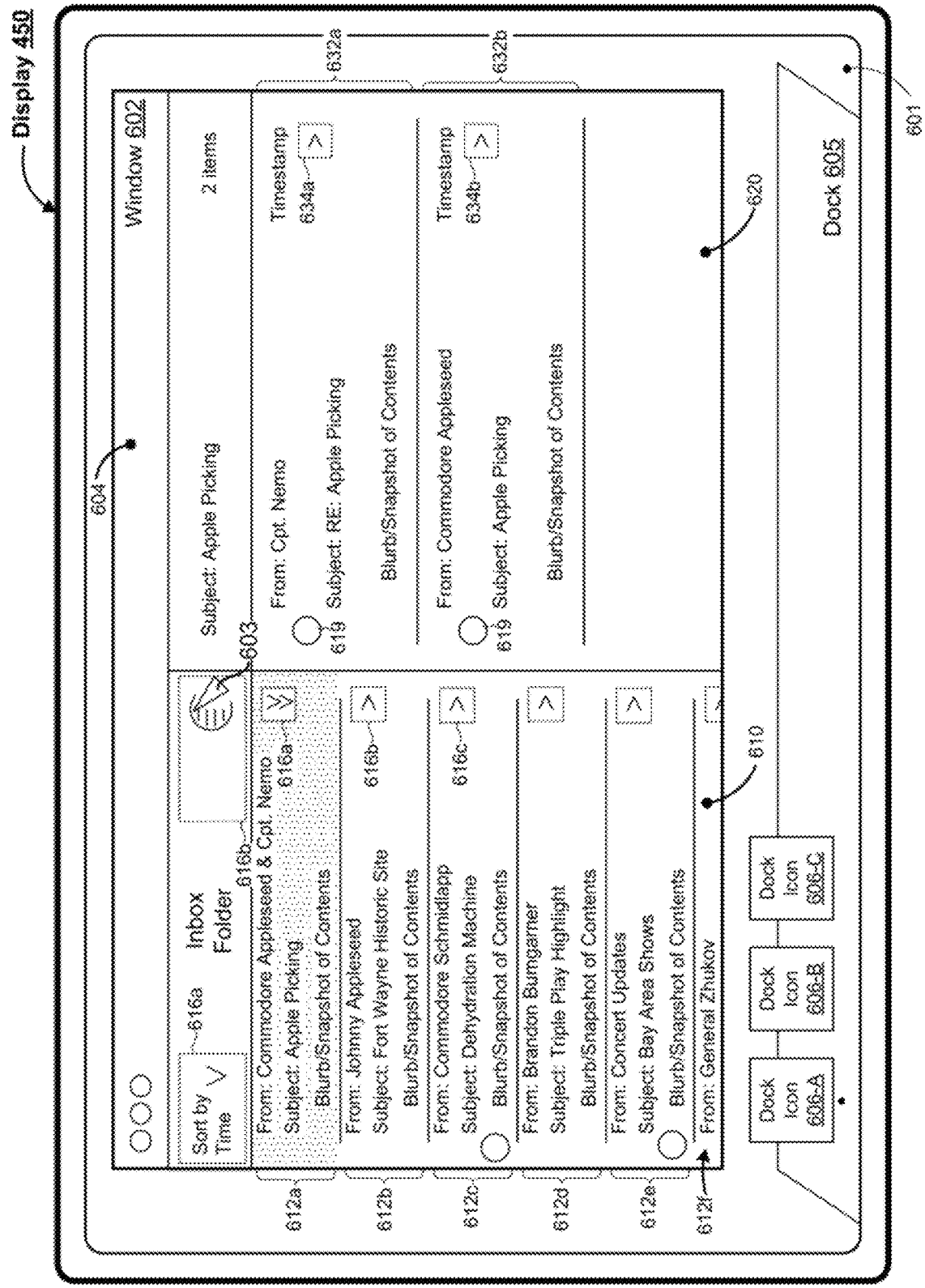

When activated with a first input type (e.g., with a single click via the focus selector 603), the filter affordance 616*b* causes the application of a set of filter criteria to the electronic communications in the inbox folder (if the set of filter criteria are currently deactivated as shown in FIGS. 6A-6B). When activated with a first input type (e.g., with a single click via the focus selector 603), the filter affordance 616*b* causes deactivation of a set of filter criteria applied to the electronic communications in the inbox folder (if the set of filter criteria are currently active as shown in FIGS. 6D-6E. When activated with a second input type (e.g., with a double click via the focus selector 603), the filter affordance 616*b* causes a filter menu to be overlaid on the window 602 (e.g., FIG. 6C).

In FIG. 6A, the first row in the folders pane 610 includes: a timestamp of a most recently received message in the conversation 612*a*; the sender(s) of messages in the conversation 612*a*; the subject of the conversation 612*a* (e.g., "Apple Picking"); a blurb/snapshot of the contents of the conversation 612*a*; and a view mode affordance 616*a*, which, when activated (e.g., with the focus selector 603), causes the first row to change from the condensed view mode to an expanded view mode (e.g., FIG. 6B). For example, the double chevrons associated with the view mode affordance 616*a* indicate that the conversation 612*a* includes two or more messages. For example, the horizontal orientation of the chevrons associated with the view mode affordance 616*a* indicate that the conversation 612*a* is displayed in the condensed view mode. The first row also includes an icon 619 indicating that the conversation 612*a* includes one or more unread messages.

In FIG. 6A, the second row in the folders pane 610 includes: a timestamp for the message associated with the conversation 612*b*; the sender of messages in the message associated with the conversation 612*b*; the subject of the message associated with the conversation 612*b* (e.g., "Fort Wayne Historic Site"); a blurb/snapshot of the contents of the message associated with the conversation 612b; and a view mode affordance 616b, which, when activated (e.g., with the focus selector 603), causes the second row to change from the expanded view mode to the condensed view mode. For example, the single chevron associated with the view mode affordance 616b indicates that the conversation 612b includes a single message. For example, the vertical orientation of the chevron associated with the view mode affordance 616b indicates that the conversation 612b is displayed in the expanded view mode (e.g., with the contents 622 of the conversation 612b displayed in the content pane 620).

In FIG. 6A, the third row in the folders pane 610 includes: a timestamp for the message associated with the conversation 612c; the sender of messages in the message associated with the conversation 612c; the subject of the message associated with the conversation 612c (e.g., "Dehydration Machine"); a blurb/snapshot of the contents of the message associated with the conversation 612c; and a view mode affordance 616c, which, when activated (e.g., with the focus selector 603), causes the second row to change from the condensed view mode to the expanded view mode (e.g., with the contents of the message associated with the conversation 612c in the content pane 620). For example, the single chevron associated with the view mode affordance 616c indicates that the conversation 612c includes a single message. For example, the horizontal orientation of the chevron associated with the view mode affordance 616c indicates that the conversation 612c is displayed in the condensed view mode.

As shown in FIG. 6A, the content pane 620 includes the content 622 of the message associated with the conversation 612b. In FIG. 6A, the content pane 620 also includes: a flag affordance 624a for flagging the message associated with the conversation 612b; a move folder affordance 624b for moving the message associated with the conversation 612b from the inbox folder to another folder; an archive affordance 624c for archiving the message associated with the conversation 612b; a reply affordance 624d for replying to or forwarding the message associated with the conversation 612b; and a draft affordance 624e for drafting a new message.

FIGS. 6A-6B illustrate a sequence in which additional information for a first plurality of messages that satisfy one or more conversation criteria (e.g., the conversation 612a) is displayed in a content pane 620. FIG. 6A also illustrates displaying the focus selector 603 at a location corresponding to the view mode affordance 616a. FIG. 6B illustrates replacing display of the content 622 of the message associated with the conversation 612b in the content pane 620 with the messages 632a and 632b associated with the conversation 612a in response to selection of the view mode affordance 616a in FIG. 6A. As shown in FIG. 6B, the content pane 620 includes a plurality of rows corresponding to the messages 632a and 632b.

In FIG. 6B, the first row in the content pane 620, corresponding to the message 632a, includes: a timestamp for the message 632a; the sender of the message 632a; the subject of the message 632a; a blurb/snapshot of the contents of message 632a; and a view mode affordance 634a, which, when activated (e.g., with the focus selector 603), causes the first row to change from the condensed view mode to an expanded view mode (e.g., showing the full contents of the message 632a in the content pane 620). The first row also includes an icon 619 indicating that the message 632a is unread.

In FIG. 6B, the second row in the content pane 620, corresponding to the message 632b, includes: a timestamp for the message 632b; the sender of the message 632b; the subject of the message 632b; a blurb/snapshot of the contents of the message 632b; and a view mode affordance 634b, which, when activated (e.g., with the focus selector 603), causes the first row to change from the condensed view mode to an expanded view mode (e.g., showing the full contents of the message 632b in the content pane 620). The second row also includes an icon 619 indicating that the message 634b is unread.

In FIG. 6B, for example, the vertical orientation of the chevrons associated with the view mode affordance 616a indicates that the conversation 612a is displayed in the expanded view mode. For example, the horizontal orientation of the chevron associated with the view mode affordance 616b indicates that the conversation 612b is displayed in the condensed view mode.

Figure 6C:
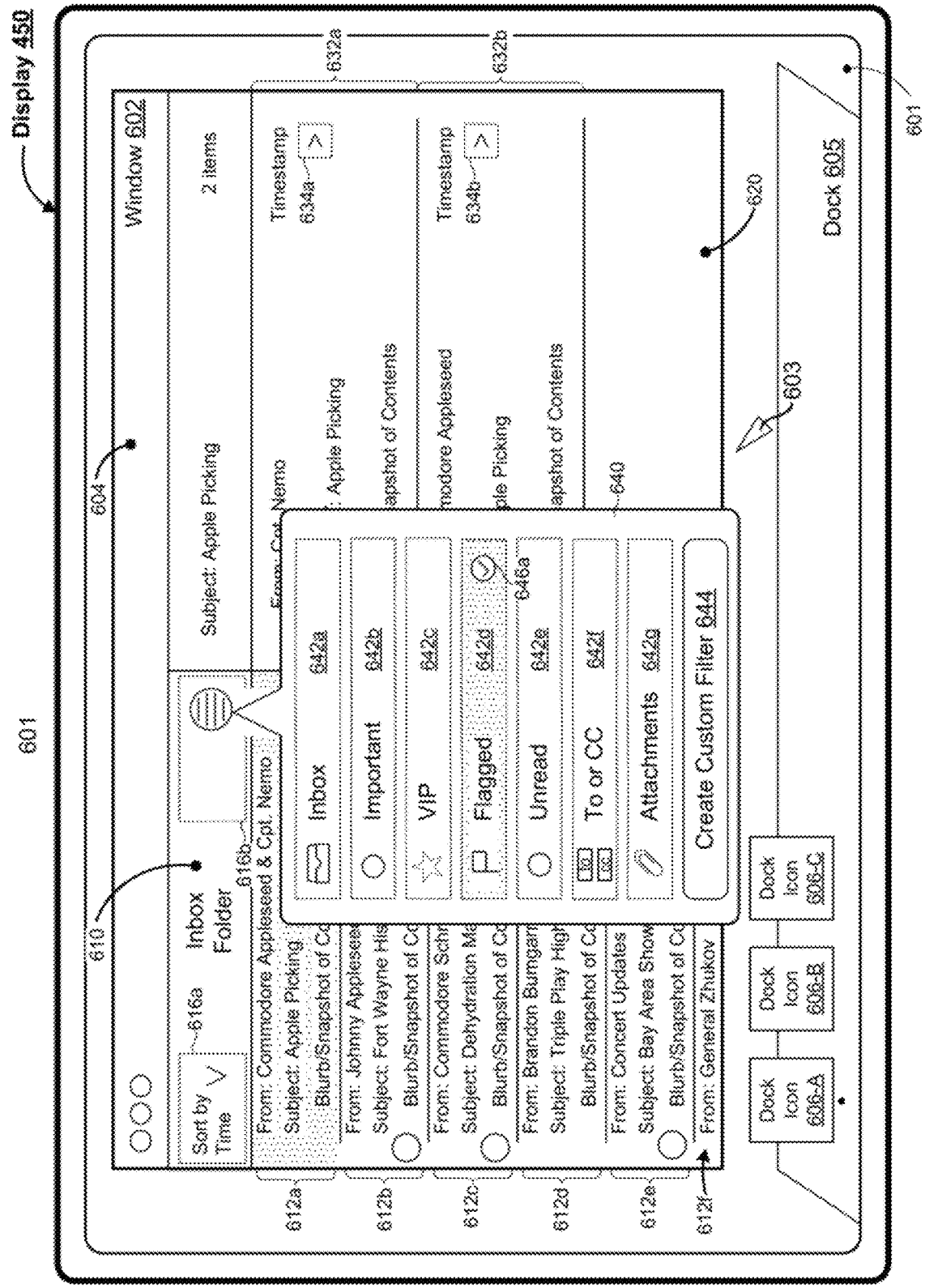
Figure 6D:
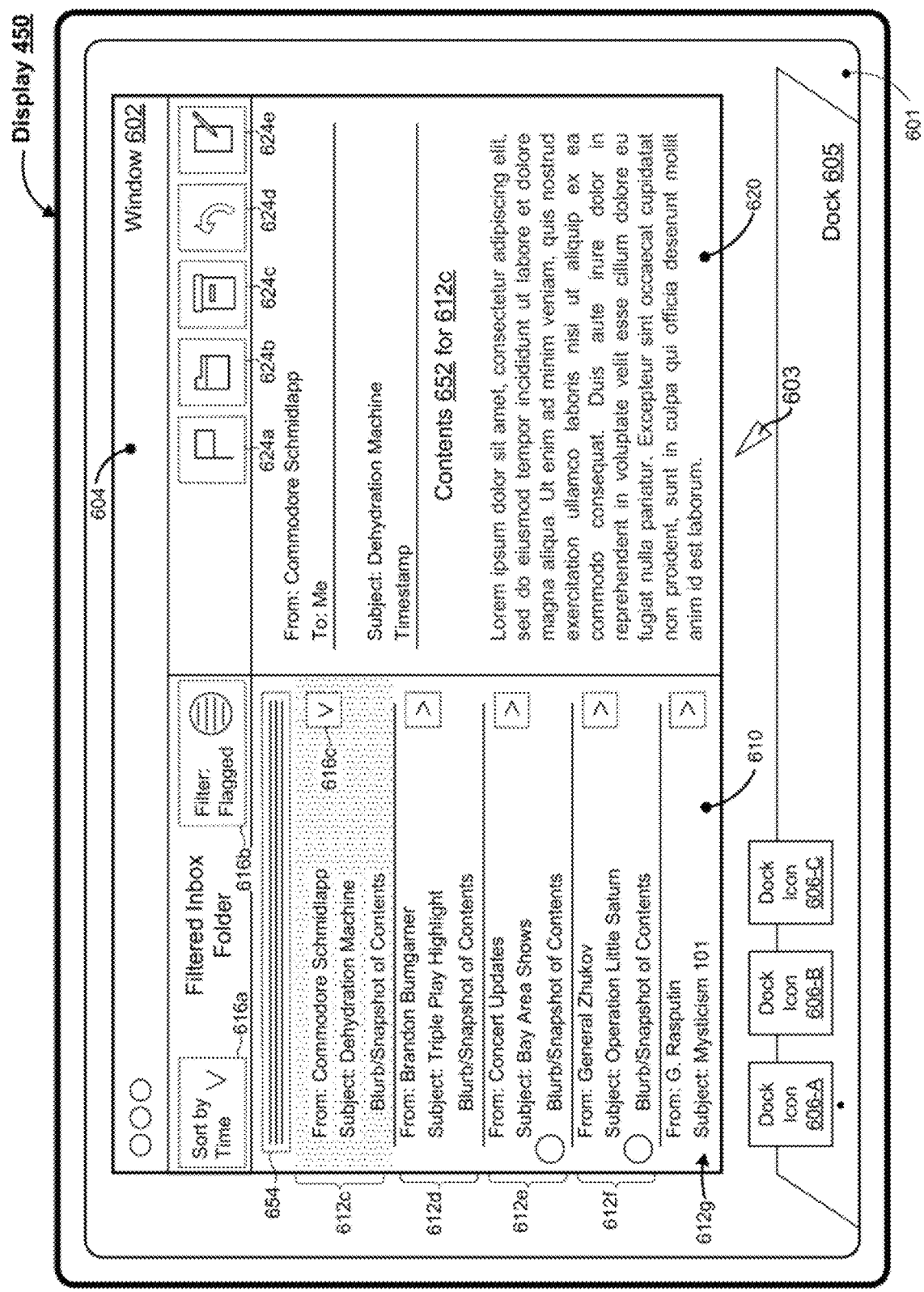
Figure 6E:
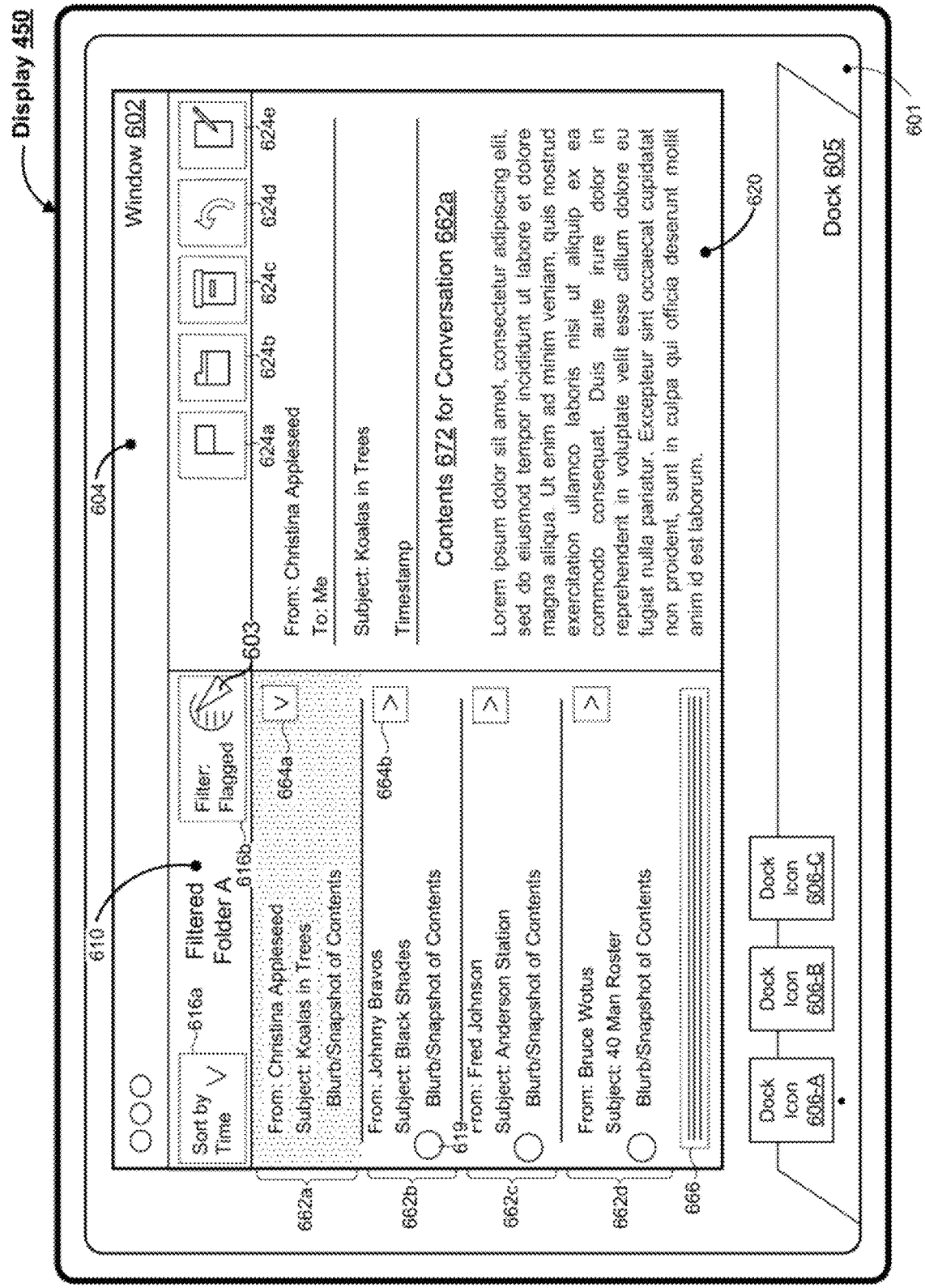

FIGS. 6B-6C illustrate a sequence in which a filter menu 640 is displayed in response to detecting selection of the filter affordance 616b with a second input type (e.g., a double click with the focus selector 603). FIG. 6B also illustrates displaying the focus selector 603 at a location corresponding to the filter affordance 616b. FIG. 6C illustrates displaying a filters menu 640 overlaid on the window 602 in response to selection of the filter affordance 616b with a second input type (e.g., a double click with the focus selector 603) in FIG. 6B. FIG. 6C is similar to and adapted from FIG. 6B. As such, FIG. 6B and FIG. 6B include similar user interfaces and elements labeled with the same reference number in both figures have the same function, only the differences are described herein for the sake of brevity.

As shown in FIG. 6C, the filters menu 640 includes: an inbox filter 642a, an important filter 642b, a VIP filter 642c, a flagged filter 642d, an unread filter 642e, a "To or CC" filter 642f, and an attachments filter 642g. As shown in FIG. 6C, the flagged filter 642d is currently enabled as part of the filter criteria as indicated by the icon 646a associated with the flagged filter 642d. In FIG. 6C, filters menu 640 also includes a create custom filter affordance 644 for creating and adding a custom filter to the filters menu 640. According to some embodiments, the filters menu 640 is overlaid on the window 602 when a one finger long press gesture is detected over the filter affordance 616b while the set of filter criteria are active (e.g., currently applied to the inbox folder).

FIG. 6B and FIG. 6D illustrate a sequence in which filter criteria are applied to the inbox folder in response to detecting selection of the filter affordance 616b with a first input type (e.g., a single click with the focus selector 603). FIG. 6D illustrates displaying a filtered inbox folder in the folders pane 610 in response to detecting selection of the filter affordance 616b with the first input type (e.g., a single click with the focus selector 603) in FIG. 6B. As shown in FIG. 6D, the filtered inbox folder includes a plurality of conversations 612c, 612d, 612e, 612f, and 612g (partially occluded) that satisfy the set of filter criteria (e.g., the flagged filter 642d). As such, according to some embodiments, the conversations 612c, 612d, 612e, 612f, and 612g (e.g., with one or more messages) shown in filtered inbox folder in the folders pane 610 include one or more flagged messages.

As shown in FIG. 6D, the folders pane 610 includes an expansion affordance 654 above the conversation 612c. According to some embodiments, the expansion affordance 654 indicates that a set of one or more messages with timestamps before the timestamp associated with the conversation 612c have been elided. For example, the set of one or more messages are elided due to not satisfying the set of filter criteria (e.g., the flagged filter 642d). When activated (e.g., with the focus selector 603), the expansion affordance 654 causes the set of one or more elided messages to be displayed above the conversation 612c.

In FIG. 6D, the filter affordance 616b includes an indication of the set of filters applied to the current folder (e.g., the flagged filter 642d). In some embodiments, the indication includes a text description of the set of filters applied to the current folder as shown in FIG. 6D. In some embodiments, the indication includes one or more distinct icons for the set of filters applied to the current folder.

As shown in FIG. 6D, the content pane 620 includes the contents 652 associated with the conversation 612c. In FIG. 6D, for example, the vertical orientation of the chevron associated with the view mode affordance 616c indicates that the conversation 612c is displayed in the expanded view mode (e.g., the contents 652 associated with the conversation 612c are displayed in the content pane 620).

For example, a user of the device changes the active folder in the folder pane 610 from the inbox folder to folder A. Continuing with this example, FIG. 6E illustrates displaying filtered folder A in the folders pane 610 in response to switching the active folder. Moreover, the set of filter criteria (e.g., the flagged filter 642d) are applied to folder A after switching the active folder.

As shown in FIG. 6E, the filtered folder A includes a plurality of conversations 662a, 662b, 662c, and 662d that satisfy the set of filter criteria (e.g., the flagged filter 642d). As such, in some embodiments, the conversations 662a, 662b, 662c, and 662d (e.g., with one or more messages) include one or more flagged messages. FIG. 6E also illustrates displaying the contents 672 of the conversation 662a in the content pane 620.

In FIG. 6E, the first row in the folders pane 610 includes: a timestamp for the message associated with the conversation 662a; the sender of the message associated with the conversation 662a; the subject of the conversation 662a (e.g., "Koalas in Trees"); a blurb/snapshot of the contents of the conversation 662a; and a view mode affordance 664a, which, when activated (e.g., with the focus selector 603), causes the first row to change from the expanded view mode to the condensed view mode. For example, the single chevron associated with the view mode affordance 664a indicates that the conversation 662a includes a single message. For example, the vertical orientation of the chevron associated with the view mode affordance 664a indicates that the conversation 662a is displayed in the expanded view mode (e.g., with the contents 672 displayed in the content pane 620).

In FIG. 6E, the second row in the folders pane 610 includes: a timestamp for the message associated with the conversation 662b; the sender of the message associated with the conversation 662b; the subject of the message associated with the conversation 662b (e.g., "Black Shades"); a blurb/snapshot of the contents of the message associated with the conversation 662b; and a view mode affordance 664b, which, when activated (e.g., with the focus selector 603), causes the second row to change from the condensed view mode to the expanded view mode (e.g., with the contents of the message associated with the conversation 662b displayed in the content pane 620). For example, the single chevron associated with the view mode affordance 664b indicates that the conversation 662b includes a single message. For example, the horizontal orientation of the chevron associated with the view mode affordance 664b indicates that the conversation 662b is displayed in the condensed view mode. The second row also includes an icon 619 indicating that the conversation 662b includes one or more unread messages.

As shown in FIG. 6E, the folders pane 610 includes an expansion affordance 666 below the conversation 662d. According to some embodiments, the expansion affordance 666 indicates that a set of one or more messages with timestamps after the timestamp associated with the conversation 662d have been elided. For example, the set of one or more messages are elided due to not satisfying the set of filter criteria (e.g., (e.g., the flagged filter 642d). When activated (e.g., with the focus selector 603), the expansion affordance 666 causes the set of one or more elided messages to be displayed below the conversation 662d.

Figure 6F:
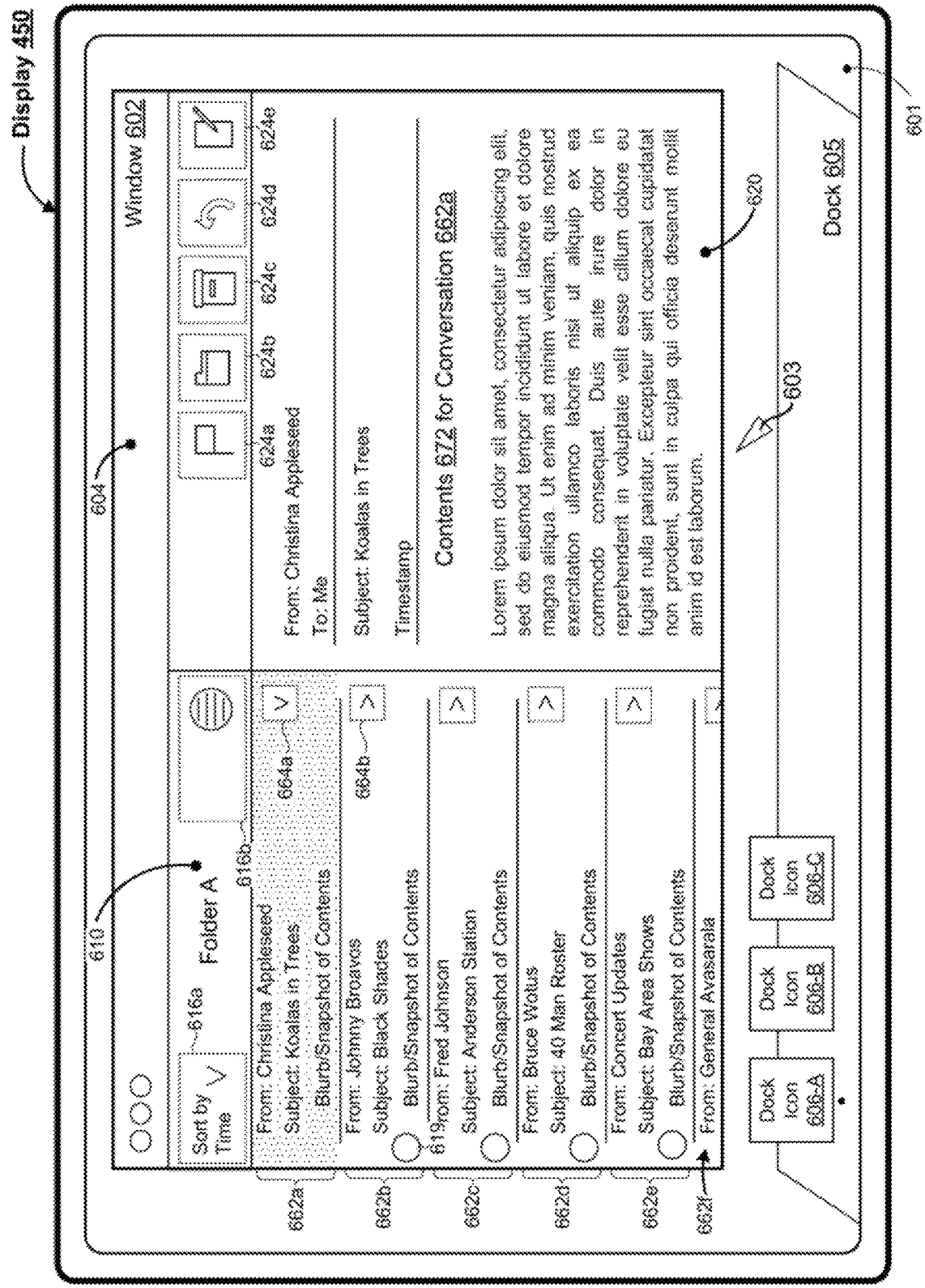

FIG. 6E-6F illustrate a sequence in which the filter criteria are deactivated. FIG. 6E further illustrates displaying the focus selector 603 at a location corresponding to the filter affordance 616b. FIG. 6F illustrates disabling the set of filter criteria and displaying folder A in the folders pane 610 in response to detecting selection of the filter affordance 616b with the first input type (e.g., a single click with the focus selector 603) in FIG. 6E.

FIG. 6F is similar to and adapted from FIG. 6E. A such, FIG. 6E and FIG. 6F include similar user interfaces and elements labeled with the same reference number in both figures have the same function, only the differences are described herein for the sake of brevity. In FIG. 6F, the filter affordance 616b indicates that no filters are currently applied to folder A, as compared to FIG. 6E where the flagged filter 642d is applied to folder A. As shown in FIG. 6F, the folders pane 610 includes conversations 662a, 662b, 662c, 662d, 662e, and 662f (partially occluded) and does not include the expansion affordance 666, as compared to FIG. 6E.

Figure 7A:
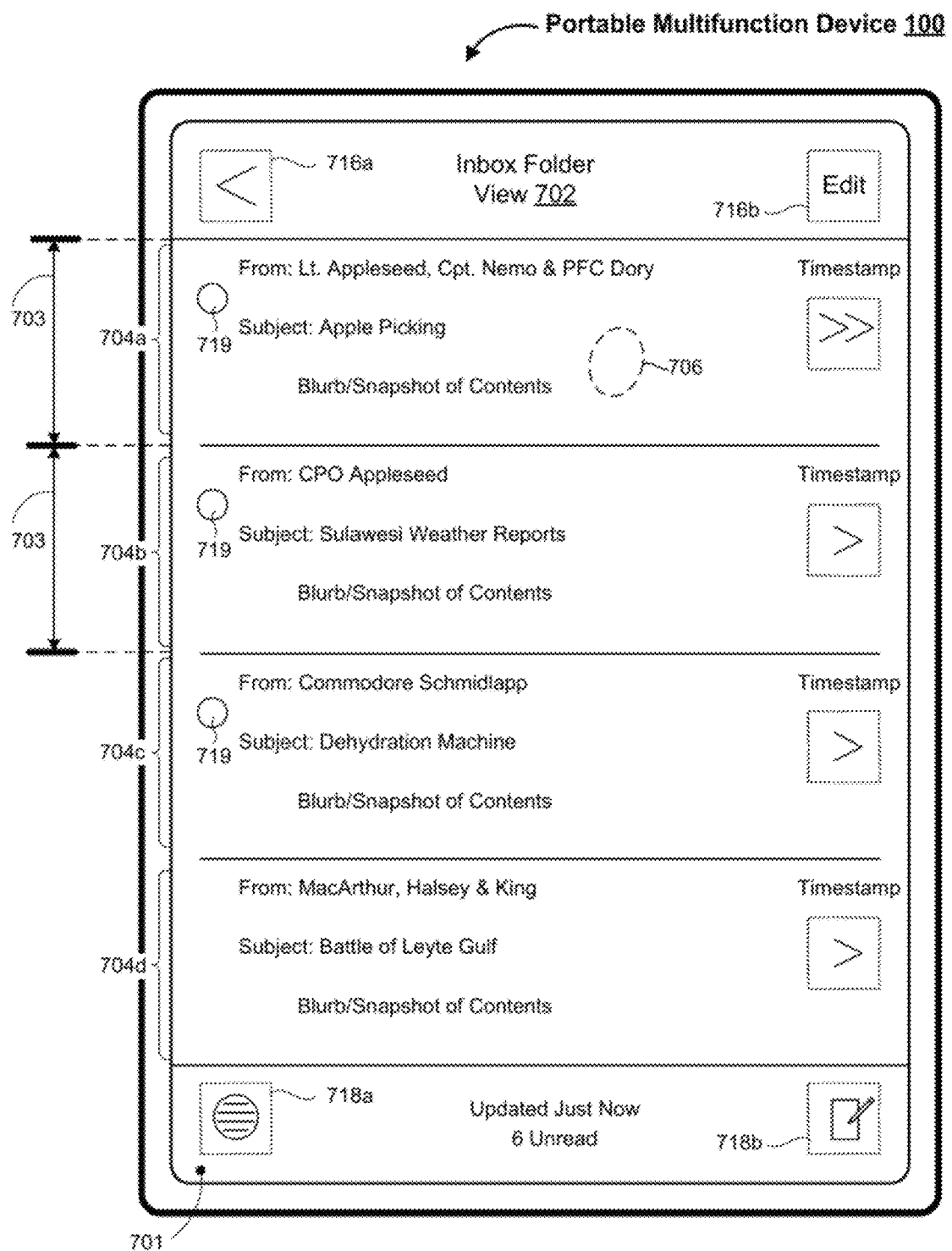
FIGS. 7A-7P illustrate example user interfaces for displaying affordances for performing corresponding actions within a conversation view in accordance with some embodiments.
Figure 7B:
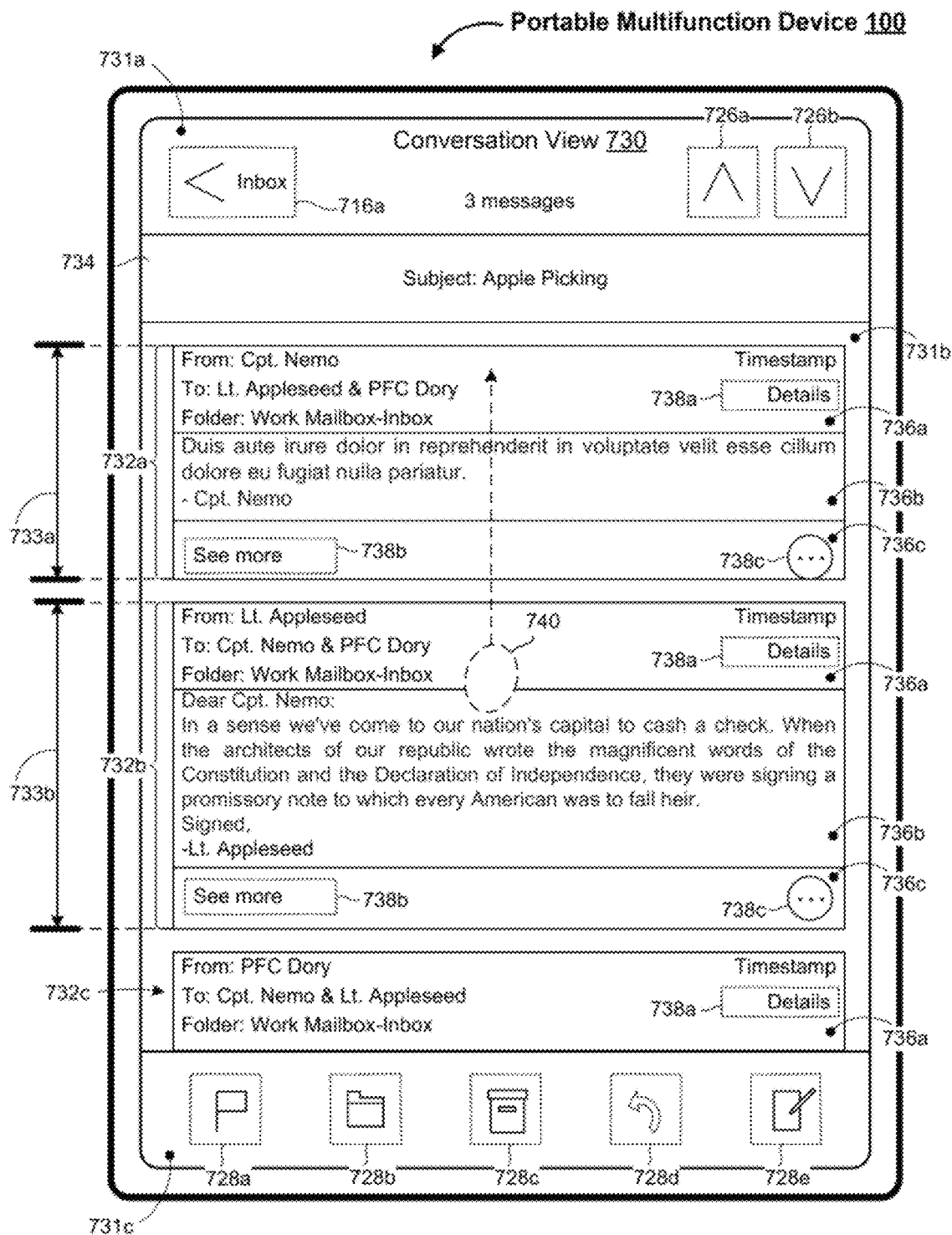
Figure 7C:
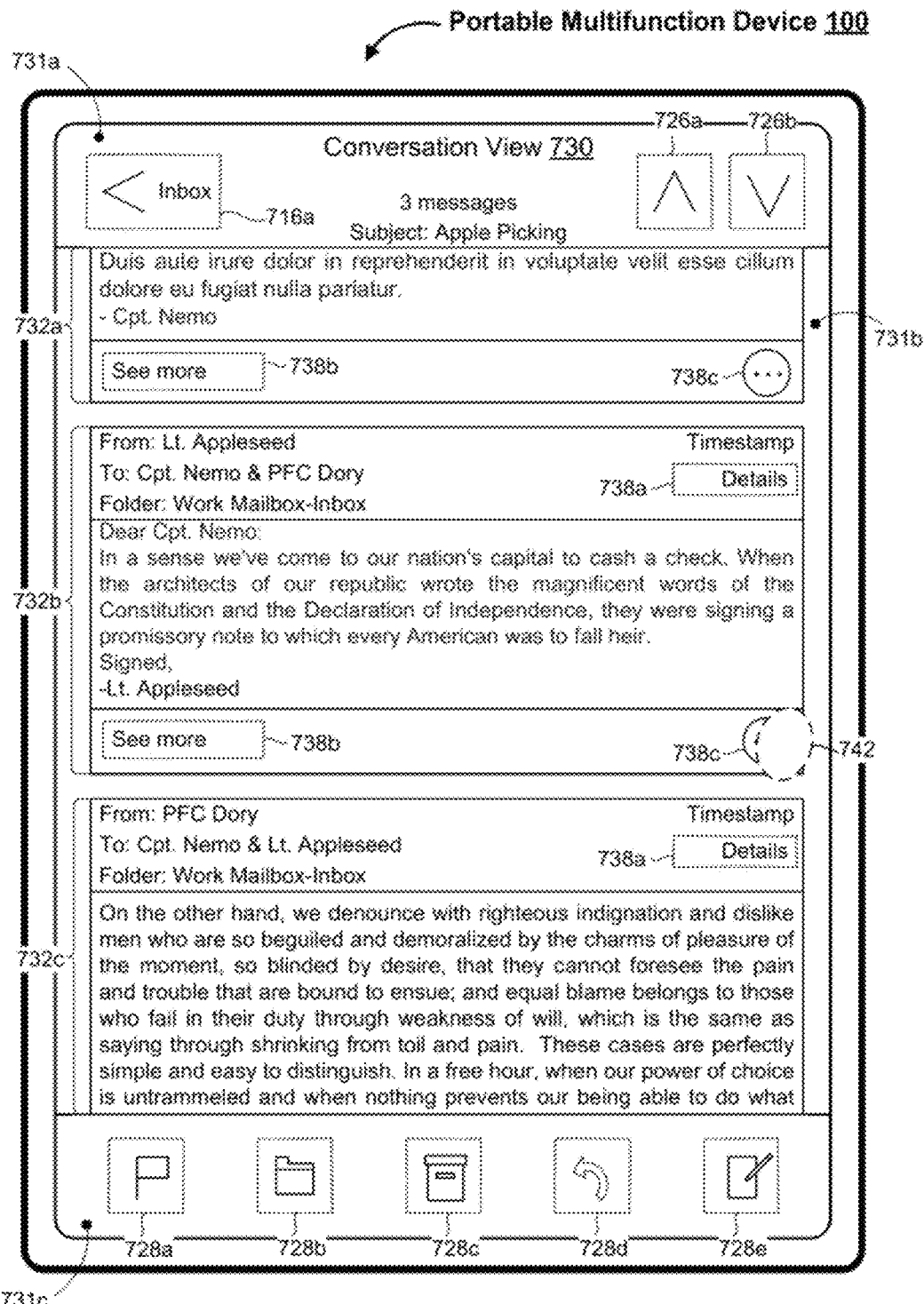
Figure 7D:
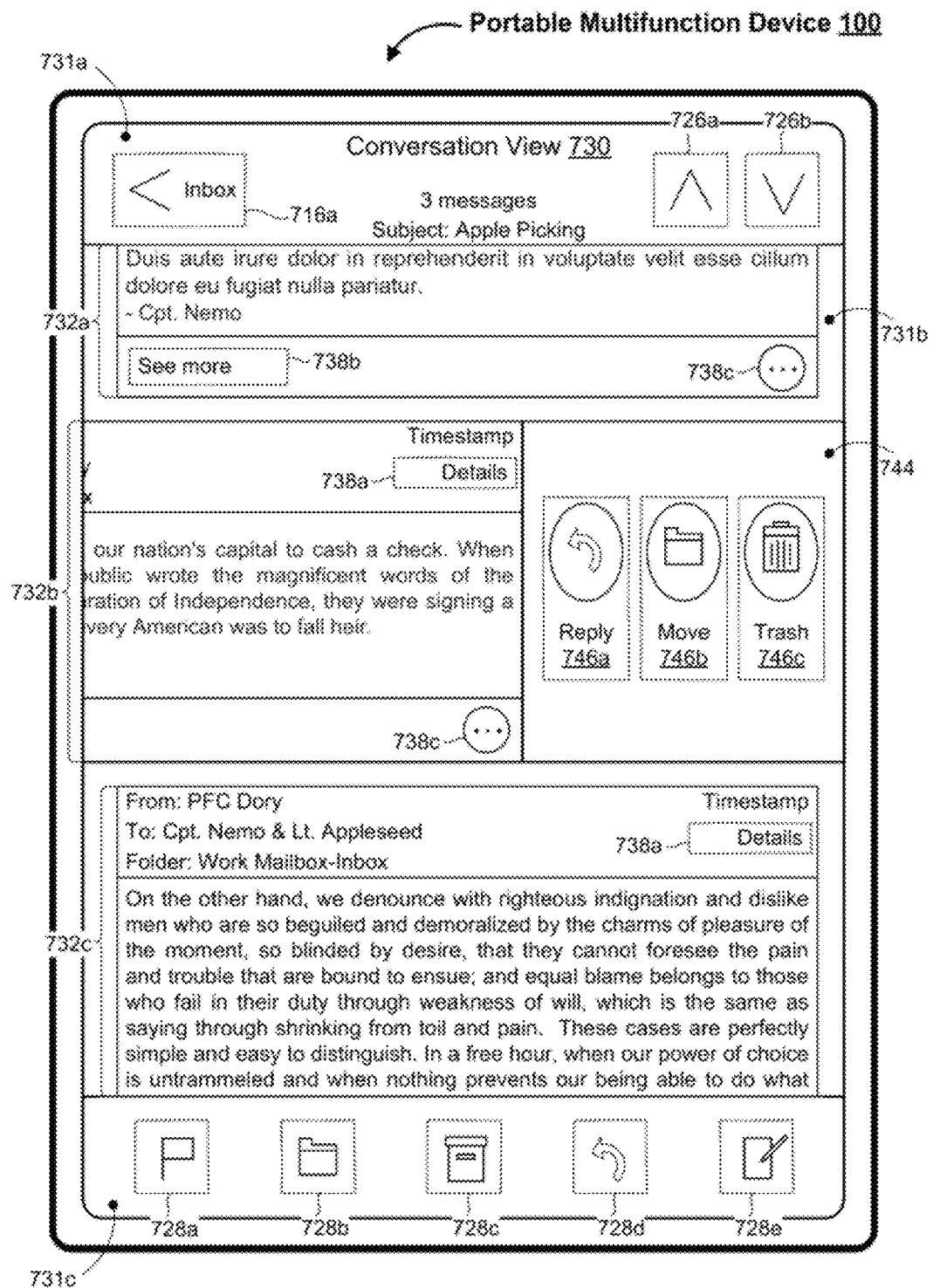
Figure 7E:
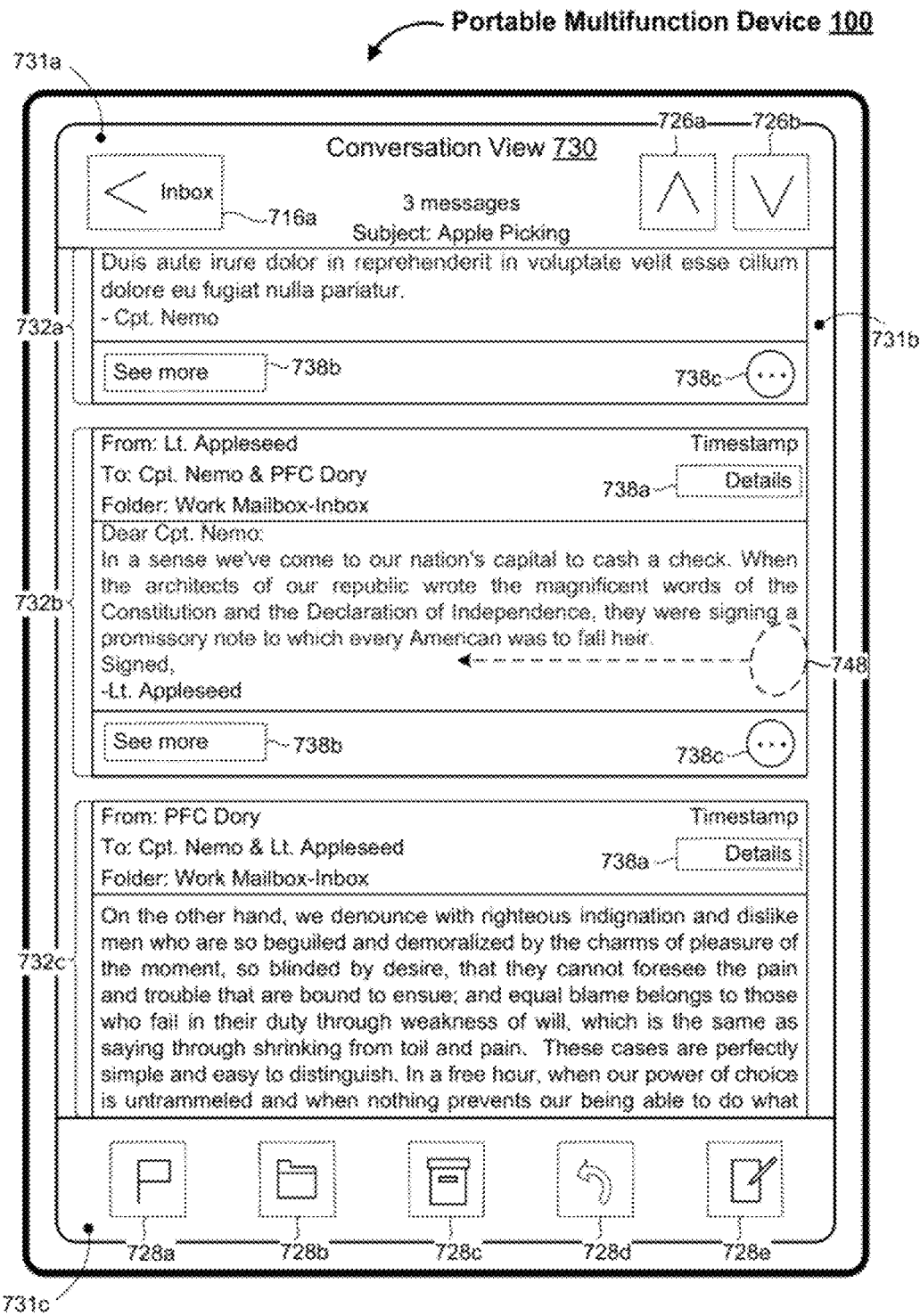
Figure 7F:
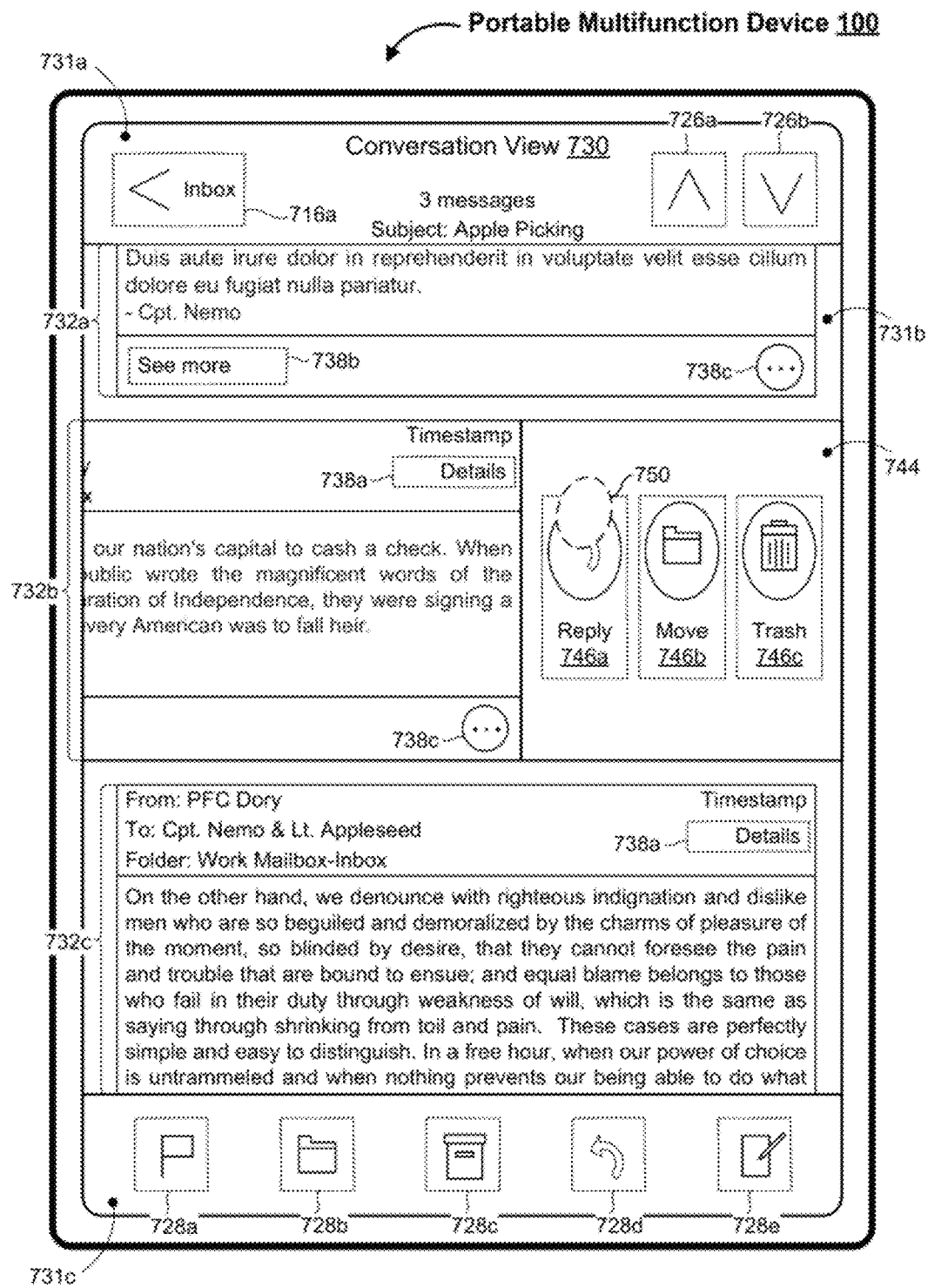
Figure 7G:
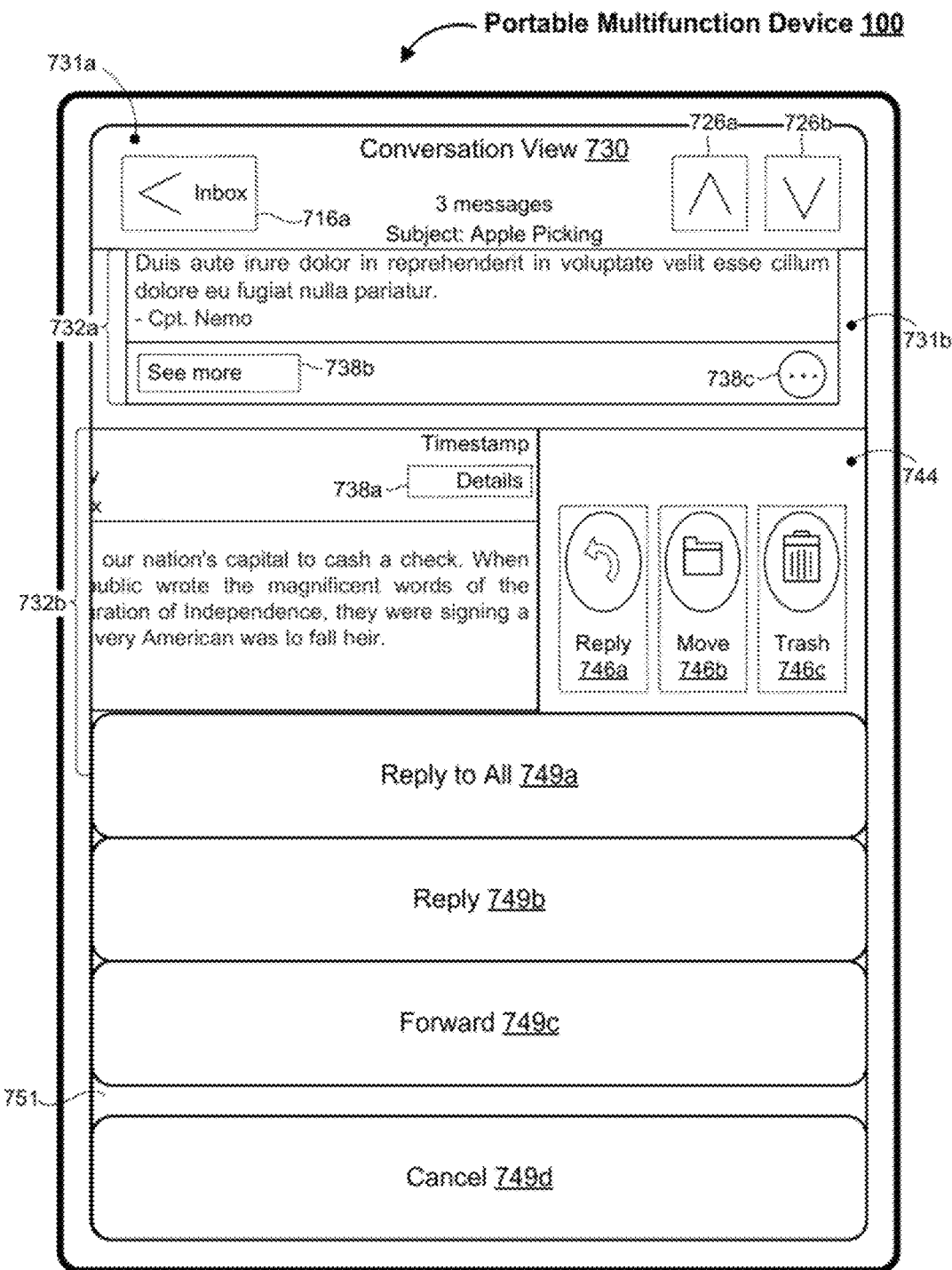
Figure 7H:
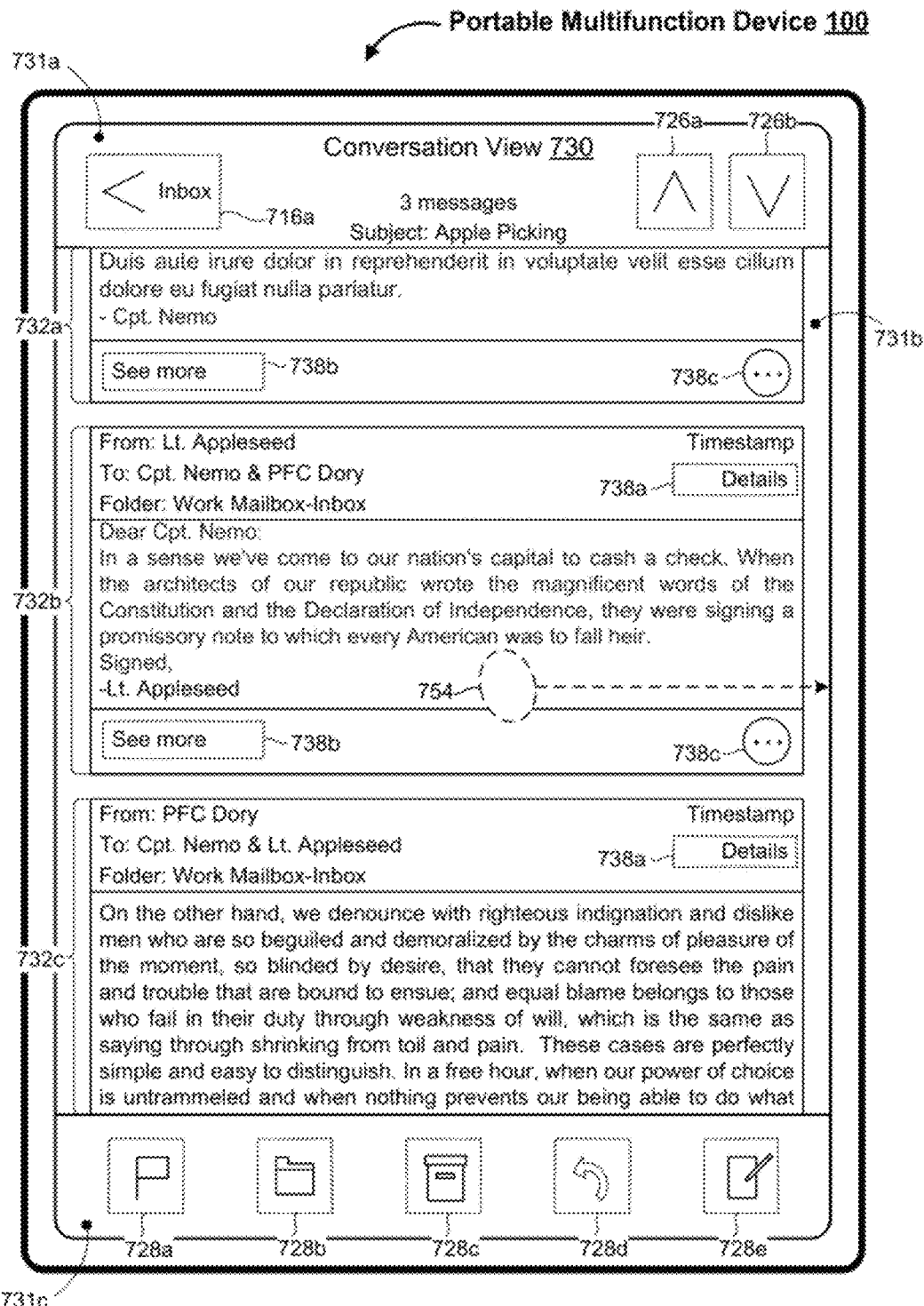
Figure 7I:
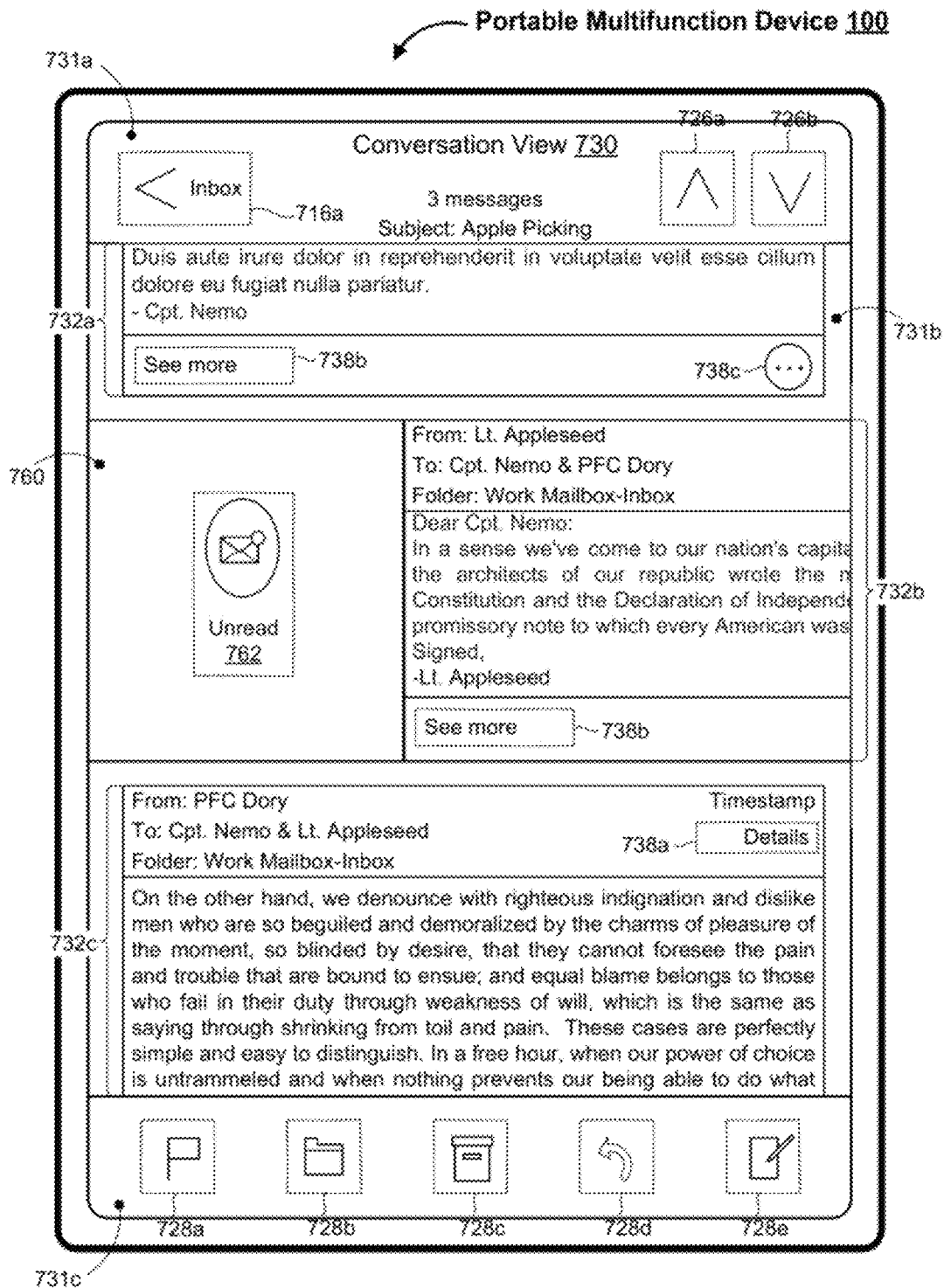
Figure 7J:
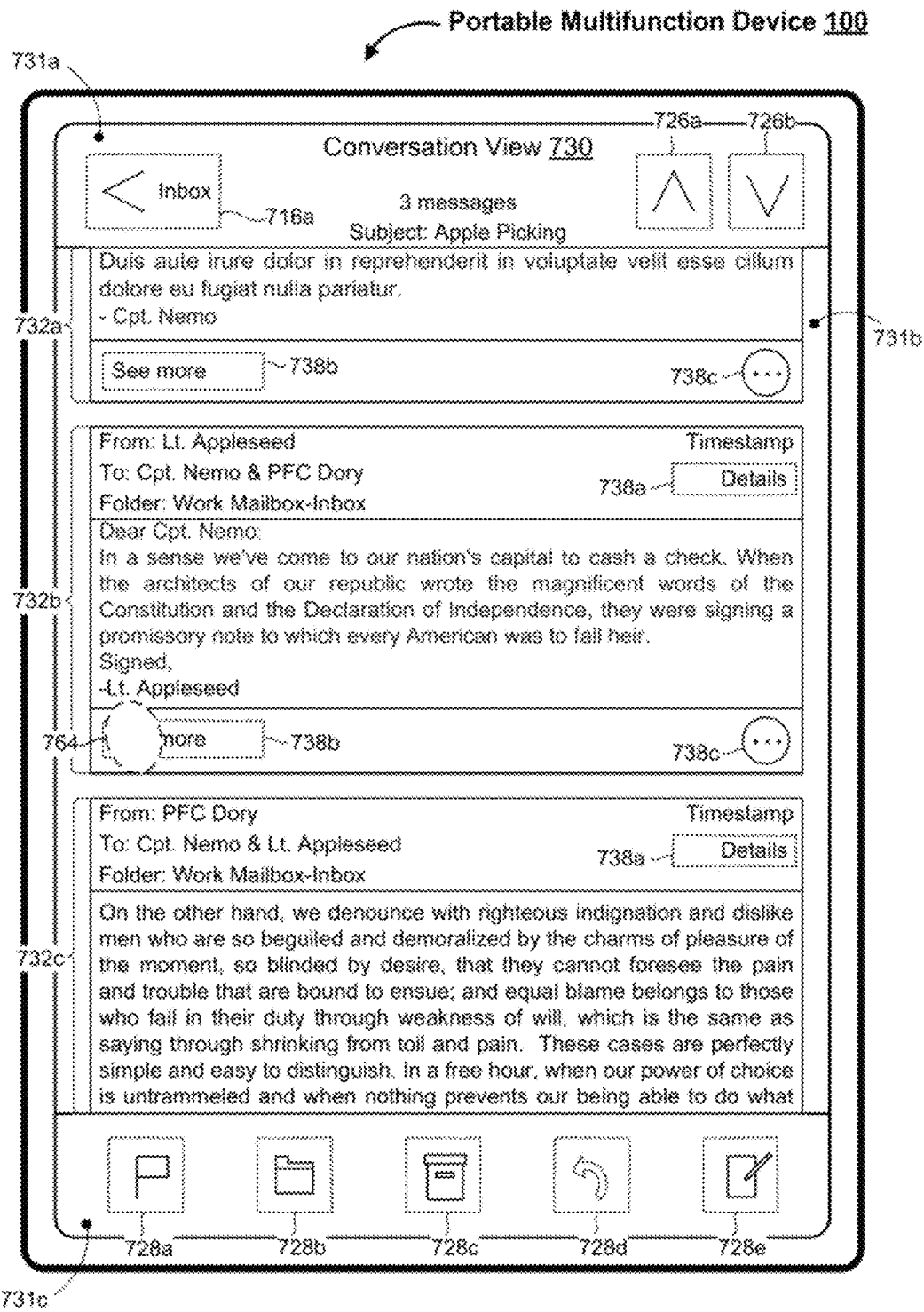
Figure 7K:
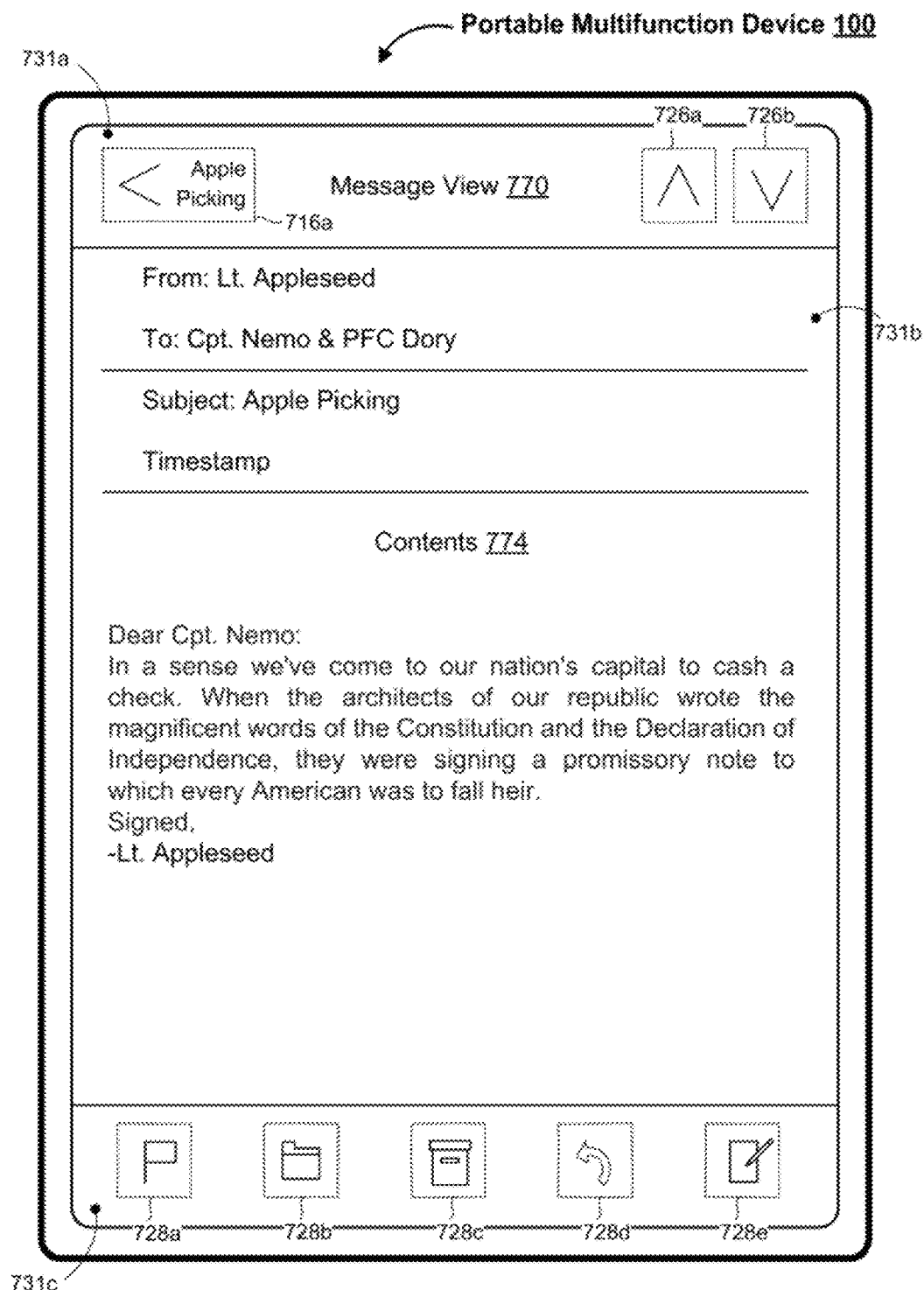
Figure 7L:
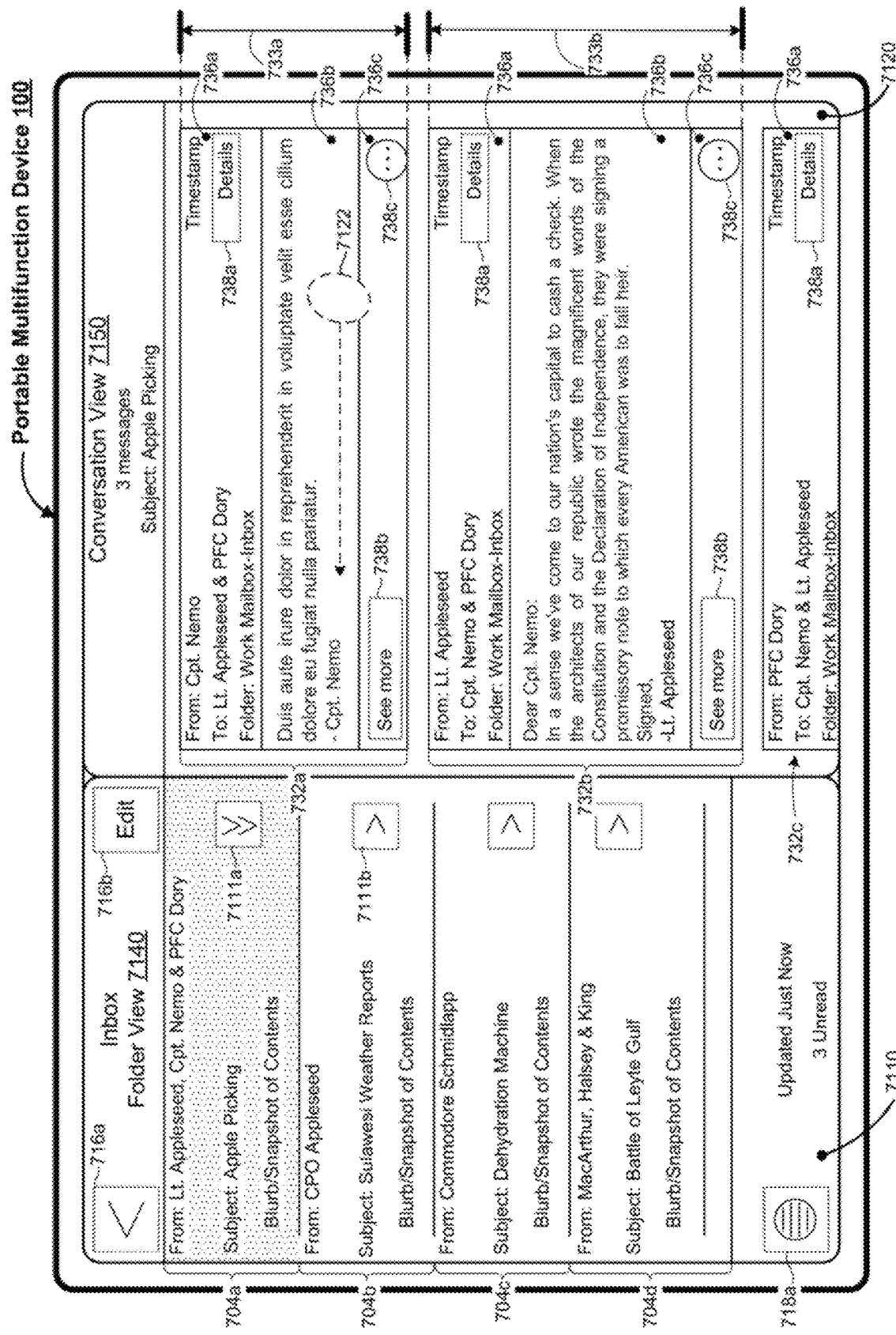
Figure 7M:
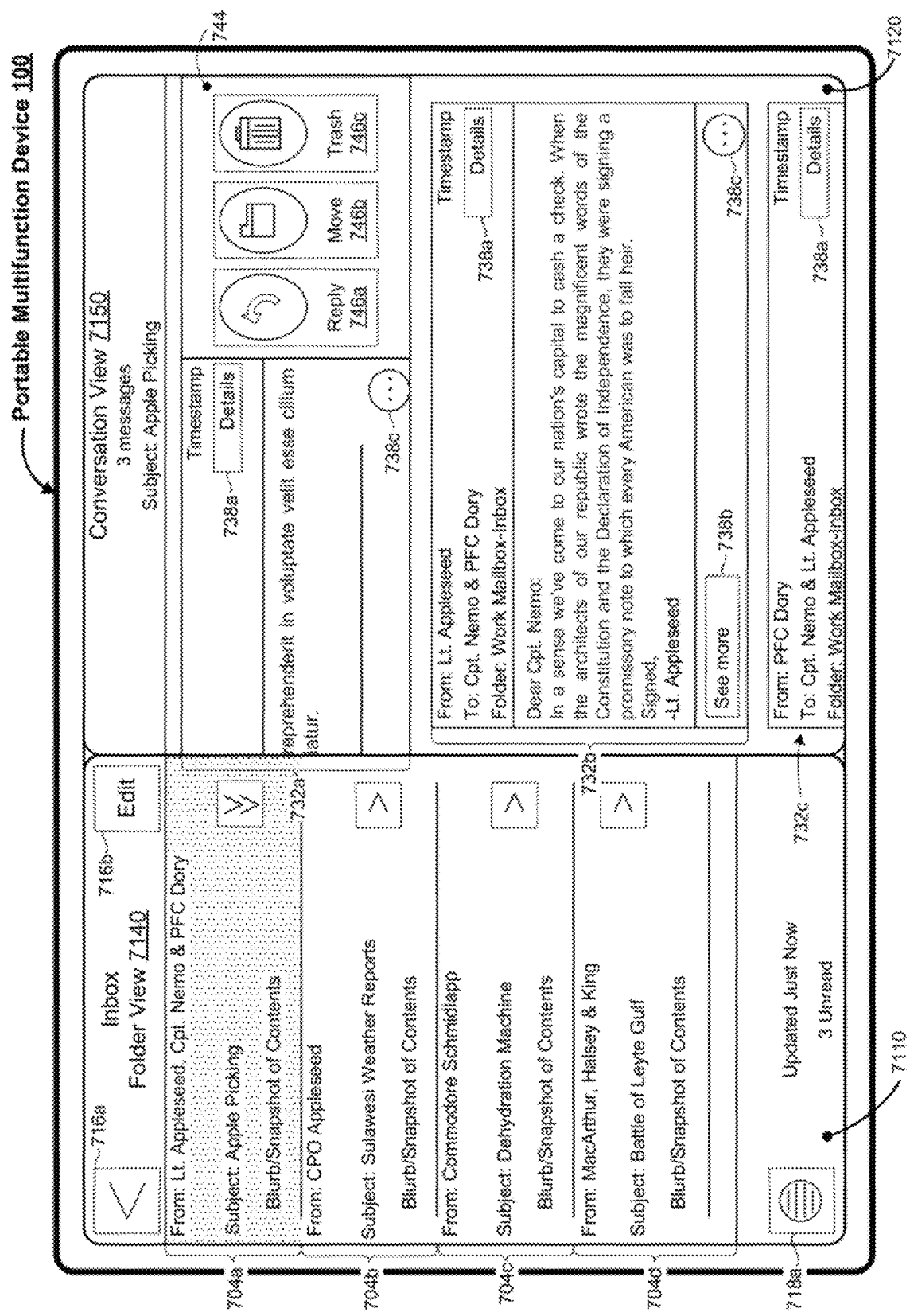
Figure 7N:
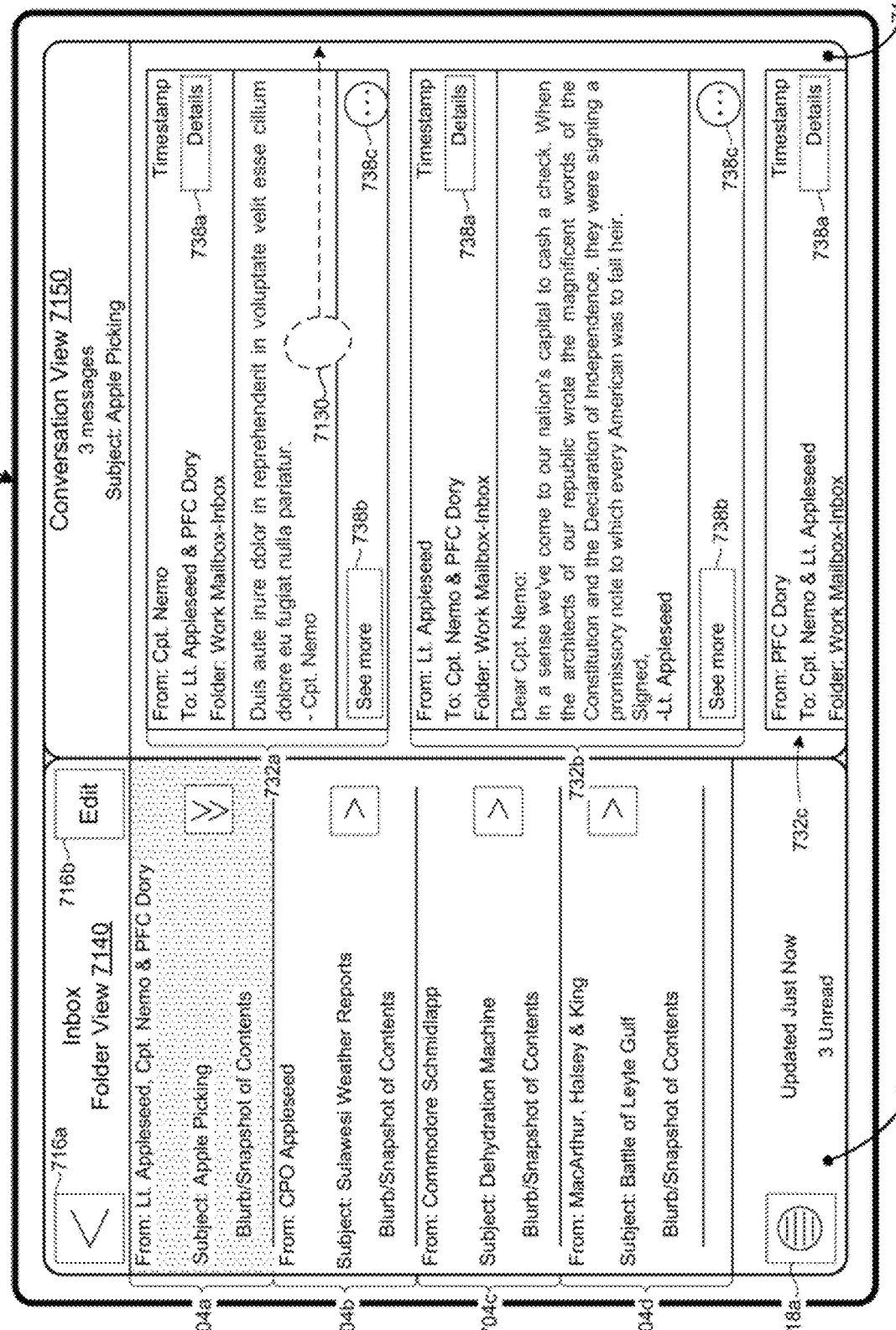
Figure 7O:
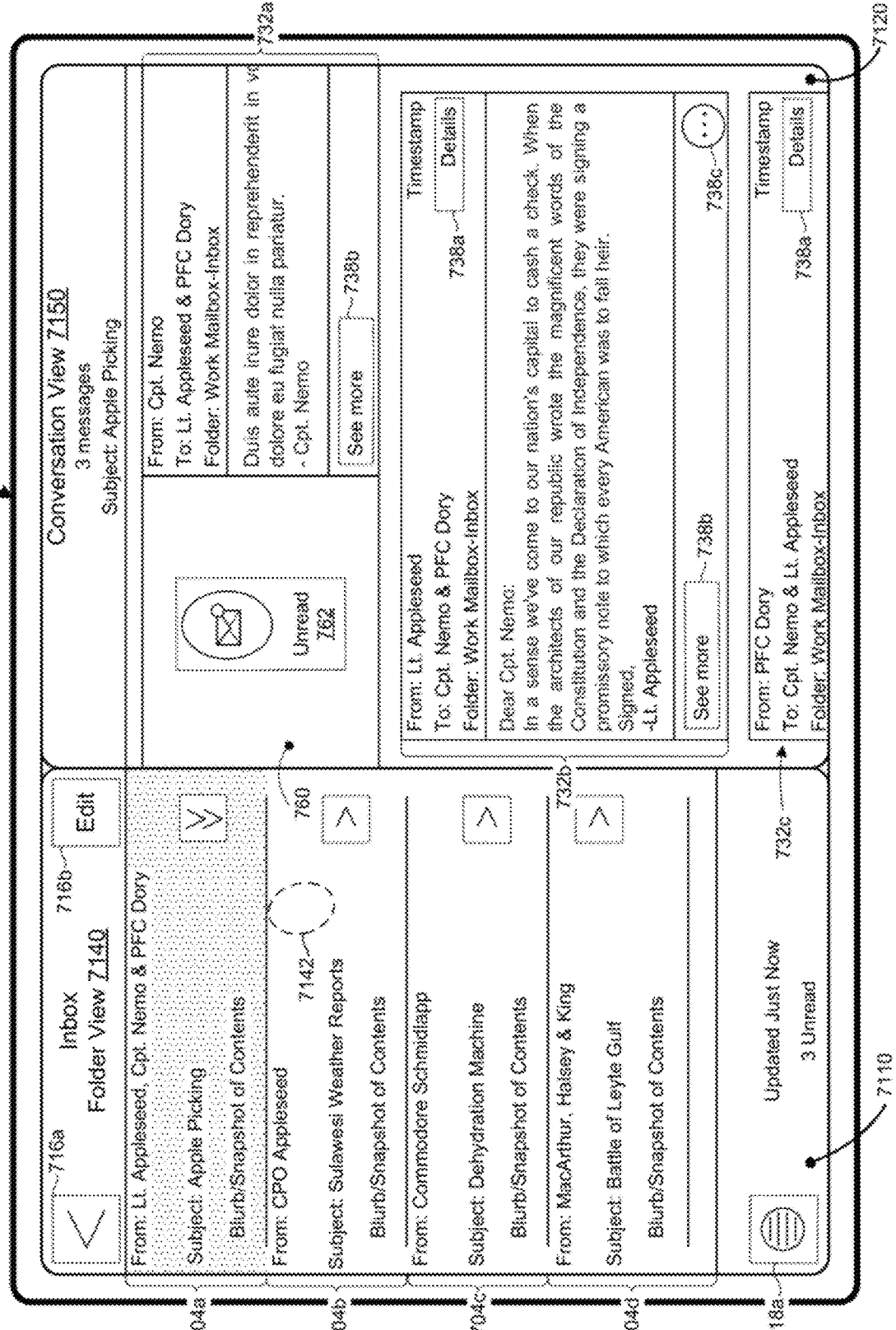
Figure 7P:
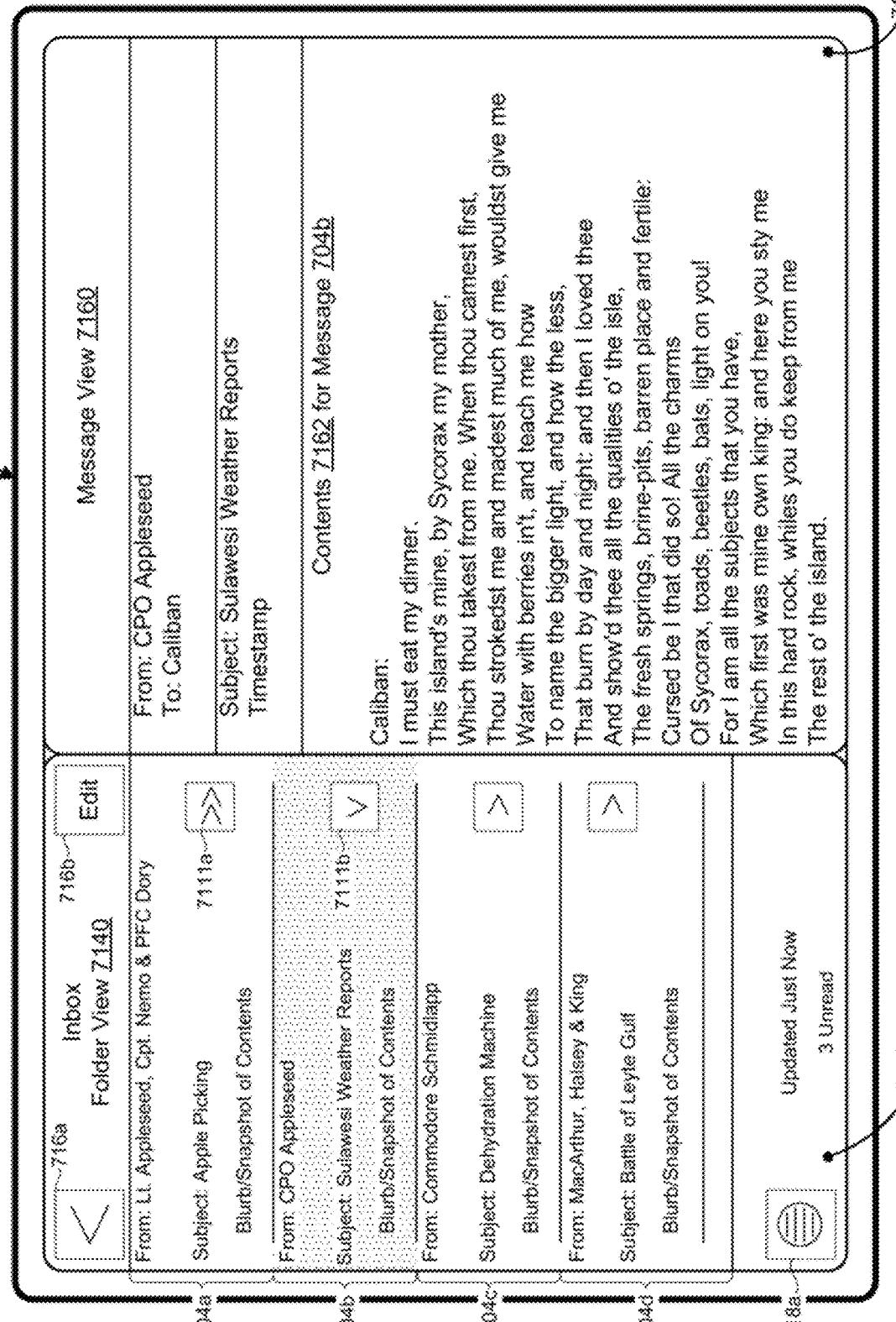

FIGS. 7A-7P illustrate example user interfaces for managing electronic communications in accordance with some embodiments. The user interfaces in these figures are used to illustrate the processes described below, including the processes in FIGS. 10A-10C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 7A illustrates displaying a folder view 702 associated with an inbox folder within the display area of the device 100. For example, the inbox folder is one of a plurality of folders associated with an electronic mail (email) and/or messaging application. In some embodiments, the inbox folder includes electronic communications to and/or from the user of the device 100. For example, the electronic communications include email conversations, email messages, instant message conversations, instant messages, SMSs, MMSs, talk-to-text, and/or the like. In some embodiments, the content displayed within the display area corresponds to a grouping of electronic communications such as a specific folder, category, or tag. In some embodiments, the user of the device 100 is able to select between different groupings of electronic communications such as folders, categories, or tags.

As shown in FIG. 7A, the inbox folder view 702 includes: a back affordance 716a, which, when activated (e.g., with a contact), causes the inbox folder view 702 to be replaced with a previous view or pane; and an edit affordance 716b for marking, moving, and archiving electronic communications in the inbox folder. As shown in FIG. 7A, the inbox folder view 702 also includes: a filter affordance 718a, which, when activated (e.g., with a contact), causes the messages, conversations, and/or bundles associated with the inbox folder to be filtered according to a set of filter criteria or a filter pane to be displayed; and a draft affordance 718b, which, when activated (e.g., with a contact), causes the inbox folder view 702 to be replaced with an interface for drafting a new message.

As shown in FIG. 7A, the inbox folder view 702 further includes a plurality of rows. In some embodiments, a row represents a plurality of messages (e.g., electronic communications) that satisfy one or more conversation criteria (e.g., a conversation with one or more messages with similar subjects, content, senders, recipients, and/or the like). In some embodiments, a row represents a single message.

In FIG. 7A, the first row corresponds to a conversation 704a (e.g., with two or more messages). The first row includes: a timestamp of a most recently received message in the conversation 704a; the sender(s) of messages in the conversation 704a; the subject of the conversation 704a (e.g., "Apple Picking"); and a blurb/snapshot of the contents of the conversation 704a. The first row also includes an icon 719 indicating that the conversation 704a includes one or more unread messages.

As shown in FIG. 7A, the second row corresponds to a message 704b (e.g., a conversation with one message). The second row includes: a timestamp associated with the message 704b; the sender of the message 704b; the subject of the message 704b (e.g., "Sulawesi Weather Reports"); and a blurb/snapshot of the contents of the message 704b. The second row also includes an icon 719 indicating that the message 704b is unread.

As shown in FIG. 7A, the third row corresponds to a message 704c (e.g., a conversation with one message). The third row includes: a timestamp associated with the message 704c; the sender of the message 704c; the subject of the message 704c (e.g., "Dehydration Machine"); and a blurb/snapshot of the contents of the message 704c. The third row also includes an icon 719 indicating that the message 704c is unread.

In FIG. 7A, the fourth row corresponds to a conversation 704d (e.g., with two or more messages). The fourth row includes: a timestamp of a most recently received message in the conversation 704d; the sender(s) of messages in the conversation 704d; the subject of the conversation 704d (e.g., "Battle of Leyte Gulf"); and a blurb/snapshot of the contents of the conversation 704d.

As shown in FIG. 7A, according to some embodiments, a respective dimension (e.g., the height) of each of the rows in the inbox folder view 702 is the same. For example, in FIG. 7A, a respective dimension (e.g., the height) of the first row corresponding to the conversation 704a has a value 703, and the respective dimension (e.g., the height) of the second row corresponding to the message 704b also has the value 703.

FIGS. 7A-7B illustrate a sequence in which a conversation view 730 replaces display of the inbox folder view 702. FIG. 7A illustrates detecting a contact 706 at a location corresponding to the conversation 704a (e.g., a one finger tap gesture). FIG. 7B illustrates replacing display of the inbox folder view 702 with the conversation view 730 corresponding to the conversation 704a in response to selection of the conversation 704a in FIG. 7A.

As shown in FIG. 7B, the conversation view 730 includes: a header region 731a, a content region 731b, a toolbar region 731c, and a subject bar 734. In FIG. 7B, the content region 731b includes: a first message region 732a associated with a first message in the conversation 704a; a second message region 732b associated with a second message in the conversation 704a; and a portion of a third message region 732c associated with a third message in the conversation 704a (sometimes collectively referred to as the "message regions 732"). For example, if a user scrolls the conversation view 730, the balance of the third message region 732c is displayed within the content region 731b.

In some embodiments, the messages are sorted in reverse chronological order. As such, in this example, the first message associated with the message region 732a is the most recent message in the conversation 704a. In some embodiments, the messages are sorted in chronological order. As such, in this example, the first message associated with the message region 732a is the oldest message in the conversation 704a. In FIG. 7B, the subject bar 734 indicates the subject (e.g., "Apple Picking") of the conversation 704a.

As shown in FIG. 7B, the message regions 732 include a header sub-region 736a, a content sub-region 736b, and a bottom sub-region 736c. The header sub-region 736a includes the sender of the corresponding message, the recipients of the corresponding message, the folder associated with the corresponding message, a timestamp for the corresponding message, and a "details" affordance 738a, which, when activated (e.g., with a contact), causes additional details associated with a corresponding message to be displayed within the header sub-region 736a. The content sub-region 736b includes the content of the corresponding message. The bottom sub-region 736c includes: a "see more" affordance 738b, which, when activated (e.g., with a contact), causes a message view of the corresponding message to replace display of the conversation view 730 (e.g., as shown in FIG. 7J-7K); and an actions affordance 738c, which, when activated (e.g., with a contact), causes a first set of one or more affordances to be displayed (e.g., as shown in FIGS. 7C-7D).

As shown in FIG. 7B, the header region 731a includes: a back affordance 716a, which, when activated (e.g., with a contact), causes the conversation view 730 to be replaced with the previous view or pane (e.g., the inbox folder view 702 in FIG. 7A); and an indication of the number of messages in the conversation 704a (e.g., 3 messages). According to some embodiments, the header region 731a also includes: a next affordance 726a, which, when activated (e.g., with a contact), causes a next conversation or message from the inbox folder to replace display of the conversation 704a within the conversation view 730; and a previous affordance 726b, which, when activated (e.g., with a contact), causes a previous conversation or message from the inbox folder to replace display of the conversation 704a within the conversation view 730. According to some embodiments, the header region 731a also includes: a next affordance 726a, which, when activated (e.g., with a contact), causes a next message region (e.g., the second message region 732b) to be displayed at the top of the conversation view 730; and a previous affordance 726b, which, when activated (e.g., with a contact), causes a previous message region to be displayed at the top of the conversation view 730.

As shown in FIG. 7B, according to some embodiments, the toolbar region 731c includes: a flag affordance 728a for flagging the messages in the conversation 704a; a move folder affordance 728b for moving the messages in the conversation 704a from the inbox folder to another folder; an archive affordance 728c for archiving the messages in the conversation 704a; a reply affordance 728d for replying to or forwarding the conversation 704a; and a draft affordance 728e for drafting a new message. According to some embodiments, the toolbar region 731c includes: a flag affordance 728a for flagging a respective message in the conversation 704a; a move folder affordance 728b for moving the respective message in the conversation 704a from the inbox folder to another folder; an archive affordance 728c for archiving the respective message in the conversation 704a; a reply affordance 728d for replying to or forwarding the respective message in the conversation 704a; and a draft affordance 728e for drafting a new message. In some embodiments, the respective message is the most recent message within the conversation 704a. In some embodiments, the respective message is the top-most message that is fully displayed within the conversation view 730.

As shown in FIG. 7B, according to some embodiments, a respective dimension (e.g., the height) of each of the message regions 732 is based on the amount of content associated with the corresponding message. For example, in FIG. 7B, a respective dimension (e.g., the height) of the first message region 732a has a value 733a, and the respective dimension (e.g., the height) of the second message region 732b has a value 733b. In this example, the value 733b is greater than the value 733a because the first message associated with the first message region 732a has less content (e.g., lines of text) than the second message associated with the second message region 732b.

FIGS. 7B-7C illustrate a sequence in which the user scrolls within the conversation view 730. FIG. 7B also illustrates detecting an upward swipe gesture with a contact 740 within the content region 731b. FIG. 7C illustrates scrolling the message regions 732 within the content region 731b in response to detecting the upward swipe gesture in FIG. 7B. FIG. 7C is similar to and adapted from FIG. 7B. As such, FIG. 7B and FIG. 7C include similar user interfaces and elements labeled with the same reference number in both figures have the same function, only the differences are described herein for the sake of brevity. As shown in FIG. 7C, the conversation view 730 no longer includes the subject bar 734. However, the header region 731a includes an indication of the subject of the conversation 704a (e.g., Apple Picking") in addition to the indication of the number of messages in the conversation 704a (e.g., 3 messages).

FIGS. 7C-7D illustrate a sequence in which a first set of one or more affordances is displayed within the content region 731b. FIG. 7C also illustrates detecting a contact 742 at a location corresponding to the actions affordance 738c within the second message region 732b. FIG. 7D illustrates sliding the second message region 732b in a first direction (e.g., right-to-left) in response to selection of the actions affordance 738c in FIG. 7C. FIG. 7D also illustrates displaying a first action region 744 adjacent to the second message region 732b, including a first set of one or more affordances provided to perform actions on the second message corresponding to the second message region 732b in response to selection of the actions affordance 738c in FIG. 7C.

FIG. 7D is similar to and adapted from FIG. 7B. As such, FIG. 7B and FIG. 7D include similar user interfaces and elements labeled with the same reference number in both figures have the same function, only the differences are described herein for the sake of brevity. As shown in FIG. 7D, the first action region 744 includes: a reply affordance 746a, which, when activated (e.g., with a contact), causes a menu with a plurality of reply options to be overlaid on the conversation view 730 (e.g., as shown in FIGS. 7F-7G); a move affordance 746b, which, when activated (e.g., with a contact), causes a menu with a plurality of folder options for moving the second message corresponding to the second message region 732b to be overlaid on the conversation view 730; and a trash affordance 746c, which, when activated (e.g., with a contact), causes the second message corresponding to the second message region 732b to be moved to the trash (sometimes referred to collectively as the "affordances 746"). In some embodiments, the first action region 744 includes any number of affordances 746. In some embodiments, one or more of the affordances 746 may be replaced with other action options from a preferences menu.

FIGS. 7E-7F illustrate another sequence in which the first set of one or more affordances is displayed within the content region 731b. FIG. 7E is similar to and adapted from FIG. 7B and FIG. 7D. As such, FIG. 7B, FIG. 7D, and FIG. 7E include similar user interfaces and elements labeled with the same reference number in both figures have the same function, only the differences are described herein for the sake of brevity. FIG. 7E illustrates detecting a right-to-left swipe gesture within the second message region 732b with a contact 748. FIG. 7F illustrates sliding the second message region 732b in a first direction (e.g., right-to-left) in response to detecting the right-to-left swipe gesture in FIG. 7E. FIG. 7F also illustrates displaying a first action region 744 adjacent to the second message region 732b, including the first set of one or more affordances provided to perform actions on the second message corresponding to the second message region 732b in response to detecting the right-to-left swipe gesture in FIG. 7E.

FIGS. 7F-7G illustrate a sequence in which a menu 751 with a plurality reply options is overlaid on the conversation view 730. FIG. 7F further illustrates detecting a contact 750 at a location corresponding to the reply affordance 746a within the first action region 744. FIG. 7G illustrates displaying the menu 751 with a plurality reply options overlaid on the conversation view 730 in response to selection of the reply affordance 746a in FIG. 7F. According to some embodiments, the menu 751 slides up from the bottom edge of the display area of the device 100. As shown in FIG. 7G, the menu 751 includes: a reply to all affordance 749a, which, when activated (e.g., with a contact) causes a message drafting interface for replying to all participants of the second message that corresponds to the second message region 732b to replace display of the conversation view 730; a reply affordance 749b, which, when activated (e.g., with a contact) causes a message drafting interface for replying to the sender of the second message that corresponds to the second message region 732b to replace display of the conversation view 730; a forward affordance 749c, which, when activated (e.g., with a contact) causes a message drafting interface for forwarding the second message region 732b to replace display of the conversation view 730; and a cancel affordance 749d, which, when activated (e.g., with a contact) causes the menu 751 to cease being displayed.

FIGS. 7H-7I illustrate a sequence in which in which a second set of one or more affordances is displayed within the content region 731b. FIG. 7H is similar to and adapted from FIG. 7B. As such, FIG. 7B and FIG. 7H include similar user interfaces and elements labeled with the same reference number in both figures have the same function, only the differences are described herein for the sake of brevity. FIG. 7H illustrates detecting a left-to-right swipe gesture within the second message region 732b with a contact 754. FIG. 7I illustrates sliding the second message region 732b in a second direction (e.g., left-to-right) in response to detecting the left-to-right swipe gesture in FIG. 7H. FIG. 7I also illustrates displaying a second action region 760 adjacent to the second message region 732b, including a second set of one or more affordances provided to perform actions on the second message corresponding to the second message region 732b in response to detecting the left-to-right swipe gesture in FIG. 7H.

As shown in FIG. 7I, the second action region 760 includes an unread affordance 762, which, when activated (e.g., with a contact), causes the second message corresponding to the second message region 732b to be marked as unread. In some embodiments, the second action region 760 includes any number of affordances. In some embodiments, the unread affordance 762 may be replaced with other action options from a preferences menu.

FIGS. 7J-7K illustrate a sequence in which in which a message view 770 replaces display of the conversation view 730. FIG. 7J is similar to and adapted from FIG. 7B. As such, FIG. 7B and FIG. 7J include similar user interfaces and elements labeled with the same reference number in both figures have the same function, only the differences are described herein for the sake of brevity. FIG. 7J illustrates detecting a contact 764 at a location corresponding to the "see more" affordance 738b within the second message region 732b. FIG. 7K illustrates replacing display of the conversation view 730 with a message view 770 for the second message corresponding to the second message region 732b in response to selection of the "see more" affordance 738c.

As shown in FIG. 7K, the content region 731b includes the contents 774 of the second message that corresponds to the second message region 732b. As shown in FIG. 7K, the header region 731a includes a back affordance 716a, which, when activated (e.g., with a contact), causes the message view 770 to be replaced with the previous view or pane (e.g., the conversation 750 in FIG. 7J). According to some embodiments, the header region 731a also includes: a next affordance 726a, which, when activated (e.g., with a contact), causes a next message from the conversation 704a to be displayed within the message view 770; and a previous affordance 726b, which, when activated (e.g., with a contact), causes a previous message from the conversation 704a to be displayed within the message view 770.

According to some embodiments, the message view 770 for the second message corresponding to the second message region 732b replaces display of the conversation view 730 in response to detecting a contact within the header sub-region 736a of the second message region 732b (not shown). According to some embodiments, the message view 770 for the second message corresponding to the second message region 732b replaces display of the conversation view 730 in response to detecting a contact within the content sub-region 736b of the second message region 732b (not shown).

FIGS. 7L-7P illustrates displaying a dual-pane user interface associated with an electronic mail (email) and/or messaging application that includes a first pane 7120 and a second pane 7110 within the display area of the device 100. As shown in FIG. 7L, the second pane 7110 includes a folder view 7140 for an inbox folder that includes electronic communications to and/or from the user of the device 100. For example, the electronic communications include email conversations, email messages, instant message conversations, instant messages, SMSs, MMSs, talk-to-text, and/or the like. In some embodiments, the user of the device 100 is able to select between different groupings of electronic communications, such as folders, categories, or tags, to replace the inbox folder view 7140 with a folder view for a different grouping.

As shown in FIG. 7L, the second pane 7110 includes: a back affordance 716a, which, when activated (e.g., with a contact), causes the inbox folder view 7140 to be replaced with a previous view or pane; and an edit affordance 716b for marking, moving, and archiving electronic communications in the inbox folder. As shown in FIG. 7L, the second pane 7110 also includes: a filter affordance 718a, which, when activated (e.g., with a contact), causes the messages, conversations, and/or bundles associated with the inbox folder to be filtered according to a set of filter criteria or a filter pane to be displayed.

As shown in FIG. 7L, the second pane 7110 further includes a plurality of rows. In some embodiments, a row represents a plurality of messages (e.g., electronic communications) from the inbox folder that satisfy one or more conversation criteria (e.g., a conversation with one or more messages with similar subjects, content, senders, recipients, and/or the like). In some embodiments, a row represents a single message from the inbox folder.

In FIG. 7L, the first row corresponds to a conversation 704a (e.g., with two or more messages). The first row includes: a timestamp of a most recently received message in the conversation 704a; the sender(s) of messages in the conversation 704a; the subject of the conversation 704a (e.g., "Apple Picking"); and a blurb/snapshot of the contents of the conversation 704a. In FIG. 7L, the conversation 704a is displayed in the foreground or "in focus" as indicated by the vertical orientation of the view mode affordance 7111a and the shading of the first row within the second pane 7110.

As shown in FIG. 7L, the second row corresponds to a message 704b (e.g., a conversation with one message). The second row includes: a timestamp associated with the message 704b; the sender of the message 704b; the subject of the message 704b (e.g., "Sulawesi Weather Reports"); and a blurb/snapshot of the contents of the message 704b. In FIG. 7L, the message 704b is displayed in the background as indicated by the horizontal orientation of the view mode affordance 7111b and the non-shading of the second row within the second pane 7110.

As shown in FIG. 7L, the third row corresponds to a message 704c (e.g., a conversation with one message). The third row includes: a timestamp associated with the message 704c; the sender of the message 704c; the subject of the message 704c (e.g., "Dehydration Machine"); and a blurb/snapshot of the contents of the message 704c.

In FIG. 7L, the fourth row corresponds to a conversation 704d (e.g., with two or more messages). The fourth row includes: a timestamp of a most recently received message in the conversation 704d; the sender(s) of messages in the conversation 704d; the subject of the conversation 704d (e.g., "Battle of Leyte Gulf"); and a blurb/snapshot of the contents of the conversation 704d.

As shown in FIG. 7L, the first pane 7120 includes a conversation view 7150 of the conversation 704a, which is displayed in the foreground in the second pane 7110. In FIG. 7L, the first pane 7120 includes: a first message region 732a associated with a first message in the conversation 704a; a second message region 732b associated with a second message in the conversation 704a; and a portion of a third message region 732c associated with a third message in the conversation 704a (sometimes collectively referred to as the "message regions 732"). For example, if a user scrolls within the first pane 7120, the balance of the third message region 732c is displayed.

As shown in FIG. 7L, the message regions 732 include a header sub-region 736a, a content sub-region 736b, and a bottom sub-region 736c. The header sub-region 736a includes the sender of the corresponding message, the recipients of the corresponding message, the folder associated with the corresponding message, a timestamp for the corresponding message, and a "details" affordance 738a, which, when activated (e.g., with a contact), causes additional details associated with a corresponding message to be displayed within the header sub-region 736a. The content sub-region 736b includes the content of the corresponding message. The bottom sub-region 736c includes: a "see more" affordance 738b, which, when activated (e.g., with a contact), causes a message view of the corresponding message to replace display of the conversation view 7150 within the first pane 7120; and an actions affordance 738c, which, when activated (e.g., with a contact), causes a first set of one or more affordances to be displayed (e.g., similar to FIG. 7M).

As shown in FIG. 7L, according to some embodiments, a respective dimension (e.g., the height) of each of the message regions 732 is based on the amount of content for the corresponding message. For example, in FIG. 7L, a respective dimension (e.g., the height) of the first message region 732a has a value 733a, and the respective dimension (e.g., the height) of the second message region 732b has a value 733b. In this example, the value 733b is greater than the value 733a because the first message associated with the first message region 732a has less content (e.g., lines of text) than the second message associated with the second message region 732b.

FIGS. 7L-7M illustrate a sequence in which a first set of one or more affordances is displayed within the first pane 7120. FIG. 7L also illustrates detecting a right-to-left swipe gesture within the first message region 732a with a contact 7122. FIG. 7M illustrates sliding the first message region 732a in a first direction (e.g., right-to-left) in response to detecting the right-to-left swipe gesture in FIG. 7L. FIG. 7M also illustrates displaying a first action region 744 adjacent to the first message region 732a, including a first set of one or more affordances provided to perform actions on the first message corresponding to the first message region 732a in response to detecting the right-to-left swipe gesture in FIG. 7L.

FIG. 7M is similar to and adapted from FIG. 7D. As such, FIG. 7D and FIG. 7M include similar user interfaces and elements labeled with the same reference number in both figures have the same function, only the differences are described herein for the sake of brevity. As shown in FIG. 7M, the first action region 744 includes: a reply affordance 746a, a move affordance 746b, and a trash affordance 746c (sometimes referred to collectively as the "affordances 746"). In some embodiments, the first action region 744 includes any number of affordances. In some embodiments, one or more of the affordances 746 may be replaced with other action options from a preferences menu.

FIGS. 7N-7O illustrate a sequence in which a second set of one or more affordances is displayed within the first pane 7120. FIG. 7N illustrates detecting a left-to-right swipe gesture within the first message region 732a with a contact 7130. FIG. 7I illustrates sliding the first message region 732a in a second direction (e.g., left-to-right) in response to detecting the left-to-right swipe gesture in FIG. 7N. FIG. 7O also illustrates displaying a second action region 760 adjacent to the first message region 732a, including a second set of one or more affordances provided to perform actions on the first message corresponding to the first message region 732a in response to detecting the left-to-right swipe gesture in FIG. 7N.

FIG. 7N is similar to and adapted from FIG. 7L. As such, FIG. 7L and FIG. 7N include similar user interfaces and elements labeled with the same reference number in both figures have the same function, only the differences are described herein for the sake of brevity. FIG. 7O is similar to and adapted from FIG. 7I. As such, FIG. 7O and FIG. 7I include similar user interfaces and elements labeled with the same reference number in both figures have the same function, only the differences are described herein for the sake of brevity. As shown in FIG. 7O, the second action region 760 includes an unread affordance 762, which, when activated (e.g., with a contact), causes the first message corresponding to the first message region 732a to be marked as unread. In some embodiments, the second action region 760 includes any number of affordances. In some embodiments, the unread affordance 762 may be replaced with other action options from a preferences menu.

FIGS. 7O-7P illustrate a sequence in which in which a message view 7160 replaces display of the conversation view 7150 within the first pane 7120. FIG. 7O further illustrates detecting a contact 7142 at a location corresponding to the second row within the second pane 7120 that corresponds to the message 704b. FIG. 7P illustrates replacing display of the conversation view 7150 within the first pane 7120 with a message view 7160 for the message 704b in response to selection of the message 704b within the first pane 7120 in FIG. 7O.

As shown in FIG. 7P, the message view 7160 includes the contents 7162 of the message 704b. In FIG. 7P, the conversation 704a is displayed in the background as indicated by the horizontal orientation of the view mode affordance 7111a and the non-shading of the first row within the second pane 7110. In FIG. 7L, the message 704b is displayed in the foreground or "in focus" as indicated by the vertical orientation of the view mode affordance 7111b and the shading of the second row within the second pane 7110.

FIGS. 8A-8C illustrate a flow diagram of a method 800 of bundling electronic communications in accordance with some embodiments. The method 800 is performed at an electronic device (e.g., the portable multifunction device 100 in FIG. 1A, or the device 300 in FIG. 3) with a one or more processors, non-transitory memory, a display, and an input device. In some embodiments, the display is a touchscreen display and the input device is on or integrated with the display. In some embodiments, the display is separate from the input device. Some operations in method 800 are, optionally, combined and/or the order of some operations is, optionally, changed.

As described below, the method 800 provides an intuitive way to bundle electronic communications. The method reduces the cognitive burden on a user when bundling electronic communications, thereby creating a more efficient human-machine interface. For battery-operated electronic devices, enabling a user to bundle electronic communications faster and more efficiently conserves power and increases the time between battery charges.

The device displays (802), on the display, an inbox view of a messaging application that includes a plurality of rows representing electronic communications, the plurality of rows including a first row representing a first plurality of messages that satisfy one or more conversation criteria that indicate that each of the first plurality of messages are a part of a same respective conversation, and a second row representing a second plurality of messages that satisfy a first category criterion but are not part of a same conversation. In some embodiments, the electronic communications include email conversations, email messages, instant message conversations, instant messages, SMSs, MMSs, talk-to-text, and/or the like. In some embodiments, the inbox view corresponds to a grouping of electronic communications such as a first folder (e.g., inbox, drafts, sent, junk, trash, all mail, or a custom folder) or a first tag. In some embodiments, the one or more conversation criteria are satisfied when messages have a same group of participants, a same subject line, similar content, and/or the like.

For example, the second plurality of messages is a bundle of messages that correspond to a first bundling category (e.g., the first category criterion) in a condensed view mode. In some embodiments, the second plurality of messages do not satisfy the one or more conversation criteria. Thus, the second plurality of messages are not part of a same conversation. In some embodiments, a third plurality of messages represented by a third row satisfy a second bundling category (e.g., the second category criterion) but do satisfy neither the one or more conversation criteria nor the first bundling category. In some embodiments, the inbox view includes an arbitrary number of rows. In some embodiments, an arbitrary number of rows among the plurality of rows in the inbox view represent conversations. In some embodiments, an arbitrary number of rows among the plurality of rows in the inbox view represent bundles of messages. As such, according to some embodiments, the inbox view includes rows for both conversations and bundles of messages, which provides the user with a more intuitive and less cluttered interface by reducing the amount of room taken up by bulk messages in the list of messages and enabling the user to see more of the non-bulk messages without scrolling the list of message.

As one example, FIG. 5A shows a folder view 502 associated with an inbox folder for an electronic mail (email) and/or messaging application within the display area 501 of the device 100. In FIG. 5A, the inbox folder view 502 includes a plurality of rows in condensed view mode, including: a first row that corresponds to a conversation 504*a* (e.g., with two messages); a second row that corresponds to a bundle of messages 504*b* that satisfy an updates criterion 515; and a third row that corresponds to a conversation 504*c* (e.g., with a single message).

As another example, FIG. 5N shows a user interface for an electronic mail (email) and/or messaging application within the display area 501 of the device 100. In FIG. 5N, the user interface includes a folders pane 5110 and a content pane 5120. As shown in FIG. 5N, the folders pane 5110 includes: a first row that corresponds to a conversation 5112*a* (e.g., with one message); a second row that corresponds to a bundle of messages 5112*b* that satisfy a travel criterion 5115*a*; a third row that corresponds to a conversation 5112*c* (e.g., with one message); and a fourth row that corresponds to a bundle of messages 5112*d* that satisfy a fashion criterion 5115*b*.

In some embodiments, the plurality of rows in the inbox view is sorted (804) by date, and the second row representing the plurality of messages is included in the inbox view based on a date of a most recently received message among the plurality of messages. For example, with reference to FIG. 5A, the conversation 504*a* represented by the first row includes a message with a more recent timestamp than the messages included in the bundle of messages 504*b* represented by the second row. However, continuing with this example, the bundle of messages 504*b* represented by the second row includes a message with a more recent timestamp than the message included in the conversation 504*c* represented by the third row.

In some embodiments, the first category criterion corresponds to (806) one of a sender type of the second plurality of messages or a content type of the second plurality of messages. As one example, with reference to FIG. 5A, messages included in the bundle of messages 504*b* satisfy the updates criterion 515 (e.g., messages associated with social media updates, posts, responses, comments, etc.). As another example, with reference to FIG. 5N, messages included in the bundle of messages 5112*b* satisfy the travel criterion 5115*a* (e.g., messages with content related to travel, hotels, airplane tickets, etc.).

In some embodiments, the first category criterion is a promotions criterion for bulk messages sent by a company en masse that are intended to advertise a product or service. For example, a message from a retailer advertising a suit sale, a message from an airline company advertising a one-day sale on airline fares, and a message from a vacation rental company advertising last minute vacation home rentals are organized into a bundle that satisfies the promotions criterion. In some embodiments, the first category criterion is a newsletters criterion for bulk messages sent by an entity en masse that disseminate periodic information or updates. For example, messages from the dean or administration of a user's school, periodic messages associated with blogs to which the user is subscribed and periodic messages from associations to which the user is a member (e.g., AARP, AAA, bar association, etc.) are organized into a bundle that satisfies the newsletters criterion.

In some embodiments, the first category criterion is a reservations criterion for machine-generated messages associated with an upcoming event for the user. For example, messages associated with an upcoming dinner reservation, an upcoming airplane flight, an upcoming hotel stay, and/or the like are organized into a bundle that satisfies the reservations criterion. In some embodiments, the first category criterion is a purchases criterion for machine-generated messages associated with purchases made by the user. For example, messages associated with online purchases, ride share receipts, shipping notifications, and/or the like are organized into a bundle that satisfies the purchases criterion. In some embodiments, the first category criterion is a finance criterion for machine-generated messages associated with financial accounts or transactions. For example, messages associated with person-to-person payments and payments requests, bills, credit card statements, bank statements, bank transactions, brokerage notifications and prospectuses, and/or the like are organized into a bundle that satisfies the finance criterion.

In some embodiments, the first category criterion is a social activity criterion for machine-generated messages related to activity on social media networks, online dating services, media-sharing services, and/or the like. For example, messages associated with contact/friend requests, postings, comments, personal messages, photo tags, etc. are organized into a bundle that satisfies the social activity criterion. In some embodiments, the first category criterion is a notifications criterion for machine-generated messages associated with updates not covered by other bundling criteria. For example, messages associated with account security such as unidentified login attempts, credit card fraud alerts, password resets, and/or the like are organized into a bundle that satisfies the notifications criterion. In some embodiments, the first category criterion corresponds to bulk/spam email messages.

In some embodiments, the second row is displayed (808) in a condensed view mode prior to detecting the user input. As one example, in FIG. 5A, the second row representing the bundle of messages 504*b* is displayed in the condensed view mode. According to some embodiments, the horizontal orientation of the chevrons associated with the view mode affordance 514*b*, in FIG. 5A, indicate that the second row representing the bundle of messages 504*b* is displayed in the condensed view mode. As another example, in FIG. 5N, the second row in the folders pane 5110 representing the bundle of messages 5112*b* is displayed in the condensed view mode. According to some embodiments, the horizontal orientation of the chevrons associated with the view mode affordance 5114*b*, in FIG. 5N, indicate that the second row representing the bundle of messages 5112*b* is displayed in the condensed view mode. As such, according to some embodiments, when displayed in the condensed mode, the rows occupy less space while still conveying important information regarding the messages represented by the rows, which provides the user with a more intuitive and less cluttered interface by informing the user of the number and status of the messages in the row, that will help a user decide whether or not to expand the row to view the messages in the row.

In some embodiments, the condensed view mode includes (810) one or more of an indication of the first category, one or more senders of the plurality of messages represented by the second row, an indication of a most recently received message among the plurality of messages represented by the second row (e.g., timestamp and/or blurb), an indication of a count of the plurality of messages represented by the second row, or an indication of a count of the unread messages among the plurality of messages represented by the second row. As one example, in FIG. 5A, the second row representing the bundle of messages 504*b* includes: a timestamp of a most recently received message in the bundle of messages 504*b*; the sender(s) of messages in the bundle of messages 504*b*; and a messages affordance 517 indicating the total number of messages included in the bundle of messages 504*b* received today and the number of unread messages included in the bundle of messages 504*b*. As another example, in FIG. 5N, the second row representing the bundle of messages 5112*b* includes: a timestamp of a most recently received message in the bundle of messages 5112*b*; the sender(s) of messages in the bundle of messages 5112*b*; and a messages affordance 5117*a* indicating the total number of messages included in the bundle of messages 5112*b* received today and the number of unread messages included in the bundle of messages 5112*b*.

In some embodiments, the second plurality of messages represented by the second row are not displayed (812) in the inbox view while the second row is displayed in the condensed view mode. For example, while in the condensed view mode in FIG. 5A, the second row representing the bundle of messages 504*b* includes a timestamp of a most recently received message in the bundle of messages 504*b* and at least some of the sender(s) of messages in the bundle of messages 504*b*, but does not include the second plurality of messages.

In some embodiments, the second row includes (814) a view mode affordance provided to toggle between the condensed view mode and an expanded view mode of the second row. As one example, in FIG. 5A, the first row representing the conversation 504*a* includes a view mode affordance 514*b*, which, when activated (e.g., with a contact), causes the second row to change from the condensed view mode to an expanded view mode (e.g., as shown in FIGS. 5B-5C). Similarly, in FIG. 5A, the second row representing the bundle of messages 504*b* includes a view mode affordance 514*b*, which, when activated (e.g., with a contact), causes the second row to change from the condensed view mode to an expanded view mode (e.g., as shown in FIGS. 5E-5F). And, in FIG. 5A, the third row representing the conversation 504*c* includes a view mode affordance 514*c*, which, when activated (e.g., with a contact), causes the third row to change from the condensed view mode to an expanded view mode.

The device detects (816) an input, via the input device, corresponding to selection of a respective row from among the plurality of rows in the inbox view. As one example, FIG. 5A shows a contact 520 detected at a location corresponding to the view mode affordance 514*a*. As another example, FIG. 5D shows a contact 550 detected at a location corresponding to the view mode affordance 514*b*. As yet another example, FIG. 5N shows a contact 6124 detected at a location corresponding to the view mode affordance 5114*b*. As yet another example, FIG. 6A shows the focus selector 603 at a location corresponding to the view mode affordance 616*a*.

In response to detecting the input, and in accordance with a determination that the respective row corresponds to the first row, the device displays (820), on the display, additional information corresponding to two or more messages from the conversation of related messages that are represented by the first row. According to some embodiments, the device displays two or messages included in the conversation of related messages. In some embodiments, the two or more messages from the conversation replace the inbox view. In some embodiments, the two or more messages from the conversation are displayed inline in the inbox view. In some embodiments, the two or more messages are displayed in an adjacent content pane. As such, according to some embodiments, the user is able to easily view/access additional information (e.g., an expanded view) corresponding to the first row without unnecessarily cluttering the inbox view.

As one example, in FIG. 5B, the inbox folder view 502 is replaced with a conversation view 532 with messages 534*a* and 534*b* included in the conversation 504*a* in response to selection of the view mode affordance 514*a* in FIG. 5A. As another example, in FIG. 5C, the messages 534*a* and 534*b* included in the conversation 504*a* are displayed inline in the inbox folder view 502 in response to selection of the view mode affordance 514*a* in FIG. 5A. As yet another example, in FIG. 6B, the content 622 in the content pane 620 is replaced with the messages 632*a* and 632*b* included in the conversation 612*a* in response to selection of the view mode affordance 616*a* in FIG. 6A.

In response to detecting the input, and in accordance with a determination that the respective row corresponds to the second row, the device displays (822), on the display, additional information corresponding to two or more messages from among the second plurality of messages that are represented by the second row, including a first message and a second message that both satisfy the first category criterion but not part of a same conversation. According to some embodiments, input toggles the view mode of the bundle of messages from a condensed view mode to an expanded view mode. As such, according to some embodiments, the user is able to easily view/access additional information (e.g., an expanded view) corresponding to the second row without unnecessarily cluttering the inbox view. In some embodiments, the first message is part of a first conversation and the second message is part of a second conversation that is different from the first conversation. As such, in some embodiments, the first and second messages are associated with different conversations. In some embodiments, the first and second messages have different senders or participants. In some embodiments, the first and second messages do not include overlapping content.

In some embodiments, the two or more messages included in the bundle of messages replaces the inbox view. In some embodiments, the two or more messages included in the bundle of messages are displayed inline in the inbox view. In some embodiments, the two or more messages included in the bundle of messages are displayed in an adjacent content pane.

As one example, in FIG. 5E, the inbox folder view 502 is replaced with a bundle view 552 in response to detecting selection of the view mode affordance 514b in FIG. 5D. As another example, in FIG. 5F, the messages 554a, 554b, and 554c included in the bundle of messages 504b are displayed inline in the inbox folder view 502 in response to detecting selection of the view mode affordance 514b in FIG. 5D. As another example, in FIG. 5O, the content 5122 displayed in the content pane 5120 is replaced with the message 5132a, the sub-bundle of messages 5132b, and the message 5132c included in the bundle of messages 5112b in response to selection of the view mode affordance 5114b in FIG. 5N.

In some embodiments, the additional information corresponding to the two or more messages from the conversation of related messages that are represented by the first row is displayed (824) inline in the inbox view, and the additional information corresponding to the two or more messages from among the plurality of messages that are represented by the second row is displayed inline in the inbox view. According to some embodiments, the device maintains display of at least a portion of the first and second rows, and the device displays the additional information as rows in the inbox view. As such, according to some embodiments, the user is able to easily view/access additional information (e.g., an expanded view) corresponding to the second row inline, which provides the user with a more intuitive and less cluttered interface. As one example, in FIG. 5C, the messages 534a and 534b (e.g., the additional information) included in the conversation 504a are displayed inline in the inbox folder view 502. As another example, in FIG. 5F, the messages 554a, 554b, and 554c (e.g., the additional information) included in the bundle of messages 504b are displayed inline in the inbox folder view 502.

In some embodiments, the additional information corresponding to the two or more messages from the conversation of related messages that are represented by the first row replaces display of (826) the inbox view, and the additional information corresponding to the two or more messages from among the plurality of messages that are represented by the second row replaces display of the inbox view. According to some embodiments, the device replaces display of the inbox view with the two or more messages corresponding to the conversation or the two or more messages from the bundle of messages. As such, according to some embodiments, the user is able to easily view/access additional information (e.g., an expanded view) corresponding to the second row in a new interface that replaces the inbox view, which provides the user with a more intuitive and less cluttered interface. As one example, in FIG. 5B, the inbox folder view 502 is replaced with a conversation view 532 that includes the messages 534a and 534b (e.g., the additional information) from the conversation 504a. As another example, in Figure in FIG. 5E, the inbox folder view 502 is replaced with a bundle view 552 that includes the messages 554a, 554b, and 554c (e.g., the additional information) from the bundle of messages 504b.

In some embodiments, the additional information corresponding to the two or more messages from the conversation of related messages that are represented by the first row is displayed (828) in a content pane separate from the inbox view displayed in an inbox pane, and the additional information corresponding to the two or more messages from among the plurality of messages that are represented by the second row is displayed in the content pane separate from the inbox view displayed in the inbox pane. According to some embodiments, the device maintains display of the inbox view in the inbox pane and displays the additional information in the separate content pane. As such, according to some embodiments, the user is able to easily view/access additional information (e.g., an expanded view) corresponding to the second row in a separate content pane, which provides the user with a more intuitive and less cluttered interface. As one example, in FIG. 6B, the device maintains display of the folders pane 610 and replaces display of the content 622 in the content pane 620 with the messages 632a and 632b (e.g., the additional information) from the conversation 612a. As another example, in FIG. 5O, the device maintains display of the folders pane 5110 and replaces display of the content 5122 in the content pane 5120 with the message 5132a, the sub-bundle of messages 5132b, and the message 5132c (e.g., the additional information) from the bundle of messages 5112b.

In some embodiments, the two or more messages from among the plurality of messages that are represented by the second row include (830) a subset of the plurality of messages selected based on a predetermined criterion. In some embodiments, the first and second messages are the most recent messages in the second plurality of messages. In some embodiments, the first and second messages are the most recent messages received today. In some embodiments, the first and second messages are the most recent unread messages. some embodiments, the first and second messages are the most recent messages received from VIP contacts (e.g., a list of specific contacts). In some embodiments, the first and second messages are the most recent messages from the user's most frequent contacts.

In some embodiments, the user input corresponds to (832) selection of the view mode affordance, and the second row is displayed in the expanded view mode after detecting the user input. In some embodiments, the expanded view shows a limited number of the second plurality of messages in the bundle of messages based on the category criterion. As one example, in FIG. 5F, the second row representing the bundle of messages 504b is displayed in the expanded view mode in response to selection of the view mode affordance 514b in FIG. 5D. For example, the horizontal orientation of the chevrons associated with the view mode affordance 514b in FIG. 5D indicate that the second row representing the bundle of messages 504b is displayed in the condensed view mode, and the vertical orientation of the chevrons associated with view mode affordance 514b in FIG. 5F indicate that the second row representing the bundle of messages 504b is displayed in the expanded view mode.

As another example, in FIG. 5O, the second row representing the bundle of messages 5112b is displayed in the expanded view mode in response to selection of the view mode affordance 5114b in FIG. 5N. For example, the horizontal orientation of the chevrons associated with the view mode affordance 5114b in FIG. 5N indicate that the second row representing the bundle of messages 5112b is displayed in the condensed view mode, and the vertical orientation of the chevrons associated with view mode affordance 5114b in FIG. 5O indicate that the second row representing the bundle of messages 5112b is displayed in the expanded view mode.

In some embodiments, the expanded view mode includes (834) an affordance provided to display the plurality of messages different from the two or more messages. In some embodiments, the expanded view of the bundle of messages represented by the second row includes: X unread messages or the X most recent messages, and an affordance for viewing all messages include in bundle of messages. In some embodiments, the expanded view mode shows a limited number of the second plurality of messages, and the balance of the second plurality of the messages are viewable by selecting the affordance. In some embodiments, the two or more messages include the second plurality of messages.

As one example, in FIG. 5E, the bundle view 552 includes a messages affordance 517, which, when activated (e.g., with a contact), causes display of the unread messages included in the bundle of messages 504b or all messages included in the bundle of messages 504b. As another example, in FIG. 5F, the messages affordance 517 is displayed in the inbox folder view 502.

As yet another example, in FIG. 5O, the content pane 5120 includes a messages affordance 5117a, which, when activated (e.g., with a contact), causes display of the unread messages included in the bundle of messages 5112b or all messages included in the bundle of messages 5112b. Continuing with this example, in FIG. 5P, the content pane 5120 displays all messages included in the bundle of message 5112b in response to selection of the messages affordance 5117a in FIG. 5O.

In some embodiments, the expanded view of the bundle of messages represented by the second row includes: X unread or the X most recent messages, an affordance for viewing all messages include in bundle of messages, and a sub-bundle associated with a sub-category criterion in a condensed view. As one example, in FIG. 5Q, a row representing a sub-bundle of messages 5132b that satisfy the travel criterion 5115a and also a Europe sub-criterion 5131 (e.g., messages with content related to European travel, hotels, airplane tickets, etc.) is displayed inline in the folders pane 5110. Continuing with this example, in FIG. 5R, additional information (e.g., the conversations/messages 5142a and 5142b) for the sub-bundle of messages 5132b is displayed inline in the inbox folder pane 5110 and the content 5144 for the conversation/message 5142a is displayed in the content pane 5120 in response to selection of the view mode affordance 5134b in FIG. 5Q. For example, the horizontal orientation of the chevrons associated with the view mode affordance 5134b in FIG. 5Q indicate that the row representing the sub-bundle of messages 5132b is displayed in the condensed view mode, and the vertical orientation of the chevrons associated with view mode affordance 5134b in FIG. 5R indicate that the second row representing the sub-bundle of messages 5132b is displayed in the expanded view mode.

In some embodiments, the inbox view of the messaging application includes (836) a third row representing a third plurality of messages that satisfy a second category criterion different from the first category criterion. In some embodiments, the second category criterion corresponds to one of a sender type of the third plurality of messages or a content type of the third plurality of messages. For example, FIG. 5N shows a user interface for an electronic mail (email) and/or messaging application within the display area 501 of the device 100. In FIG. 5N, the user interface includes a folders pane 5110 and a content pane 5120. As shown in FIG. 5N, the folders pane 5110 includes: a first row that corresponds to a conversation 5112a (e.g., with one message); a second row that corresponds to a bundle of messages 5112b that satisfy a travel criterion 5115a (e.g., the first category criterion also herein called the first bundling criteria); a third row that corresponds to a conversation 5112c (e.g., with one message); and a fourth row that corresponds to a bundle of messages 5112d that satisfy a fashion criterion 5115b (e.g., the second category criterion also herein called the second bundling criteria).

In some embodiments, the inbox view is included in an inbox pane, and the device displays (838), on the display, a content pane adjacent to the inbox pane, where the content pane includes information associated with the conversation of related messages represented by the first row or the plurality of messages represented by the second row. For example, FIG. 5Q shows a user interface for an electronic mail (email) and/or messaging application within the display area 501 of the device 100. In FIG. 5Q, the user interface includes a folders pane 5110 and a content pane 5120. As shown in FIG. 5N, the folders pane 5110 corresponds to an inbox folder that includes electronic communications to and/or from the user of the device 100. In FIG. 5Q, the folders pane 5110 includes a second row that corresponds to a bundle of messages 5112b that satisfy the travel criterion 5115a, and the content pane 5120 includes content 5138 for the conversation/message 5132a included in the bundle of messages 5112b.

In some embodiments, the content pane includes (840) an indication that the information included in the content pane corresponds to the plurality of messages that do not meet the one or more conversation criteria represented by the second row. In some embodiments, the content pane includes a badge corresponding to the bundling category. In some embodiments, the content pane includes a stack of overlapping messages from the bundle of messages. For example, in FIG. 5Q, the content pane 5120 includes an indicator (e.g., a badge or text description) of the travel criterion 5115a. For example, in FIG. 5Q, the conversation 5132a is displayed as a top message in a stack of messages 5139 associated with the bundle of messages 5112b that satisfy the travel criterion 5115a.

In some embodiments, the information included in the content pane has (842) a different appearance for the plurality of messages that do not meet the one or more conversation criteria (e.g., stacked and obscuring each other), the conversation of related messages (e.g., displayed adjacent to each other and separated by message delimiters such as spaces or borders), and a message (e.g., displayed by itself). As one example, in FIG. 5Q, the messages/conversations associated with the bundle of messages 5112b are displayed in a stack of messages 5139 in the content pane 5120 with the content 5138 of the conversation 5132a displayed on the top of the stack of messages 5139. As another example, in FIG. 6B, rows representing the messages 634a and 634b included in the conversation 612a are displayed in the content pane 620. As yet example, in FIG. 5N, the content 5122 of the messages/conversation 5122a is displayed in the content pane 5120.

It should be understood that the particular order in which the operations in FIGS. 8A-8C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 800 described above with respect to FIGS. 8A-8C. For example, the contacts, gestures, user interface objects, and focus selectors described above with reference to method 800 optionally have one or more of the characteristics of the contacts, gestures, user interface objects, and focus selectors described herein with reference to other methods described herein (e.g., methods 900 and 1000). For brevity, these details are not repeated here.

FIGS. 9A-9C illustrate a flow diagram of a method 900 of filtering electronic communications in accordance with some embodiments. The method 900 is performed at an electronic device (e.g., the portable multifunction device 100 in FIG. 1A, or the device 300 in FIG. 3) with a one or more processors, non-transitory memory, a display, and an input device. In some embodiments, the display is a touchscreen display and the input device is on or integrated with the display. In some embodiments, the display is separate from the input device. Some operations in method 900 are, optionally, combined and/or the order of some operations is, optionally, changed.

As described below, the method 900 provides an intuitive way to filter electronic communications. The method reduces the cognitive burden on a user when filtering electronic communications, thereby creating a more efficient human-machine interface. For battery-operated electronic devices, enabling a user to filter electronic communications faster and more efficiently conserves power and increases the time between battery charges.

The device concurrently displays (902), on the display, a plurality of representations of electronic communications associated with a first grouping (e.g., a first folder or first tag), and a filter affordance (e.g., a filter icon within a portion of a title bar or chrome region) that corresponds to a set of one or more filter criteria. In some embodiments, the electronic communications include email conversations, email messages, instant message conversations, instant messages, SMSs, MMSs, talk-to-text, and/or the like.

As one example, FIG. 5A shows a folder view 502 associated with an inbox folder for an electronic mail (email) and/or messaging application within the display area 501 of the device 100. In FIG. 5A, the inbox folder view 502 includes a plurality of rows representing a conversation 504a (e.g., with two messages), a bundle of messages 504b that satisfy an updates criterion 515, a conversation 504c (e.g., with a single message), and a conversation 504d (e.g., with a single message). In FIG. 5A, the inbox folder view 502 also includes a filter affordance 518a.

As another example, FIG. 5N shows a user interface for an electronic mail (email) and/or messaging application within the display area 501 of the device 100. In FIG. 5N, the user interface includes a folders pane 5110 and a content pane 5120. As shown in FIG. 5N, the folders pane 5110 includes rows representing a conversation 5112a (e.g., with one message), a bundle of messages 5112b that satisfy a travel criterion 5115a, a conversation 5112c (e.g., with one message), and a bundle of messages 5112d that satisfy a fashion criterion 5115b. In FIG. 5N, the folders pane 5110 also includes the filter affordance 518a. As shown in FIG. 5N, the content pane 5120 includes content 5122 for the conversation 5112a.

As yet another example, FIG. 6A shows a window 602 for an electronic mail (email) and/or messaging application within the display area 601 that includes a folders pane 610 and a content pane 620. As shown in FIG. 6A, the folders pane 610 includes rows representing a conversation 612a (e.g., with two or more messages), a conversation 612b (e.g., with one message), a conversation 612c (e.g., with one message), a conversation 612d (e.g., with one message), a conversation 612e (e.g., with one message), and a conversation 612a (e.g., with one message) (partially occluded). In FIG. 6A, the folders pane 610 also includes the filter affordance 616b. As shown in FIG. 6A, the content pane 620 includes content 622 for the conversation 612b.

In some embodiments, satisfying a respective criterion from among the set of one or more filter criteria includes (904) determining that electronic communications associated with the second set of representations of electronic communications are categorized as important based on past user actions with electronic communications. In some embodiments, a message is automatically categorized or identified as important when the message is sent by a VIP sender (e.g., a sender on a list of specified senders) or the user frequently communicates with the sender. In some embodiments, a message is automatically categorized or identified as important when the message is starred or marked as an urgent message. In some embodiments, a message is automatically categorized or identified as important when the message is sent in reply to a starred or urgent message. In some embodiments, a message is automatically categorized or identified as important when the message is sent directly or only to the user (e.g., the message is not a bulk/spam message and the message is not associated with a list server or a subscription). In some embodiments, a message is automatically categorized or identified as important when the message has a subject or content that includes one or more words that match a list of predefined words (e.g., urgent, important, time sensitive, etc.). As one example, in FIG. 5I, the filters pane 582 includes the important filter 586b. As another example, in FIG. 6C, the filters menu 640 includes the important filter 642b.

While concurrently displaying the plurality of representations of electronic communications and the filter affordance, the device detects (906) a selection input, via the input device, that corresponds to selection of the filter affordance. As one example, FIG. 5H shows selection of the filter affordance 518a with a contact 580. As another example, FIG. 5K shows selection of the filter affordance 518a with a contact 596.

In response to detecting the selection input, and in accordance with a determination that the selection input corresponds to a first input type (e.g., a one finger tap, a one finger light press gesture, a single click with a focus selector, or the like), the device (908): ceases to display a first set of representations of electronic communications (e.g., the first set representations corresponds to one or more electronic communications) from among the plurality of representations of electronic communications associated with the first grouping that do not match the set of one or more filter criteria; displays a second set of representations of electronic communications (e.g., the second set representations corresponds to one or more electronic communications) from among the plurality of representations of electronic communications associated with the first grouping that match the set of one or more filter criteria; and displays an indication of the set of one or more filter criteria that have been applied to the electronic communications associated with the first grouping. As such, according to some embodiments, the user is able to quickly filter the first grouping to provide a more tailored interface that is less cluttered and includes more of the messages that the user wants to see and fewer of the messages that the user has elected to filter out, while still providing the user with a simple way to view the messages that have been filtered out.

In some embodiments, ceasing to display the first set of representations includes eliding a subset of the previously displayed plurality of representations of electronic communications associated with the first grouping that do not match the set of one or more filter criteria. In some embodiments, displaying the second set of representations includes maintaining display of a subset of the previously displayed plurality of representations of electronic communications associated with the first grouping that match the filter criteria. In some embodiments, the set of one or more filter criteria will continue to apply to the first grouping until the user of the device again selects the filter affordance to toggle off the set of one or more filter criteria. For example, the set of one or more filter criteria will continue to apply even if the user of the device selects a second grouping.

As one example, FIG. 5L shows the filtered inbox folder view 5114 in response to the selection input of the filter affordance 518a in FIG. 5K that corresponds to the first input type (e.g., a one finger tap gesture). According to some embodiments, each of the rows in the filtered inbox folder view 5114 in FIG. 5L represents one or more messages (e.g., a bundle of messages, or a conversation with a single message or a plurality of messages) that satisfy the set of filter criteria (e.g., the important filter 586b and the unread filter 586e).

As another example, FIG. 6D shows the filtered inbox folder in the folders pane 610 in response to the selection input of the filter affordance 616b in FIG. 6B that corresponds to the first input type (e.g., a single click with the focus selector 603). According to some embodiments, each of the rows of the filtered inbox folder within the folders pane 610 in FIG. 6D represents a conversation that satisfies the set of filter criteria (e.g., the flagged filter 642d).

In some embodiments, the indication of the set of one or more filter criteria includes (910) a description of the set of one or more filter criteria adjacent to the filter affordance. In some embodiments, the indication includes a text description of the set of filters applied to the current folder as shown in FIGS. 5L and 6D. In some embodiments, the indication includes one or more distinct icons for t the set of filters applied to the current folder. As one example, in FIG. 5L, the filtered inbox folder view 5114 includes an indication 598 of the set of filters applied to the current folder (e.g., the important filter 586b and the unread filter 586e). As another example, in FIG. 6D, the filter affordance 616b includes an indication of the set of filters applied to the current folder (e.g., the flagged filter 642d). As such, according to some embodiments, the user is able to keep track of the filter(s) applied to the first grouping and is alerted to the fact that a filter has been applied to the current view.

In some embodiments, the set of one or more filter criteria includes (912) two or more filter criteria. For example, in FIG. 5L, the filtered inbox folder view 5114 corresponds to the important filter 586b and the unread filter 586e being applied to the inbox folder.

In some embodiments, the second set of representations of electronic communications that match the set of one or more filter criteria are ordered (914) based on how many of the two or more filter criteria the corresponding electronic communications match. According to some embodiments, when the set of filter criteria includes two filters, electronic communications that match two criteria are sorted before electronic communications that match only one of the two filter criteria. For example, the second set of representations of electronic communications includes: a first subset of representations with electronic communications that match Filter A AND Filter B; a second subset of representations with electronic communications that match Filter A AND-NOT Filter B; and a third subset of representations with electronic communications that match Filter B ANDNOT Filter A. In this example, the second set of representations is sorted such that the first subset of representations is displayed before the second subset of representations, which is displayed before the third subset of representations.

In some embodiments, the second set of representations of electronic communications that match the set of one or more filter criteria are displayed in an inbox pane, and the device concurrently displays (916), on the display, a content pane adjacent to the inbox pane, where the content pane includes information corresponding to a respective electronic communication that matches the set of one or more filter criteria. For example, FIG. 6D shows the filtered inbox folder in the folders pane 610 and the content 652 for the conversation 612c included in the filtered inbox folder displayed in the content pane 620 in response to the selection input of the filter affordance 616b in FIG. 6B that corresponds to the first input type (e.g., a single click with the focus selector 603).

In some embodiments, in response to detecting the selection input, and in accordance with a determination that the selection input corresponds to the first input type, the device displays (918), on the display, an indication of a portion of the first set of representations of electronic communications that have been elided, where the indication is displayed between first and second subsets of the second set of representations of electronic communications. As one example, FIG. 5L shows an expansion affordance 5102a that separates the conversation 504a the conversation 504f within the filtered inbox view 5114. For example, the first set of one or more messages are elided due to not satisfying the set of filter criteria. As another example, FIG. 6D shows an expansion affordance 654 above the conversation 612c in the folders pane 610 associated with the filter inbox folder. For example, the set of one or more messages are elided due to not satisfying the set of filter criteria (e.g., the flagged filter 642d). As such, according to some embodiments, the expansion affordance provides a visual queue of electronic communications that have been elided in a non-obtrusive manner.

In some embodiments, displaying the second set of representations of electronic communications from among the plurality of representations of electronic communications associated with the first grouping that match the set of one or more filter criteria includes (920): displaying a first subset of representations of electronic communications that match the set of one or more filter criteria and a second subset of representations of electronic communications that match the set of one or more filter criteria from among the plurality of representations of electronic communications associated with the first grouping; and displaying an expansion affordance between and adjacent to the first and second subsets of representations of electronic communications, where the expansion affordance is provided to display a portion of the first set of representations of electronic communications that do not match the set of one or more filter criteria. As one example, FIG. 5L shows an expansion affordance 5102a that separates the conversation 504a the conversation 504f within the filtered inbox view 5114. According to some embodiments, the expansion affordance 5102a indicates that a first set of one or more messages with timestamps between the timestamp associated with the conversation 504a and the timestamp associated with the conversation 504f have been elided. For example, the first set of one or more messages are elided due to not satisfying the set of filter criteria. When activated (e.g., with a contact), the expansion affordance 5102a causes the first set of one or more elided messages to be displayed between the conversation 504a and the conversation 504f. As such, according to some embodiments, the user is able to quickly view representations of electronic communications that have been elided in a non-obtrusive manner.

As another example, FIG. 6D shows an expansion affordance 654 above the conversation 612c in the folders pane 610 associated with the filter inbox folder. According to some embodiments, the expansion affordance 654 indicates that a set of one or more messages with timestamps before the timestamp associated with the conversation 612c have been elided. For example, the set of one or more messages are elided due to not satisfying the set of filter criteria (e.g., the flagged filter 642d). When activated (e.g., with the focus selector 603), the expansion affordance 654 causes the set of one or more elided messages to be displayed above the conversation 612c.

In some embodiments, electronic communications in the portion of the first set of representations of electronic communications that do not match the set of one or more filter criteria are associated (922) with timestamps between timestamps associated with electronic communications in the first and second subsets of representations of electronic communications that match the one or more filter criteria. As one example, FIG. 5L shows an expansion affordance 5102a that separates the conversation 504a the conversation 504f within the filtered inbox view 5114. According to some embodiments, the expansion affordance 5102a indicates that a first set of one or more messages with timestamps between the timestamp associated with the conversation 504a and the timestamp associated with the conversation 504f have been elided.

In some embodiments, the device (924): detects a second selection input that corresponds to selection of the expansion affordance; and, in response to detecting the second selection input, replaces display of the expansion affordance, on the display, with the portion of the first set of representations of electronic communications that do not match the set of one or more filter criteria, where the portion of the first set of representations of electronic communications that do not match the set of one or more filter criteria are displayed between and adjacent to the first and second subsets of representations of electronic communications that match the one or more filter criteria. According to some embodiments, selection of the expansion affordance causes a group of elided messages with timestamps between the first and second subsets of representations that match the filter criteria to be displayed. As such, according to some embodiments, the user is able to quickly view representations of electronic communications that have been elided in a non-obtrusive manner. For example, FIG. 5M shows a first set of elided messages displayed in the filtered inbox view 5114 in response to selection of the expansion affordance 5102a in FIG. 5L. As shown in FIG. 5M, the first set of elided messages corresponding to the conversations 504e, 504c, and 504d that do not match the filter criteria is displayed between the conversations 504a and 504f that match the filter criteria.

In some embodiments, selection of the expansion affordance causes a group of elided messages with timestamps before the second set of representations of electronic communications that match the filter criteria to be displayed. For example, in FIG. 6D, the expansion affordance 654 is displayed above the conversation 612c in the folders pane 610 associated with the filtered inbox folder. In this example, selection of the expansion affordance 654 would cause elided messages with timestamps before the conversation 612c to be displayed above the conversation 612c within the folders pane 610. In some embodiments, selection of the expansion affordance causes a group of elided messages with timestamps after the second set of representations of electronic communications that match the filter criteria to be displayed. For example, in FIG. 6E, the expansion affordance 666 is displayed above the conversation 662d in the folders pane 610 associated with the filtered folder A. In this example, selection of the expansion affordance 666 would cause elided messages with timestamps after the conversation 662d to be displayed below the conversation 662d within the folders pane 610.

In some embodiments, in response to detecting the selection input, and in accordance with a determination that the selection input corresponds to a second input type (e.g., a one finger long press gesture, a one finger deep press gesture, a double click with a focus selector, or the like), the device displays (926), on the display, a filter selection menu overlaid on the plurality of representations of electronic communications associated with the first grouping. As such, according to some embodiments, the user is able to quickly change the filter criteria from within the current inbox view. As one example, FIG. 5I shows the filters pane 582 replacing display of the inbox folder view 502 in response to the selection input of the filter affordance 518a in FIG. 5H that corresponds to the second input type (e.g., a one finger long press gesture). According to some embodiments, the filters pane 582 replaces display of the inbox folder view 502 when a one finger long press gesture is detected over the filter affordance 518a while the set of filter criteria are active (e.g., currently applied to the inbox folder).

As another example, FIG. 6C shows the filters menu 640 overlaid on the window 602 in response to selection input of the filter affordance 616b in FIG. 6B that corresponds to the second input type (e.g., a double click with the focus selector 603). According to some embodiments, the filters menu 640 is overlaid on the window 602 when a one finger long press gesture is detected over the filter affordance 616b while the set of filter criteria are active (e.g., currently applied to the inbox folder).

In some embodiments, the filter selection menu is provided (928) to at least one of enable or disable one or more filters among a plurality of filters included in the filter menu. In some embodiments, the filter selection menu enables the user is able to turn enable or disable any of the filters in the filter menu. For example, in FIG. 5H, the filters pane 582 includes: an inbox filter 586a, an important filter 586b, a VIP filter 586c, a flagged filter 586d, an unread filter 586e, a "To or CC" filter 586f, and an attachments filter 586g. FIGS. 5I-5.1 also show a sequence in which the filter criteria are changed to include the important filter 586b in addition to the unread filter 586e. As shown in FIG. 5I, the set of filter criteria includes the important filter 586b and the unread filter 586e as indicated by the icons 588a and 588b.

In another example, in FIG. 6C, the filters menu 640 includes: an inbox filter 642a, an important filter 642b, a VIP filter 642c, a flagged filter 642d, an unread filter 642e, a "To or CC" filter 642f, and an attachments filter 642g. As shown in FIG. 6C, the set of filter criteria includes the flagged filter 642d as indicated by the icon 646a associated with the unread filter 642e.

In some embodiments, the filter selection menu includes (930) an affordance provided to add a custom filter to the plurality of filters included in the filter menu. As one example, the filters pane 582 in FIGS. 5I-5J includes also includes a create custom filter affordance 590 for creating and adding a custom filter to the filter pane 582. As another example, the filters menu 640 in FIG. 6C also includes a create custom filter affordance 644 for creating and adding a custom filter to the filters menu 640.

In some embodiments, after detecting the selection input, the device detects (932) a sequence of one or more user inputs, via the input device, that correspond to displaying a second plurality of representations of electronic communications associated with a second grouping, and, in response to detecting the sequence of one or more user inputs, the device displays, on the display, a third set of representations of electronic communications from among the second plurality of representations of electronic communications associated with the second grouping that match the set of one or more filter criteria and the indication of the set of one or more filter criteria that have been applied to the electronic communications associated with the second grouping. In FIG. 6D, the set of filter criteria (e.g., the flagged filter 642*d*) is applied to the inbox folder (e.g., the filtered inbox folder is displayed in the folders pane 610). For example, a user changes the grouping (e.g., via the sequence of one or more user inputs) from the inbox folder to the folder A. Continuing with this example, FIG. 6E shows the set of filter criteria (e.g., the flagged filter 642*d*) applied to the folder A (e.g., the filtered folder A is displayed in the folders pane 610). As such, when the set of filter criteria are applied to a first grouping and the grouping changes from the first grouping to a second grouping, the set of filter criteria are also applied to the second grouping. This, for example, allows the user to maintain the filter criteria when switching between groupings.

In some embodiments, while displaying the third set of representations of electronic communications, the device detects (934) a second selection input, via the input device, that corresponds to selection of the filter affordance, and, in response to detecting the second selection input, and in accordance with a determination that the selection input corresponds to the first input type, the device concurrently displays, on the display, the third set of representations of electronic communications from among the second plurality of representations of electronic communications associated with the second grouping that match the set of one or more filter criteria and a fourth set of representations of electronic communications from among the second plurality of representations of electronic communications associated with the second grouping that do not match the set of one or more filter criteria. According to some embodiments, when the set of filter criteria are currently active, the set of filter criteria are deactivated by a selection input of the filter affordance that corresponds to the first input type (e.g., a one finger tap gesture, a one finger light press gesture, a single click with a focus selector, or the like). As such, according to some embodiments, the user is able to quickly toggle on/off the application of the filter criteria to the current grouping.

For example, the set of filter criteria are no longer applied to the folder A and FIG. 6F shows the (unfiltered) folder A in the folders pane 610 in response to selection input of the filter affordance 616*b* in FIG. 6E that corresponds to the first input type (e.g., a single click with the focus selector 603). As shown in FIG. 6F, the filter affordance 616*b* indicates that no filters are currently applied to folder A, as compared to FIG. 6E where the flagged filter 642*d* is applied to folder A.

It should be understood that the particular order in which the operations in FIGS. 9A-9C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 1000) are also applicable in an analogous manner to method 900 described above with respect to FIGS. 9A-9C. For example, the contacts, gestures, user interface objects, and focus selectors described above with reference to method 900 optionally have one or more of the characteristics of the contacts, gestures, user interface objects, and focus selectors described herein with reference to other methods described herein (e.g., methods 800 and 1000). For brevity, these details are not repeated here.

FIGS. 10A-10C illustrate a flow diagram of a method 1000 of displaying affordances for performing corresponding actions within a conversation view in accordance with some embodiments. The method 1000 is performed at an electronic device (e.g., the portable multifunction device 100 in FIG. 1A, or the device 300 in FIG. 3) with a one or more processors, non-transitory memory, a display, and an input device. In some embodiments, the display is a touch-screen display and the input device is on or integrated with the display. In some embodiments, the display is separate from the input device. Some operations in method 1000 are, optionally, combined and/or the order of some operations is, optionally, changed.

As described below, the method 1000 provides an intuitive way to display affordances for performing corresponding actions within a conversation view. The method reduces the cognitive burden on a user when displaying affordances for performing corresponding actions within a conversation view, thereby creating a more efficient human-machine interface. For battery-operated electronic devices, enabling a user to display affordances for performing corresponding actions within a conversation view faster and more efficiently conserves power and increases the time between battery charges.

The device displays (1002), on the display, a conversation view of a plurality of messages within a first pane of a messaging application, where the conversation view includes a first message region of a portion of a first message of the plurality of messages and a second message region of a portion of a second message of the plurality of messages. In some embodiments, the plurality of messages in the conversation satisfy one or more conversation criteria (e.g., similar participants, subject, content, etc.). In some embodiments, the user is able to scroll within the conversation view to view, for example, a third message region associated with a third message included in the conversation. In some embodiments, when the second message region is partially occluded, the user is able to scroll within the conversation view to view the balance of the second message region. As such, in this example, the entirety of the first message region is displayed within the conversation view, and a portion of the second message is displayed in the conversation view with the remainder occluded. For example, the first and second message regions include a preview or snippet of the associated messages.

FIG. 7B, for example, shows a conversation view 730 (e.g., associated with the conversation 704*a* in FIG. 7A) displayed within the display area of the device 100. As shown in FIG. 7B, the conversation view 730 includes: a header region 731*a*, a content region 731*b*, a toolbar region 731*c*, and a subject bar 734. In FIG. 7B, the content region 731*b* includes: a first message region 732*a* associated with a first message in the conversation 704*a*; a second message region 732*b* associated with a second message in the conversation 704*a*; and a portion of a third message region 732*c* associated with a third message in the conversation 704*a*

(sometimes collectively referred to as the "message regions 732"). For example, if a user scrolls the conversation view 730, the balance of the third message region 732c is displayed within the content region 731b. For example, FIGS. 7B-7C show a sequence in which the user scrolls within the conversation view 730 in response to detecting an upward swipe gesture in FIG. 7B.

In some embodiments, the conversation view includes (1004) a toolbar region including a plurality of affordances provided to perform corresponding actions on a most recent message among the plurality of messages. In some embodiments, the messages within the conversation view are sorted in reverse chronological order. As such, in FIG. 7B, for example, the first message associated with the message region 732a is the most recent message in the conversation 704a. In some embodiments, the messages within the conversation view are sorted in chronological order. As such, in FIG. 7B, for example, the first message associated with the message region 732a is the oldest message in the conversation 704a. According to some embodiments, with reference to FIGS. 7A-7K, the toolbar region 731c includes: a flag affordance 728a for flagging a respective message in the conversation 704a; a move folder affordance 728b for moving the respective message in the conversation 704a from the inbox folder to another folder; an archive affordance 728c for archiving the respective message in the conversation 704a; a reply affordance 728d for replying to or forwarding the respective message in the conversation 704a; and a draft affordance 728e for drafting a new message. In some embodiments, the respective message is the most recent message within the conversation 704a. In some embodiments, the respective message is the top-most message that is fully displayed within the conversation view 730.

In some embodiments, a respective dimension (e.g., the height) of the first message region is (1006) based at least in part on an amount of content associated with the first message, and a respective dimension (e.g., the height) of the second message region is based at least in part on an amount of content associated with the second message. As shown in FIG. 7B, according to some embodiments, a respective dimension (e.g., the height) of each of the message regions 732 is based on the amount of content for the corresponding message. For example, in FIG. 7B, a respective dimension (e.g., the height) of the first message region 732a has a value 733a, and the respective dimension (e.g., the height) of the second message region 732b has a value 733b. In this example, the value 733b is greater than the value 733a because the first message associated with the first message region 732a has less content (e.g., lines of text) than the second message associated with the second message region 732b.

In some embodiments, the device displays (1008), on the display, a list view including a plurality of rows representing a plurality of conversations in a second pane adjacent to the first pane that includes the conversation view. For example, the plurality of conversations corresponds to a particular grouping such as a specified mailbox, folder, or tag. In some embodiments, the list view and the conversation view are concurrently displayed side-by-side to enable the user to select between different conversations to be shown in the conversation view. As such, for example, the device 100 displays a second pane with a list of conversations adjacent to a first pane including a conversation view corresponding to a conversation selected within the list of conversations.

FIGS. 7L-7P, for example show a dual-pane user interface associated with an electronic mail (email) and/or messaging application that includes a first pane 7120 and a second pane 7110 displayed within the display area of the device 100. In FIG. 7L, for example, the second pane 7110 includes a folder view 7140 for an inbox folder. As shown in FIG. 7L, the inbox folder view 7140 includes a plurality of rows representing conversation 704a, message 704b, message 704c, and conversation 704d within the inbox folder. In FIG. 7L, the conversation 704a is displayed in the foreground or "in focus" as indicated by the vertical orientation of the view mode affordance 7111a and the shading of the first row within the second pane 7110. In FIG. 7L, for example, the first pane 7120 includes a conversation view 7150 of the conversation 704a, which is displayed in the foreground in the second pane 7110.

The device detects (1010) a user input, via the input device, that corresponds to selecting the first message region within the conversation view. As one example, FIG. 7E shows a right-to-left swipe gesture within the second message region 732b. As another example, FIG. 7H shows a left-to-right swipe gesture within the second message region 732b. As yet another example, FIG. 7J shows a contact 764 selecting the "see more" affordance 738b within the second message region 732b.

In response to detecting the user input selecting the first message region, and in accordance with a determination that the user input satisfies a first set of input criteria (e.g., a horizontal swipe within the message, selection of an actions affordance within the message region, or the like), the device displays (1012), on the display, one or more affordances provided to perform corresponding actions on the first message. In some embodiments, the first set of input criteria is satisfied when an actions affordance is selected within the first message region. In some embodiments, the first set of input criteria is satisfied when a horizontal swipe is detected within the first message region. As such, according to some embodiments, the user is able to quickly access options for performing actions on a message from within the conversation view, which saves the user time and effort and also conserves power.

As one example, FIGS. 7C-7D shows a sequence in which a first set of affordances 746a, 746b, and 746c is displayed within a first action region 744 in response to selection of the actions affordance 738c within the second message region 732b in FIG. 7C. As another example, FIGS. 7E-7F show sequence in which the first set of affordances 746a, 746b, and 746c is displayed within a first action region 744 in response to detecting the right-to-left swipe gesture within the second message region 732b in FIG. 7E. As yet another example, FIGS. 7H-7I show a sequence in which in which a second set of one or more affordances including the affordance 762 is displayed within the second action region 760 in response to detecting the left-to-right swipe gesture within the second message region 732b in FIG. 7H.

In some embodiments, satisfying the first input criteria includes (1014) detecting a horizontal swipe gesture within the first message region associated with a magnitude that is less than a threshold distance. In some embodiments, the first set of input criteria is satisfied when a horizontal swipe that is less than a threshold distance is detected within the first message region. For example, a left-to-right or a right-to-left swipe gesture with a magnitude less than 33%, 50%, 100%, etc. of the width of the message region. As one example, FIGS. 7E-7F show a sequence in which the first set of affordances 746a, 746b, and 746c is displayed within the conversation view 730 in response to detecting the right-to-left swipe gesture with a magnitude that is less than the threshold distance within the second message region 732b in FIG. 7E. As another example, FIGS. 7H-7I show a sequence in which in which the second set of one or more affordances including the affordance 762 is displayed within the conversation view 730 in response to detecting the left-to-right swipe gesture with a magnitude that is less than the threshold distance within the second message region 732b in FIG. 7H.

In some embodiments, satisfying the first input criteria includes (1016) detecting a user input that corresponds to selecting an actions affordance within the first message region. For example, FIGS. 7C-7D shows a sequence in which the first set of affordances 746a, 746b, and 746c is displayed within the conversation view 730 in response to selection of the actions affordance 738c within the second message region 732b in FIG. 7C.

In some embodiments, displaying the one or more affordances includes (1018): in accordance with a determination that the user input is associated with a first direction (e.g., right-to-left): displaying, on the display, a first set of one or more affordances adjacent to a first side of the message region, where the first set of one or more affordances is provided to perform corresponding actions on the first message; and sliding the first message region in the first direction, where at least a portion of first message region associated with a second side of the first message region opposite the first side is occluded. As one example, if an actions affordance is selected within the first message region, a first set of one or more affordances including reply, move, and trash is slid in from the right edge of the conversation view and the first message region is proportionately slid left with a portion being occluded (e.g., as shown in FIGS. 7C-7D). As another example, if a right-to-left swipe gesture is detected within the first message region, a first set of one or more affordances including reply, move, and trash is slid in from the right edge of the conversation view and the first message region is proportionately slid left with a portion being occluded (e.g., as shown in FIGS. 7E-7F and FIG. 7L-7M). In some embodiments, one or more of the first set of one or more affordances is customizable. In one example, the rightmost or middle affordance is customizable. As such, according to some embodiments, the user is able to quickly access a first set of one or more options from within the conversation view, which saves the user time and effort and also conserves power.

In some embodiments, the device (1020): detects a subsequent user input, via the input device, that corresponds to selecting a respective affordance from among the first set of one or more affordances; and, in response to detecting the subsequent user input selecting the respective affordance, displays, on the display, one or more options associated with the action that corresponds to the respective affordance. For example, the subsequent user input corresponds to a one finger tap gesture, a two finger tap gesture, a vertical swipe gesture, or the like over the respective affordance. As one example, if the user selects a reply affordance, a menu of reply options (e.g., reply, reply all, forward, and/or the like) slides up from the bottom edge of the display area (e.g., as shown in FIGS. 7F-7G).

In some embodiments, displaying the one or more affordances includes (1022): in accordance with a determination that the user input is associated with a second direction (e.g., left-to-right): displaying, on the display, a second set of one or more affordances adjacent to a second side of the message region, where the second set of one or more affordances is provided to perform corresponding actions on the first message; and sliding the first message region in the second direction, where at least a portion of first message region associated with a first side of the first message region opposite the second side is occluded. As one example, if a left-to-right swipe gesture is detected within the first message region, a second set of one or more affordances including mark as read or mark as unread is slid in from the left edge of the conversation view and the first message region is proportionately slid right with a portion being occluded (e.g., as shown in FIGS. 7H-7I and FIG. 7N-7O). In some embodiments, the second set of one or more affordances is customizable. As such, according to some embodiments, the user is able to quickly access a second set of one or more options from within the conversation view, which saves the user time and effort and also conserves power.

In some embodiments, displaying the one or more affordances includes (1024) maintaining display of the second message region within the conversation view. In some embodiments, continue to display at least a portion of the second message region as displayed prior to detecting the user input. As one example, with reference to FIGS. 7E-7F, the first message region 732a and the third message region 732c maintain their respective positions after the right-to-left swipe gesture in FIG. 7E. As another example, with reference to FIGS. 7H-7I, the first message region 732a and the third message region 732c maintain their respective positions after the left-to-right swipe gesture in FIG. 7H. As yet another example, with reference to FIGS. 7L-7M, the second message region 732b and the third message region 732c maintain their respective positions after the right-to-left swipe gesture in FIG. 7L. As yet another example, with reference to FIGS. 7N-7O, the second message region 732b and the third message region 732c maintain their respective positions after the left-to-right swipe gesture in FIG. 7N.

In response to detecting the user input selecting the first message region, and in accordance with a determination that the user input satisfies a second set of input criteria (e.g., a finger tap gesture within a header of the message region, selection of a "see more" affordance, or the like), the device replaces display of (1026) the conversation view with a message view that corresponds to the first message. As such, for example, show the selected message in a message view that replaces the conversation view. FIGS. 7J-7K, for example, show a sequence in which a message view 770 of the second message within the conversation 704a that corresponds to the second message region 732b replaces display of the conversation view 730 in response to selection of the "see more" affordance 738b within the second message region 732b in FIG. 7J.

In some embodiments, satisfying the second input criteria includes (1028) detecting a user input that corresponds to selecting a header sub-region of the first message region. In some embodiments, the second set of criteria are satisfied when a header of the first message region is selected. For example, with reference to FIG. 7B, if a contact is detected over the header sub-region 731b of the first message region 732a (not shown), a message view with the contents of the first message corresponding to the first message region 732a replaces display of the conversation view 730.

In some embodiments, satisfying the second input criteria includes (1030) detecting a user input that corresponds to selecting a "see more" affordance within the first message region. In some embodiments, the second set of criteria are satisfied when a "see more" affordance within the first message region is selected (e.g., as shown in FIGS. 7J-7K).

In some embodiments, in response to detecting the user input, and in accordance with a determination that the user input satisfies a third set of input criteria, the device performs (1032) a predefined action on the first message. As one example, if a left-to-right swipe gesture is detected within the first message region that is greater than a threshold distance (e.g., 33%, 50%, 100%, etc. of the width of the message region), a predefined action associated with one of the first set of one or more affordances is performed on the first message that corresponds to the first message region (e.g., the first message is moved to the trash). As another example, if a right-to-left swipe gesture is detected within the first message region that is greater than a threshold distance (e.g., 33%, 50%, 100%, etc. of the width of the message region), a predefined action associated with one of the second set of one or more affordances is performed on the first message that corresponds to the first message region (e.g., the first message is marked as read or marked as unread).

In some embodiments, satisfying the third input criteria includes (1034) detecting a horizontal swipe gesture within the first message region associated with a magnitude that is greater than a threshold distance. According to some embodiments, the third set of criteria are satisfied when a magnitude of a horizontal swipe gesture within the first message region is greater than the threshold distance (e.g., 33%, 50%, 100%, etc. of the width of the message region).

In some embodiments, the device detects (1036) a second user input, via the input device, corresponding to the second message region within the conversation view. In response to detecting the second user input, and in accordance with a determination that the second user input satisfies the first set of input criteria (e.g., a lateral swipe within the message, selection of an actions affordance within the message region, or the like), the device displays one or more affordances provided to perform corresponding actions to the second message. In response to detecting the second user input, and in accordance with a determination that the second user input satisfies the second set of input criteria (e.g., a finger tap gesture within a header of the message region, selection of a "see more" affordance, or the like), the device replaces display of the conversation view with a message view that corresponds on the second message. As such, for example, the user is able to similarly interact with any message within the conversation view. In FIGS. 7B-7K, for example, the user interacts with the second message region 732b that corresponds to a second message within the conversation 704a. In FIGS. 7L-7O, for example, the user interacts with the first message region 732a that corresponds to a first message within the conversation 704a. As such, according to some embodiments, the user is able to quickly access options for performing actions on a message by interacting with any of the message regions in the conversation view, which saves the user time and effort and also conserves power.

In some embodiments, prior to displaying the conversation view within the first pane of the messaging application, the device (1038): displays, on the display, a mailbox view that includes a plurality of representations of corresponding to one or more messages and one or more conversations, where the plurality of representations have a same size (e.g., rows for messages and/or conversations with a same height in a list view); and detects a second user input, via the input device, that corresponds to selecting a respective representation from among the plurality of representations. In response to detecting the second user input selecting the respective representation, and in accordance with a determination that respective representation corresponds to a message, the device replaces display of the mailbox view with a message view that corresponds to the message associated with the respective representation. In response to detecting the second user input selecting the respective representation, and in accordance with a determination that respective representation corresponds to a conversation, the device replaces display of the mailbox view with the conversation view that corresponds to the conversation associated with the respective representation, where the conversation includes the plurality of messages.

FIGS. 7A-7B, for example, show a sequence in which a conversation view 730 for a conversation 704a replaces display of the inbox folder view 702 in response to selection of the first row corresponding to the conversation 704a in FIG. 7A. As shown in FIG. 7A, a respective dimension (e.g., the height) of each of the rows in the inbox folder view 702 has the same value 703. In contrast, as shown in FIG. 7B, the respective dimension (e.g., the height) of each of the message regions 732 is based on the amount of content for the corresponding message. In FIG. 7B, the respective dimension (e.g., the height) of the first message region 732a has a value 733a, and the respective dimension (e.g., the height) of the second message region 732b has a value 733b. In this example, the value 733b is greater than the value 733a because the first message associated with the first message region 732a has less content (e.g., lines of text) than the second message associated with the second message region 732b.

It should be understood that the particular order in which the operations in FIGS. 10A-10C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800 and 900) are also applicable in an analogous manner to method 1000 described above with respect to FIGS. 10A-10C. For example, the contacts, gestures, user interface objects, and focus selectors described above with reference to method 1000 optionally have one or more of the characteristics of the contacts, gestures, user interface objects, and focus selectors described herein with reference to other methods described herein (e.g., methods 800 and 900). For brevity, these details are not repeated here.

Figure 11:
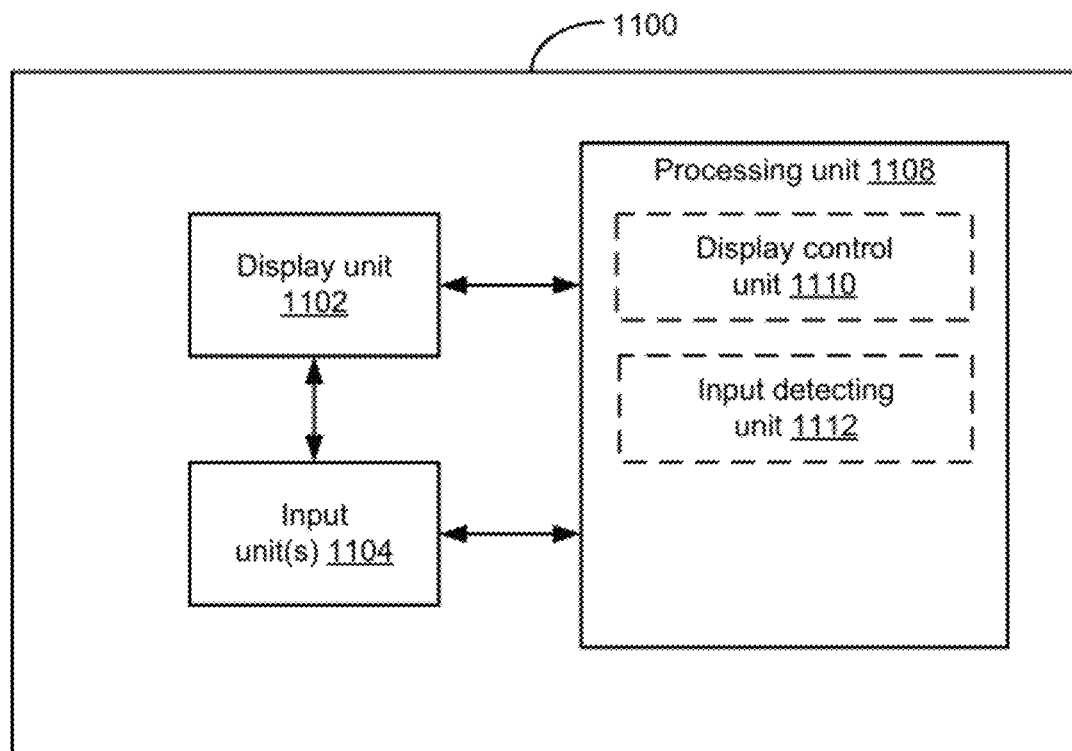
FIGS. 11-13 are functional block diagrams of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface, one or more input units 1104 configured to receive user inputs, and a processing unit 1108 coupled to the display unit 1102 and the one or more input units 1104. In some embodiments, the processing unit 1108 includes: a display control unit 1110, and an input detecting unit 1112.

The processing unit 1108 is configured to enable display of (e.g., with the display control unit 1110), on the display unit 1102, an inbox view of a messaging application that includes a plurality of rows representing electronic communications, the plurality of rows including a first row representing a first plurality of messages that satisfy one or more conversation criteria that indicate that each of the first plurality of messages are a part of a same respective conversation, and a second row representing a second plurality of messages that satisfy a first category criterion but are not part of a same conversation. The processing unit 1108 is also configured to detect (e.g., with the input detecting unit 1112) an input, via the one or more input units 1104, corresponding to selection of a respective row from among the plurality of rows in the inbox view. In response to detecting the input, the processing unit 1108 is further configured to enable display of (e.g., with the display control unit 1110), on the display unit 1102, additional information corresponding to two or more messages from the conversation of related messages that are represented by the first row in accordance with a determination that the respective row corresponds to the first row. In response to detecting the input, the processing unit 1108 is further configured to enable display of (e.g., with the display control unit 1110), on the display unit 1102, additional information corresponding to two or more messages from among the plurality of messages that are represented by the second row, including a first message and a second message that both satisfy the first category criterion but not part of a same conversation in accordance with a determination that the respective row corresponds to the second row.

In some embodiments, the additional information corresponding to the two or more messages from the conversation of related messages that are represented by the first row is displayed inline in the inbox view, and the additional information corresponding to the two or more messages from among the plurality of messages that are represented by the second row is displayed inline in the inbox view In some embodiments, the additional information corresponding to the two or more messages from the conversation of related messages that are represented by the first row replaces display of the inbox view, and the additional information corresponding to the two or more messages from among the plurality of messages that are represented by the second row replaces display of the inbox view.

In some embodiments, the additional information corresponding to the two or more messages from the conversation of related messages that are represented by the first row is displayed in a content pane separate from the inbox view displayed in an inbox pane, and the additional information corresponding to the two or more messages from among the plurality of messages that are represented by the second row is displayed in the content pane separate from the inbox view displayed in the inbox pane.

In some embodiments, the plurality of rows in the inbox view is sorted by date, and the second row representing the plurality of messages is included in the inbox view based on a date of a most recently received message among the plurality of messages.

In some embodiments, the first category criterion corresponds to one of a sender type of the second plurality of messages or a content type of the second plurality of messages.

In some embodiments, the second row is displayed in a condensed view mode prior to detecting the user input.

In some embodiments, the condensed view mode includes one or more of an indication of the first category, one or more senders of the plurality of messages represented by the second row, an indication of a most recently received message among the plurality of messages represented by the second row, an indication of a count of the plurality of messages represented by the second row, or an indication of a count of the unread messages among the plurality of messages represented by the second row.

In some embodiments, the second plurality of messages represented by the second row are not displayed in the inbox view while the second row is displayed in the condensed view mode.

In some embodiments, the second row includes a view mode affordance provided to toggle between the condensed view mode and an expanded view mode of the second row.

In some embodiments, the user input corresponds to selection of the view mode affordance, and the second row is displayed in the expanded view mode after detecting the user input.

In some embodiments, the expanded view mode includes an affordance provided to display the plurality of messages different from the two or more messages.

In some embodiments, the two or more messages from among the plurality of messages that are represented by the second row include a subset of the plurality of messages selected based on a predetermined criterion.

In some embodiments, the inbox view of the messaging application includes a third row representing a third plurality of messages that satisfy a second category criterion different from the first category criterion.

In some embodiments, the inbox view is included in an inbox pane, and the processing unit 1108 is further configured to enable display of (e.g., with the display control unit 1110), on the display unit 1102, a content pane adjacent to the inbox pane, where the content pane includes information associated with the conversation of related messages represented by the first row or the plurality of messages represented by the second row.

In some embodiments, the content pane includes an indication that the information included in the content pane corresponds to the plurality of messages that do not meet the one or more conversation criteria represented by the second row.

In some embodiments, the information included in the content pane has a different appearance for the plurality of messages that do not meet the one or more conversation criteria, the conversation of related messages, and a message.

Figure 12:
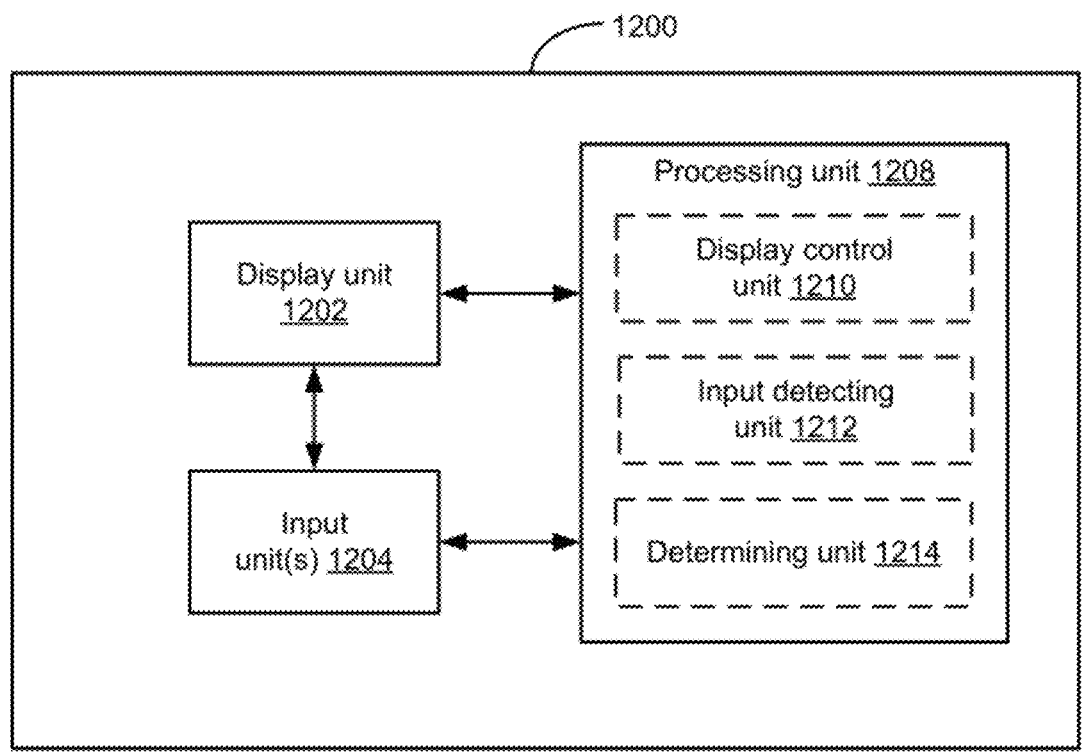

In accordance with some embodiments, FIG. 12 shows a functional block diagram of an electronic device 1200 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, one or more input units 1204 configured to receive user inputs, and a processing unit 1208 coupled to the display unit 1202 and the one or more input units 1204. In some embodiments, the processing unit 1208 includes: a display control unit 1210, an input detecting unit 1212, and a determining unit 1214.

The processing unit 1208 is configured to enable concurrent display of (e.g., with the display control unit 1210), on the display unit 1202, a plurality of representations of electronic communications, and a filter affordance, where the filter affordance corresponds to a set of one or more filter criteria. The processing unit 1208 is also configured to detect (e.g., with the input detecting unit 1212) a selection input, via the one or more input units 1204, that corresponds to selection of the filter affordance while concurrently displaying the plurality of representations of electronic communications and the filter affordance. In response to detecting the selection input, and in accordance with a determination (e.g., with the determining unit 1214) that the selection input corresponds to a first input type, the processing unit 1208 is further configured to: cease display of (e.g., with the display control unit 1210), on the display unit 1202, a first set of representations of electronic communications from among the plurality of representations of electronic communications associated with the first grouping that do not match the set of one or more filter criteria; enable display of (e.g., with the display control unit 1210), on the display unit 1202, a second set of representations of electronic communications from among the plurality of representations of electronic communications associated with the first grouping that match the set of one or more filter criteria; and display of (e.g., with the display control unit 1210), on the display unit 1202, an indication of the set of one or more filter criteria that have been applied to the electronic communications associated with the first grouping.

In some embodiments, satisfying a respective criterion from among the set of one or more filter criteria includes determining that electronic communications associated with the second set of representations of electronic communications are categorized as important based on past user actions with electronic communications.

In some embodiments, the indication of the set of one or more filter criteria includes a description of the set of one or more filter criteria adjacent to the filter affordance.

In some embodiments, the set of one or more filter criteria includes two or more filter criteria.

In some embodiments, the second set of representations of electronic communications that match the set of one or more filter criteria are ordered based on how many of the two or more filter criteria the corresponding electronic communications match.

In some embodiments, the second set of representations of electronic communications that match the set of one or more filter criteria are displayed in an inbox pane, and the processing unit 1208 is further configured to enable concurrent display of (e.g., with the display control unit 1210), on the display unit 1202, a content pane adjacent to the inbox pane, where the content pane includes information corresponding to a respective electronic communication that matches the set of one or more filter criteria.

In some embodiments, in response to detecting the selection input, and in accordance with a determination (e.g., with the determining unit 1214) that the selection input corresponds to a first input type, the processing unit 1208 is further configured to enable display of (e.g., with the display control unit 1210), on the display unit 1202, an indication of a portion of the first set of representations of electronic communications that have been elided, where the indication is displayed between first and second subsets of the second set of representations of electronic communications.

In some embodiments, displaying the second set of representations of electronic communications from among the plurality of representations of electronic communications associated with the first grouping that match the set of one or more filter criteria includes: displaying a first subset of representations of electronic communications that match the set of one or more filter criteria and a second subset of representations of electronic communications that match the set of one or more filter criteria from among the plurality of representations of electronic communications associated with the first grouping; and displaying an expansion affordance between and adjacent to the first and second subsets of representations of electronic communications, where the expansion affordance is provided to display a portion of the first set of representations of electronic communications that do not match the set of one or more filter criteria.

In some embodiments, electronic communications in the portion of the first set of representations of electronic communications that do not match the set of one or more filter criteria are associated with timestamps between timestamps associated with electronic communications in the first and second subsets of representations of electronic communications that match the one or more filter criteria.

In some embodiments, the processing unit 1208 is further configured to: detect (e.g., with the input detecting unit 1212) a second selection input, via the one or more input units 1204, that corresponds to selection of the expansion affordance; and, in response to detecting the second selection input, replace display of (e.g., with the display control unit 1210) the expansion affordance, on the display unit 1202, with the portion of the first set of representations of electronic communications that do not match the set of one or more filter criteria, where the portion of the first set of representations of electronic communications that do not match the set of one or more filter criteria are displayed between and adjacent to the first and second subsets of representations of electronic communications that match the one or more filter criteria.

In some embodiments, in response to detecting the selection input, and in accordance with a determination (e.g., with the determining unit 1214) that the selection input corresponds to a second input type, the processing unit 1208 is further configured to enable display of (e.g., with the display control unit 1210), on the display unit 1202, a filter selection menu overlaid on the plurality of representations of electronic communications associated with the first grouping.

In some embodiments, the filter selection menu is provided to at least one of enable or disable one or more filters among a plurality of filters included in the filter menu.

In some embodiments, the filter selection menu includes an affordance provided to add a custom filter to the plurality of filters included in the filter menu.

In some embodiments, after detecting the selection input, the processing unit 1208 is further configured to detect (e.g., with the input detecting unit 1212) a sequence of one or more user inputs, via the one or more input units 1204, that correspond to displaying a second plurality of representations of electronic communications associated with a second grouping, and, in response to detecting the sequence of one or more user inputs, enable display of (e.g., with the display control unit 1210), on the display unit 1202, a third set of representations of electronic communications from among the second plurality of representations of electronic communications associated with the second grouping that match the set of one or more filter criteria and the indication of the set of one or more filter criteria that have been applied to the electronic communications associated with the second grouping.

In some embodiments, while displaying the third set of representations of electronic communications, the processing unit 1208 is further configured to detect (e.g., with the input detecting unit 1212) a second selection input, via the one or more input units 1204, that corresponds to selection of the filter affordance, and, in response to detecting the second selection input, and in accordance with a determination (e.g., with the determining unit 1214) that the selection input corresponds to the first input type, enable concurrent display of (e.g., with the display control unit 1210), on the display unit 1202, the third set of representations of electronic communications from among the second plurality of representations of electronic communications associated with the second grouping that match the set of one or more filter criteria and a fourth set of representations of electronic communications from among the second plurality of representations of electronic communications associated with the second grouping that do not match the set of one or more filter criteria.

Figure 13:
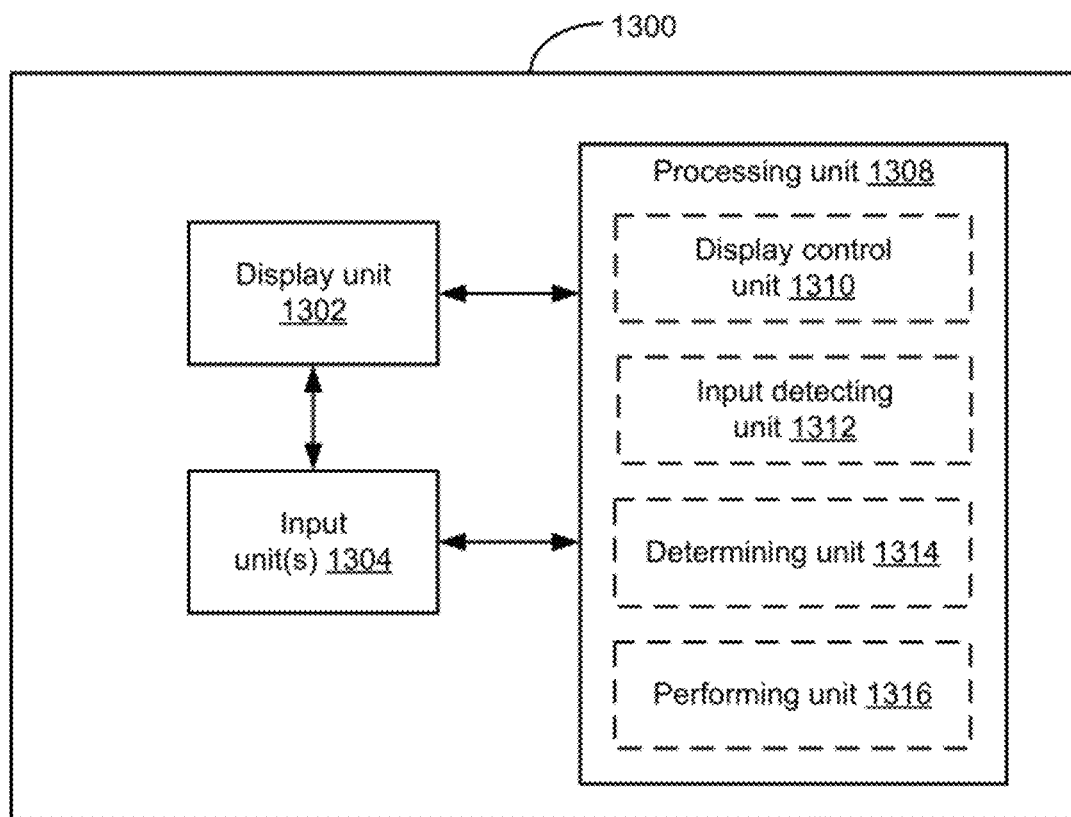

In accordance with some embodiments, FIG. 13 shows a functional block diagram of an electronic device 1300 configured in accordance with the principles of the various described embodiments. The functional blocks of the device are, optionally, implemented by hardware, software, firmware, or a combination thereof to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, one or more input units 1304 configured to receive user inputs, and a processing unit 1308 coupled to the display unit 1302 and the one or more input units 1304. In some embodiments, the processing unit 1308 includes: a display control unit 1310, an input detecting unit 1312, a determining unit 1314, and a performing unit 1316.

The processing unit 1308 is configured to: enable display of (e.g., with the display control unit 1310), on the display unit 1302, a conversation view of a plurality of messages within a first pane of a messaging application, where the conversation view includes a first message region of a portion of a first message of the plurality of messages and a second message region of a portion of a second message of the plurality of messages; and detect (e.g., with the input detecting unit 1312) a user input, via the one or more input units 1304, that corresponds to selecting the first message region within the conversation view. In response to detecting the user input selecting the first message region, and in accordance with a determination (e.g., with the determining unit 1314) that the user input satisfies a first set of input criteria, the processing unit 1308 is further configured to enable display of (e.g., with the display control unit 1310), on the display unit 1302, one or more affordances provided to perform corresponding actions on the first message. In response to detecting the user input selecting the first message region, and in accordance with a determination (e.g., with the determining unit 1314) that the user input satisfies a second set of input criteria, the processing unit 1308 is further configured to replace display of (e.g., with the display control unit 1310) of the conversation view with a message view that corresponds to the first message.

In some embodiments, displaying the one or more affordances includes: in accordance with a determination that the user input is associated with a first direction: displaying, on the display, a first set of one or more affordances adjacent to a first side of the message region, where the first set of one or more affordances is provided to perform corresponding actions on the first message; and sliding the first message region in the first direction, where at least a portion of first message region associated with a second side of the first message region opposite the first side is occluded.

In some embodiments, the processing unit 1308 is further configured to: detect (e.g., with the input detecting unit 1312) a subsequent user input, via the one or more input units 1304, that corresponds to selecting a respective affordance from among the first set of one or more affordances; and in response to detecting the subsequent user input selecting the respective affordance, enable display of (e.g., with the display control unit 1310), on the display unit 1302, one or more options associated with the action that corresponds to the respective affordance.

In some embodiments, displaying the one or more affordances includes: in accordance with a determination that the user input is associated with a second direction: displaying, on the display, a second set of one or more affordances adjacent to a second side of the message region, where the second set of one or more affordances is provided to perform corresponding actions on the first message; and sliding the first message region in the second direction, where at least a portion of first message region associated with a first side of the first message region opposite the second side is occluded.

In some embodiments, displaying the one or more affordances includes maintaining display of the second message region within the conversation view.

In some embodiments, satisfying the first input criteria includes detecting a horizontal swipe gesture within the first message region associated with a magnitude that is less than a threshold distance.

In some embodiments, satisfying the first input criteria includes detecting a user input that corresponds to selecting an actions affordance within the first message region.

In some embodiments, satisfying the second input criteria includes detecting a user input that corresponds to selecting a header sub-region of the first message region.

In some embodiments, satisfying the second input criteria includes detecting a user input that corresponds to selecting a "see more" affordance within the first message region.

In some embodiments, in response to detecting the user input, and in accordance with a determination (e.g., with the determining unit 1314) that the user input satisfies a third set of input criteria, the processing unit 1308 is further configured to perform (e.g., with the performing unit 1316) a predefined action on the first message.

In some embodiments, satisfying the third input criteria includes detecting a horizontal swipe gesture within the first message region associated with a magnitude that is greater than a threshold distance.

In some embodiments, the conversation view includes a toolbar region including a plurality of affordances provided to perform corresponding actions on a most recent message among the plurality of messages.

In some embodiments, a size of the first message region is based at least in part on an amount of content associated with the first message, and a size of the second message region is based at least in part on an amount of content associated with the second message.

In some embodiments, the processing unit 1308 is further configured to enable display of (e.g., with the display control unit 1310), on the display unit 1302, a list view including a plurality of rows representing a plurality of conversations in a second pane adjacent to the first pane that includes the conversation view.

In some embodiments, the processing unit 1308 is further configured to detect (e.g., with the input detecting unit 1312) a second user input, via the one or more input unit 1304, corresponding to the second message region within the conversation view. In response to detecting the second user input, and in accordance with a determination (e.g., with the determining unit 1314) that the second user input satisfies the first set of input criteria, the processing unit 1308 is further configured to enable display of (e.g., with the display control unit 1310), on the display unit 1302, one or more affordances provided to perform corresponding actions to the second message. In response to detecting the second user input, and in accordance with a determination (e.g., with the determining unit 1314) that the second user input satisfies the second set of input criteria, the processing unit 1308 is further configured to replace display of (e.g., with the display control unit 1310) the conversation view with a message view that corresponds on the second message.

In some embodiments, prior to displaying the conversation view within the first pane of the messaging application, the processing unit 1308 is further configured to enable display of (e.g., with the display control unit 1310), on the display unit 1302, a mailbox view that includes a plurality of representations of corresponding to one or more messages and one or more conversations, where the plurality of representations have a same size. The processing unit 1308 is further configured to detect (e.g., with the input detecting unit 1312) a second user input, via the input device, that corresponds to selecting a respective representation from among the plurality of representations. In response to detecting the second user input selecting the respective representation, and in accordance with a determination that respective representation corresponds to a message, the processing unit 1308 is further configured to replace display of (e.g., with the display control unit 1310) the mailbox view with a message view that corresponds to the message associated with the respective representation. In response to detecting the second user input selecting the respective representation, and in accordance with a determination that respective representation corresponds to a conversation, the processing unit 1308 is further configured to replace display of (e.g., with the display control unit 1310) the mailbox view with the conversation view that corresponds to the conversation associated with the respective representation, where the conversation includes the plurality of messages.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C, 9A-9C, 10A-10C are, optionally, implemented by components depicted in FIGS. 1A-1B or FIGS. 11-13. For example, the detecting operation 816, the detecting operation 906, and the detecting operation 1010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
  at a device with one or more processors, non-transitory memory, a display, and an input device:
    displaying, on the display, a conversation view of a plurality of messages in a conversation within a first pane of a messaging application, wherein the conversation view includes a first message region of a portion of a first message of the plurality of messages in the conversation and a second message region of a portion of a second message of the plurality of messages in the conversation;
    detecting a user input, via the input device, that is directed to the first message region within the conversation view; and
    in response to detecting the user input directed to the first message region:
      in accordance with a determination that the user input corresponds to movement in a first direction with a first magnitude less than a threshold distance, displaying, on the display, a plurality of affordances provided to perform a plurality of corresponding actions on the first message without performing the plurality of corresponding actions on other messages in the conversation while maintaining display of the second message region, wherein the plurality of affordances were not displayed prior to detecting the user input, and wherein the plurality of corresponding actions are associated with different action types;
      in accordance with a determination that the user input corresponds to movement in the first direction with a second magnitude greater than the threshold distance, performing a respective action from the plurality of corresponding actions on the first message without performing the respective action on other messages in the conversation while maintaining display of the second message region, wherein the respective action was previously selected by a user from among the plurality of corresponding actions to be performed on messages in response to detecting movement in the first direction with the second magnitude greater than the threshold distance; and in accordance with a determination that the user input satisfies a second set of input criteria, replacing display of the conversation view with a message view that corresponds to the first message including ceasing to display the second message region.

2. The method of claim 1, wherein displaying the plurality of affordances includes:

displaying, on the display, a first set of affordances adjacent to a first side of the first message region, wherein the first set of affordances is provided to perform corresponding actions on the first message; and sliding the first message region in the first direction, wherein at least a portion of first message region associated with a second side of the first message region opposite the first side is occluded.

3. The method of claim 2, further comprising:

detecting a subsequent user input, via the input device, that corresponds to selecting a respective affordance from among the first set of affordances; and in response to detecting the subsequent user input selecting the respective affordance, displaying, on the display, one or more options associated with an action type that corresponds to the respective affordance.

4. The method of claim 1, further comprising:

in response to detecting the user input directed to the first message region and in accordance with a determination that the user input corresponds to movement in a second direction different from the first direction with a third magnitude less than the threshold distance:

displaying, on the display, a second plurality of affordances adjacent to a second side of the first message region, wherein the second plurality of affordances is provided to perform a plurality of corresponding actions on the first message without performing the plurality of corresponding actions on other messages in the conversation while maintaining display of the second message region; and sliding the first message region in the second direction, wherein at least a portion of first message region associated with a first side of the first message region opposite the second side is occluded.

5. The method of claim 1, wherein displaying the plurality of affordances includes:

maintaining display of the second message region within the conversation view.

6. The method of claim 1, wherein the user input in the first direction corresponds to a horizontal swipe gesture within the first message region.

7. The method of claim 1, wherein satisfying the second input criteria includes detecting a user input that corresponds to selecting a header sub-region of the first message region.

8. The method of claim 1, wherein satisfying the second input criteria includes detecting a user input that corresponds to selecting a see more affordance within the first message region.

9. The method of claim 1, wherein the conversation view includes a toolbar region including a plurality of affordances provided to perform corresponding actions on a most recent message among the plurality of messages.

10. The method of claim 1, wherein a respective dimension of the first message region is based at least in part on an amount of content associated with the first message, and wherein the respective dimension of the second message region is based at least in part on an amount of content associated with the second message.

11. The method of claim 1, further comprising:

displaying, on the display, a list view including a plurality of rows representing a plurality of conversations in a second pane adjacent to the first pane that includes the conversation view.

12. The method of claim 1, further comprising:

prior to displaying the conversation view within the first pane of the messaging application, displaying, on the display, a mailbox view that includes a plurality of representations of corresponding to one or more messages and one or more conversations, wherein the plurality of representations have a same size; and detecting a second user input, via the input device, that is directed to respective representation from among the plurality of representations; and in response to detecting the second user input directed to the respective representation:

in accordance with a determination that respective representation corresponds to a message, replacing display of the mailbox view with a message view that corresponds to the message associated with the respective representation; and in accordance with a determination that respective representation corresponds to a conversation, replacing display of the mailbox view with the conversation view that corresponds to the conversation associated with the respective representation, wherein the conversation includes the plurality of messages.

13. A non-transitory computer readable storage medium storing one or more programs, the one or more programs comprising instructions, which, when executed by an electronic device with a display, and an input device, cause the electronic device to:

display, on the display, a conversation view of a plurality of messages in a conversation within a first pane of a messaging application, wherein the conversation view includes a first message region of a portion of a first message of the plurality of messages in the conversation and a second message region of a portion of a second message of the plurality of messages in the conversation;

detect a user input, via the input device, that is directed to the first message region within the conversation view; and in response to detecting the user input directed to the first message region:

in accordance with a determination that the user input corresponds to movement in a first direction with a first magnitude less than a threshold distance, display, on the display, a plurality of affordances provided to perform a plurality of corresponding actions on the first message without performing the plurality of corresponding actions on other messages in the conversation while maintaining display of the second message region, wherein the plurality of affordances were not displayed prior to detecting the user input, and wherein the plurality of corresponding actions are associated with different action types;

in accordance with a determination that the user input corresponds to movement in the first direction with a second magnitude greater than the threshold distance, perform a respective action from the plurality of corresponding actions on the first message without performing the respective action on other messages in the conversation while maintaining display of the second message region, wherein the respective action was previously selected by a user from among the plurality of corresponding actions to be performed on messages in response to detecting movement in the first direction with the second magnitude greater than the threshold distance; and in accordance with a determination that the user input satisfies a second set of input criteria, replace display of the conversation view with a message view that corresponds to the first message including ceasing to display the second message region.

14. An electronic device comprising:

a display;

an input device;

means for displaying, on the display, a conversation view of a plurality of messages in a conversation within a first pane of a messaging application, wherein the conversation view includes a first message region of a portion of a first message of the plurality of messages in the conversation and a second message region of a portion of a second message of the plurality of messages in the conversation;

means for detecting a user input, via the input device, that is directed to the first message region within the conversation view;

means, responsive to detecting the user input directed to the first message region, for displaying, on the display, a plurality of affordances provided to perform a plurality of corresponding actions on the first message without performing the plurality of corresponding actions on other messages in the conversation while maintaining display of the second message region, wherein the plurality of affordances were not displayed prior to detecting the user input and wherein the plurality of corresponding actions are associated with different action types, in accordance with a determination that the user input corresponds to movement in a first direction with a first magnitude less than a threshold distance;

means, responsive to detecting the user input directed to the first message region, for performing a respective action from the plurality of corresponding actions on the first message without performing the respective action on other messages in the conversation while maintaining display of the second message region, in accordance with a determination that the user input corresponds to movement in the first direction with a second magnitude greater than the threshold distance, wherein the respective action was previously selected by a user from among the plurality of corresponding actions to be performed on messages in response to detecting movement in the first direction with the second magnitude greater than the threshold distance; and means, responsive to detecting the user input directed to the first message region, for replacing display of the conversation view with a message view that corresponds to the first message including ceasing to display the second message region in accordance with a determination that the user input satisfies a second set of input criteria.

15. An electronic device comprising:

a display unit configured to display a user interface;

one or more input units configured to receive inputs; and a processing unit coupled with the display unit and the one or more input units, the processing unit configured to:

enable display of, on the display unit, a conversation view of a plurality of messages in a conversation within a first pane of a messaging application, wherein the conversation view includes a first message region of a portion of a first message of the plurality of messages in the conversation and a second message region of a portion of a second message of the plurality of messages in the conversation;

detect a user input, via the one or more input units, that is directed to the first message region within the conversation view; and in response to detecting the user input directed to the first message region:

in accordance with a determination that the user input corresponds to movement in a first direction with a first magnitude less than a threshold distance, enable display of, on the display unit, a plurality of affordances provided to perform a plurality of corresponding actions on the first message without performing the plurality of corresponding actions on other messages in the conversation while maintaining display of the second message region, wherein the plurality of affordances were not displayed prior to detecting the user input, and wherein the plurality of corresponding actions are associated with different action types;

in accordance with a determination that the user input corresponds to movement in the first direction with a second magnitude greater than the threshold distance, perform a respective action from the plurality of corresponding actions on the first message without performing the respective action on other messages in the conversation while maintaining display of the second message region, wherein the respective action was previously selected by a user from among the plurality of corresponding actions to be performed on messages in response to detecting movement in the first direction with the second magnitude greater than the threshold distance; and in accordance with a determination that the user input satisfies a second set of input criteria, replace display of the conversation view with a message view that corresponds to the first message including ceasing to display the second message region.

16. The electronic device of claim 15, wherein displaying the plurality of affordances includes:

enable display of, on the display unit, a first set of affordances adjacent to a first side of the first message region, wherein the first set of affordances is provided to perform corresponding actions on the first message; and slide the first message region in the first direction, wherein at least a portion of first message region associated with a second side of the first message region opposite the first side is occluded.

17. The electronic device of claim 16, wherein the processing unit is further configured to:

detect a subsequent user input, via the one or more input units, that corresponds to selecting a respective affordance from among the first set of affordances; and in response to detecting the subsequent user input selecting the respective affordance, enable display of, on the display unit, one or more options associated with an action type that corresponds to the respective affordance.

18. The electronic device of claim 15, wherein the processing unit is further configured to:
in response to detecting the user input directed to the first message region and in accordance with a determination that the user input corresponds to movement in a second direction different from the first direction with a third magnitude less than the threshold distance:
enable display of, on the display unit, a second plurality of affordances adjacent to a second side of the first message region, wherein the second plurality of affordances is provided to perform a plurality of corresponding actions on the first message without performing the plurality of corresponding actions on other messages in the conversation while maintaining display of the second message region; and
slide the first message region in the second direction, wherein at least a portion of first message region associated with a first side of the first message region opposite the second side is occluded.

19. The electronic device of claim 15, wherein displaying the plurality of affordances includes:
maintaining display of the second message region within the conversation view.

20. The electronic device of claim 15, wherein the user input in the first direction corresponds to a horizontal swipe gesture within the first message region.

21. The electronic device of claim 15, wherein satisfying the second input criteria includes detecting a user input that corresponds to selecting a header sub-region of the first message region.

22. The electronic device of claim 15, wherein satisfying the second input criteria includes detecting a user input that corresponds to selecting a see more affordance within the first message region.

23. The electronic device of claim 15, wherein the conversation view includes a toolbar region including a plurality of affordances provided to perform corresponding actions on a most recent message among the plurality of messages.

24. The non-transitory computer readable storage medium of claim 13, wherein displaying the plurality of affordances includes:
displaying, on the display, a first set of affordances adjacent to a first side of the first message region, wherein the first set of affordances is provided to perform corresponding actions on the first message; and
sliding the first message region in the first direction, wherein at least a portion of first message region associated with a second side of the first message region opposite the first side is occluded.

25. The non-transitory computer readable storage medium of claim 24, wherein instructions further cause the electronic device to:
detect a subsequent user input, via the input device, that corresponds to selecting a respective affordance from among the first set of affordances; and
in response to detecting the subsequent user input selecting the respective affordance, display, on the display, one or more options associated with an action type that corresponds to the respective affordance.

26. The non-transitory computer readable storage medium of claim 13, wherein instructions further cause the electronic device to:
in response to detecting the user input directed to the first message region and in accordance with a determination that the user input corresponds to movement in a second direction different from the first direction with a third magnitude less than the threshold distance:
display, on the display, a second plurality of affordances adjacent to a second side of the first message region, wherein the second plurality of affordances is provided to perform a plurality of corresponding actions on the first message without performing the plurality of corresponding actions on other messages in the conversation while maintaining display of the second message region; and
slide the first message region in the second direction, wherein at least a portion of first message region associated with a first side of the first message region opposite the second side is occluded.

27. The non-transitory computer readable storage medium of claim 13, wherein the user input in the first direction corresponds to a horizontal swipe gesture within the first message region.

28. The non-transitory computer readable storage medium of claim 13, wherein satisfying the second input criteria includes detecting a user input that corresponds to selecting a header sub-region of the first message region.

* * * * *